(12) United States Patent
Nammi et al.

(10) Patent No.: US 8,908,784 B2
(45) Date of Patent: Dec. 9, 2014

(54) METHODS OF COMMUNICATING DATA INCLUDING SYMBOL MAPPING/DEMAPPING AND RELATED DEVICES

(71) Applicant: Telefonaktiebolaget L M Ericsson (publ), Stockholm (SE)

(72) Inventors: Sairamesh Nammi, Stockholm (SE); Bo Göransson, Sollentuna (SE); Erik Larsson, Uppsala (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 8 days.

(21) Appl. No.: 13/818,005

(22) PCT Filed: Dec. 20, 2012

(86) PCT No.: PCT/SE2012/051449
§ 371 (c)(1),
(2), (4) Date: Feb. 20, 2013

(87) PCT Pub. No.: WO2013/115699
PCT Pub. Date: Aug. 8, 2013

(65) Prior Publication Data
US 2014/0086351 A1    Mar. 27, 2014

Related U.S. Application Data

(60) Provisional application No. 61/592,040, filed on Jan. 30, 2012.

(51) Int. Cl.
| | |
|---|---|
| *H04K 1/10* | (2006.01) |
| *H04L 27/28* | (2006.01) |
| *H04B 7/04* | (2006.01) |
| *H04L 25/03* | (2006.01) |
| *H04L 1/00* | (2006.01) |

(52) U.S. Cl.
CPC ........ *H04B 7/0456* (2013.01); *H04L 25/03929* (2013.01); *H04L 1/0035* (2013.01); *H04B 7/0486* (2013.01)

USPC ........... 375/260; 375/296; 375/346; 375/267; 375/299; 375/347; 455/500; 455/501; 455/101; 370/329; 370/330; 370/206; 370/207; 370/208

(58) Field of Classification Search
USPC ................. 375/260, 296, 346, 267, 299, 347; 455/500, 501, 101; 370/329, 330, 206, 370/207, 208
See application file for complete search history.

(56) References Cited

U.S. PATENT DOCUMENTS

| | | | |
|---|---|---|---|
| 2010/0098009 A1* | 4/2010 | Higuchi | 370/329 |
| 2010/0202559 A1* | 8/2010 | Luo et al. | 375/295 |

FOREIGN PATENT DOCUMENTS

WO    WO 2012/095188 A1    7/2012

OTHER PUBLICATIONS

Ericsson, ST-Ericsson, "Number of supported codewords for 4-Branch MIMO", 3GPP Draft: R1-114290; 3GPP TSG RAN WG1 Meeting #67, San Francisco, USA, Nov. 14-18, 2011, Retrieved on Nov. 10, 2011, 8 pages.

(Continued)

*Primary Examiner* — Phuong Phu
(74) *Attorney, Agent, or Firm* — Myers Bigel Sibley & Sajovec, P.A.

(57) ABSTRACT

Data may be transmitted from a RAN node to a wireless terminal using a MIMO antenna array. A plurality of unmapped symbol blocks may be generated. Symbols of a first one of the plurality of unmapped symbol blocks may be mapped to first and second mapped symbol blocks so that the first mapped symbol block includes symbols of the first unmapped symbol block and so that the second mapped symbol block includes symbols of the first unmapped symbol block. The symbols of the first and second mapped symbol blocks may be precoded to provide precoded symbols of respective first and second MIMO precoding layers using a MIMO precoding vector. Each of the precoded symbols of the first and second MIMO precoding layers may be transmitted through the MIMO antenna array to the wireless terminal using a same TFRE. Related devices and terminals are also discussed.

24 Claims, 19 Drawing Sheets

(56) References Cited

OTHER PUBLICATIONS

Huawei, HiSilicon, "Layer mapping for 4-branch MIMO", 3GPP Draft: R1-113847; 3GPP TSG-RAN WG1 Meeting #67, San Francisco, USA, Nov. 14-18, 2011, Retrieved on Nov. 8, 2011, 7 pages.
International Search Report and Written Opinion Corresponding to International Application No. PCT/SE2012/051449; Date of Mailing: Jun. 3, 2013; 11 Pages.
ITRI, "Further discuss of codeword-to-layer mapping of dual-layer beamforming", 3GPP Draft: R1-092682; 3GPP TSG-RAN WG1 #57b, Jun. 29-Jul. 3, 2009, Los Angeles, USA, Retrieved on Jun. 24, 2009, 5 pages.
Samsung, "Considerations on codewords to layers mapping for downlink MIMO", 3GPP TSG RAN WG1 Meeting #47bis, R1-070130; Sorrento, Italy, Jan. 15-19, 2007, 8pp.
Ericsson, "New WI: Four Branch MIMO transmission for HSDPA (core part)", 3GPP TSG-RAN Meeting #53, RP-111393, vol. 13.1.2; Fukuoka, Japan, Sep. 13-16, 2011, 6 pp.
Ericsson, "New WI: Four Branch MIMO transmission for HSDPA (feature part)", 3GPP TSG-RAN Meeting #53, RP-111393, vol. 13.1.2; Fukuoka, Japan, Sep. 13-16, 2011, 5 pp.
Ericsson, "New WI: Four Branch MIMO transmission for HSDPA (performance part)", 3GPP TSG-RAN Meeting #53, RP-111393, vol. 13.1.2; Fukuoka, Japan, Sep. 13-16, 2011, 5 pp.
Ericsson, "4-branch MIMO for HSDPA", 3GPP TSG-RAN WG1 Meeting #65, R1-111763; Barcelona, Spain, May 9-13, 2011, 17 pp.
Thomas Salzer, Huawei—HSPA session chairman, "Summary of 4-branch MIMO for HSPA session", 3GPP TSG-RAN WG1 Meeting #67, R1-114366, Item 6.4; San Francisco, CA USA, Nov. 14-18, 2011, 2 pp.
Ericsson, "Introduction of 4Tx_HSDPA", TSG-RAN1 Meeting #70bis, R1-124506, Change Request, 25.212, Version 11.0.0; San Diego, USA, Oct. 8-12, 2012, 45pp.
Ericsson, "Introduction of 4Tx_HSDPA in 25,331", 3GPP TSG-RAN WG2 Meeting #79bis, [Draft] R2-125043, Change Request, 25.331, Version 11.3.0; Bratislava, Slovakia, Oct. 8-12, 2012, 131pp.
I. Emre Telatar, "Capacity of Multi-antenna Gaussian Channels", Lucent Technologies, Bell Laboratories, Murray Hill, NJ, Oct. 1995; *European Transactions on Telecommunications,* vol. 1, No. 6, pp. 585-595, Nov./Dec. 1999.

\* cited by examiner

Rank 1

Rank 2

Rank 3

Rank 4

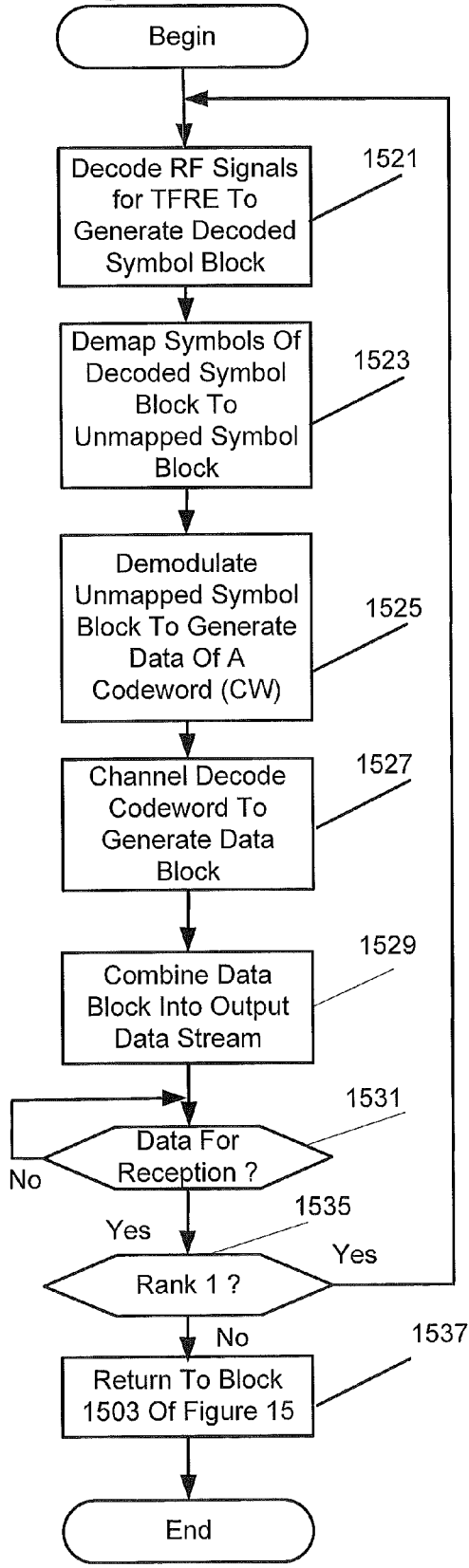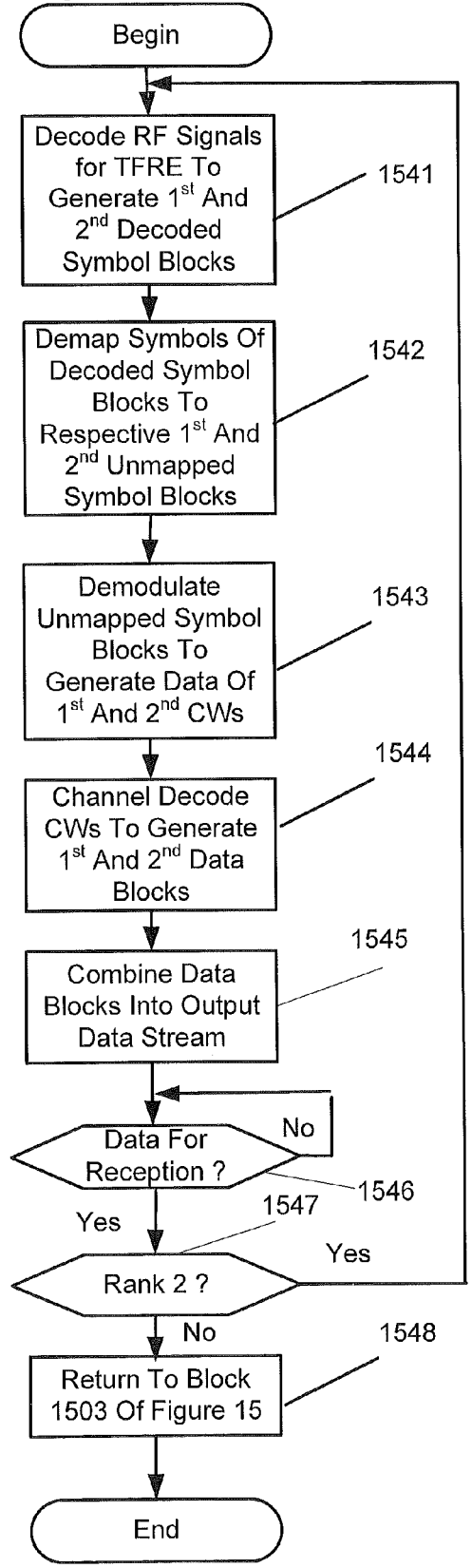

METHODS OF COMMUNICATING DATA INCLUDING SYMBOL MAPPING/DEMAPPING AND RELATED DEVICES

RELATED APPLICATIONS

The present application is a 35 U.S.C. §371 national stage application of PCT International Application No. PCT/SE2012/051449, filed on Dec. 20, 2012, which claims the benefit of priority from U.S. Application No. 61/592,040 filed Jan. 30, 2012. The disclosures of both of the above referenced applications are hereby incorporated herein in their entireties by reference.

TECHNICAL FIELD

The present disclosure is directed to wireless communications and, more particularly, to multiple-input-multiple-output (MIMO) wireless communications and related network nodes and wireless terminals.

BACKGROUND

In a typical cellular radio system, wireless terminals (also referred to as user equipment unit nodes, UEs, and/or mobile stations) communicate via a radio access network (RAN) with one or more core networks. The RAN covers a geographical area which is divided into cell areas, with each cell area being served by a radio base station (also referred to as a RAN node, a "NodeB", and/or enhanced NodeB "eNodeB"). A cell area is a geographical area where radio coverage is provided by the base station equipment at a base station site. The base stations communicate through radio communication channels with UEs within range of the base stations.

Moreover, a cell area for a base station may be divided into a plurality of sectors surrounding the base station. For example, a base station may service three 120 degree sectors surrounding the base station, and the base station may provide a respective directional transceiver and sector antenna array for each sector. Stated in other words, a base station may include three directional sector antenna arrays servicing respective 120 degree base station sectors surrounding the base station.

Multi-antenna techniques can significantly increase capacity, data rates, and/or reliability of a wireless communication system as discussed, for example, by Telatar in "Capacity Of Multi-Antenna Gaussian Channels" (European Transactions On Telecommunications, Vol. 10, pp. 585-595, November 1999). Performance may be improved if both the transmitter and the receiver for a base station sector are equipped with multiple antennas (e.g., an sector antenna array) to provide a multiple-input multiple-output (MIMO) communication channel(s) for the base station sector. Such systems and/or related techniques are commonly referred to as MIMO. The LTE standard is currently evolving with enhanced MIMO support and MIMO antenna deployments. A spatial multiplexing mode is provided for relatively high data rates in more favorable channel conditions, and a transmit diversity mode is provided for relatively high reliability (at lower data rates) in less favorable channel conditions.

In a downlink from a base station transmitting from a sector antenna array over a MIMO channel to a wireless terminal in the sector, for example, spatial multiplexing (or SM) may allow the simultaneous transmission of multiple symbol streams over the same frequency from the base station sector antenna array for the sector. Stated in other words, multiple symbol streams may be transmitted from the base station sector antenna array for the sector to the wireless terminal over the same downlink time/frequency resource element (TFRE) to provide an increased data rate. In a downlink from the same base station sector transmitting from the same sector antenna array to the same wireless terminal, transmit diversity (e.g., using space-time codes) may allow the simultaneous transmission of the same symbol stream over the same frequency from different antennas of the base station sector antenna array. Stated in other words, the same symbol stream may be transmitted from different antennas of the base station sector antenna array to the wireless terminal over the same time/frequency resource element (TFRE) to provide increased reliability of reception at the wireless terminal due to transmit diversity gain.

Currently, 4-layer transmission schemes are proposed for High-Speed-Downlink-Packet-Access (HSDPA) within Third Generation Partnership Project (3GPP) standardization. Accordingly, up to 4 codewords (where a codeword is a channel encoded transport data block) may be transmitted using a same TFRE when using 4-branch MIMO transmission. Because channel encoding for each codeword to be transmitted during a same TFRE may require wireless terminal feedback (e.g., as CQI or channel quality information), feedback to define channel encoding for 4 codewords may be required when using 4-branch MIMO transmission. Feedback signaling when using 4-branch MIMO transmission may thus be undesirably high, for example, because different MIMO layers may be received at a wireless terminal during a same TFRE with different qualities, signal strengths, error rates, etc.

SUMMARY

It may therefore be an object to address at least some of the above mentioned disadvantages and/or to improve performance in a wireless communication system.

According to some embodiments, data may be transmitted from a radio access network node to a wireless terminal using a multiple-input-multiple-output (MIMO) antenna array including a plurality of MIMO antenna elements. A plurality of unmapped symbol blocks may be generated wherein each of the unmapped symbol blocks includes a plurality of symbols. Symbols of a first one of the plurality of unmapped symbol blocks may be mapped to first and second mapped symbol blocks so that the first mapped symbol block includes symbols of the first unmapped symbol block and so that the second mapped symbol block includes symbols of the first unmapped symbol block. The symbols of the first mapped symbol block may be precoded to provide precoded symbols of a first MIMO precoding layer using a MIMO precoding vector. The symbols of the second mapped symbol block may be precoded to provide precoded symbols of a second MIMO precoding layer using the MIMO precoding vector. Each of the precoded symbols of the first and second MIMO precoding layers may be transmitted through the MIMO antenna elements of the MIMO antenna array to the wireless terminal using a same time-frequency-resource-element (TFRE). Accordingly, symbols of one unmapped symbol block (e.g., with the unmapped symbol block provided by modulating a data codeword) may be split between two MIMO layers.

Mapping symbols may further include mapping symbols of a second one of the plurality of unmapped symbol blocks to the first and second mapped symbol blocks so that the first mapped symbol block includes symbols of the first and second unmapped symbol blocks and so that the second mapped symbol block includes symbols of the first and second unmapped symbol blocks. Accordingly, symbols of each of two unmapped symbol block (e.g., with each unmapped symbol block provided by modulating a respective data codeword) may be split between first and second MIMO layers.

Generating the plurality of unmapped symbol blocks may include providing input data for transmission to the wireless terminal, separating the input data into a plurality of different data blocks, encoding a first data block of the plurality of different data blocks using a first channel code characteristic to provide a first codeword, encoding a second data block of the plurality of different data blocks using a second channel code characteristic different than the first channel code characteristic to provide a second codeword, modulating data of the first codeword to provide symbols of the first unmapped symbol block, and modulating data of the second codeword to provide symbols of the second unmapped symbol block. Accordingly, two unmapped symbol blocks may be provided by modulating respective data codewords generating using different channel code characteristics, and symbols of the two unmapped symbol blocks may be split between first and second MIMO layers.

Generating the plurality of unmapped symbol blocks may further include encoding a third data block of the plurality of different data blocks using the first channel code characteristic to provide a third codeword, and encoding a fourth data block of the plurality of different data blocks using the second channel code characteristic to provide a fourth codeword. Moreover, modulating data of the first codeword may include interleaving and modulating data of the first and third codewords to provide symbols of the first unmapped symbol block, and modulating data of the second codeword may include interleaving and modulating data of the second and fourth codewords to provide symbols of the second unmapped symbol block.

Mapping symbols of the first and second unmapped symbol blocks may include combining the first unmapped symbol block and the second unmapped symbol block to provide a combined symbol block including the plurality of symbols of the first unmapped symbol block and the plurality of symbols of the second unmapped symbol block, and separating the combined symbol block to generate the first and second mapped symbol blocks, so that the first mapped symbol block includes symbols of the first and second unmapped symbol blocks, and so that the second mapped symbol block includes symbols of the first and second unmapped symbol blocks.

In addition, symbols of third and fourth unmapped symbol blocks of the plurality of unmapped symbol blocks may be mapped to respective third and fourth mapped symbol blocks, so that the third mapped symbol block includes symbols of the third and fourth unmapped symbol blocks, and so that the fourth mapped symbol block includes symbols of the third and fourth unmapped symbol blocks. The symbols of the third mapped symbol block may be precoded to provide precoded symbols of a third MIMO precoding layer using the MIMO precoding vector, and the symbols of the fourth mapped symbol block may be precoded to provide precoded symbols of a fourth MIMO precoding layer using the MIMO precoding vector. Each of the precoded symbols of the first, second, third, and fourth MIMO precoding layers may then be transmitted through the MIMO antenna elements of the MIMO antenna array to the wireless terminal using the same time-frequency-resource-element, TFRE.

Symbols of a third unmapped symbol block of the plurality of unmapped symbol blocks may be mapped to a third mapped symbol block, so that the third mapped symbol block includes symbols of the third unmapped symbol block and excludes symbols of any unmapped symbol block other than the third unmapped symbol block. The symbols of the third mapped symbol block may be precoded to provide precoded symbols of a third MIMO precoding layer using the MIMO precoding vector. Each of the precoded symbols of the first, second, and third MIMO precoding layers may then be transmitted through the MIMO antenna elements of the MIMO antenna array to the wireless terminal using the same time-frequency-resource-element (TFRE).

The TFRE may be a first TFRE. A first mapping selection from the wireless terminal may be received, wherein mapping symbols of the first, second, and third unmapped symbol blocks includes mapping responsive to the first mapping selection, and wherein precoding the symbols of the first, second, and third mapped symbol blocks includes precoding responsive to the first mapping selection. A second mapping selection may then be received from the wireless terminal different than the first mapping selection. Responsive to receiving the second mapping selection, symbols of fourth and fifth unmapped symbol blocks of the plurality of unmapped symbol blocks may be mapped to respective fourth and fifth mapped symbol blocks, so that the fourth mapped symbol block includes symbols of the fourth and fifth unmapped symbol blocks, and so that the fifth mapped symbol block includes symbols of the fourth and fifth unmapped symbol blocks. Responsive to receiving the second mapping selection, symbols of a sixth unmapped symbol block of the plurality of unmapped symbol blocks may be mapped to a sixth mapped symbol block, so that the sixth mapped symbol block includes symbols of the sixth unmapped symbol block and excludes symbols of any unmapped symbol block other than the sixth unmapped symbol block. Responsive to receiving the second mapping selection, the symbols of the fourth mapped symbol block may be precoded to provide precoded symbols of the third MIMO precoding layer using the MIMO precoding vector, the symbols of the fifth mapped symbol block may be precoded to provide precoded symbols of the first MIMO precoding layer using the MIMO precoding vector, and the symbols of the sixth mapped symbol block may be precoded to provide precoded symbols of the second MIMO precoding layer using the MIMO precoding vector. Each of the precoded symbols of the first, second, and third MIMO precoding layers based on the fourth, fifth, and sixth mapped symbol blocks may then be transmitted through the MIMO antenna elements of the MIMO antenna array to the wireless terminal using a second TFRE.

The first mapped symbol block may include symbols of the first unmapped symbol block and may exclude symbols of any unmapped symbol block other than the first unmapped symbol block, and the second mapped symbol block may include symbols of the first unmapped symbol block and may exclude symbols of any unmapped symbol block other than the first unmapped symbol block. Generating the plurality of unmapped symbol blocks may include providing input data for transmission to the wireless terminal, separating the input data into a plurality of different data blocks, encoding a first data block of the plurality of different data blocks using a first channel code characteristic to provide a first codeword, and modulating data of the first codeword to provide the first unmapped symbol block. Generating the plurality of unmapped symbol blocks may include encoding a second data block of the plurality of different data blocks using the first channel code characteristic to provide a second codeword, and modulating data of the first codeword may include interleaving and modulating data of the first and second codewords to provide the first unmapped symbol block.

According to some other embodiments, a radio access network node may include a multiple-input-multiple-output (MIMO) antenna array including a plurality of MIMO antenna elements and a processor coupled to the MIMO antenna array. The processor may be configured to generate a plurality of unmapped symbol blocks with each of the unmapped symbol blocks including a respective plurality of symbols, to map symbols of a first one of the unmapped symbol blocks of the plurality of unmapped symbol blocks to first and second mapped symbol blocks so that the first mapped symbol block includes symbols of the first unmapped symbol blocks and so that the second mapped symbol block includes symbols of the first unmapped symbol blocks. The processor may be further configured to precode the symbols of the first mapped symbol block to provide precoded symbols of a first MIMO precoding layer using a MIMO precoding vector, and to precode the symbols of the second mapped symbol block to provide precoded symbols of a second MIMO precoding layer using the MIMO precoding vector. The processor may be configured to then transmit each of the precoded symbols of the first and second MIMO precoding layers through the MIMO antenna elements of the MIMO antenna array to the wireless terminal using a same time-frequency-resource-element (TFRE).

The processor may be further configured to map symbols of a second one of the plurality of unmapped symbol blocks to the first and second mapped symbol blocks, so that the first mapped symbol block includes symbols of the first and second unmapped symbol blocks, and so that the second mapped symbol block includes symbols of the first and second unmapped symbol blocks.

The processor may be further configured to generate the plurality of unmapped symbol blocks by providing input data for transmission to the wireless terminal, separating the input data into a plurality of different data blocks, encoding a first data block of the plurality of different data blocks using a first channel code characteristic to provide a first codeword, encoding a second data block of the plurality of different data blocks using a second channel code characteristic different than the first channel code characteristic to provide a second code word, modulating data of the first codeword to provide symbols of the first unmapped symbol block, and modulating data of the second codeword to provide symbols of the second unmapped symbol block.

The processor may be further configured to generate the plurality of unmapped symbol blocks by encoding a third data block of the plurality of different data blocks using the first channel code characteristic to provide a third codeword, and encoding a fourth data block of the plurality of different data blocks using the second channel code characteristic to provide a fourth codeword. In addition, the processor may be configured to modulate data of the first code word by interleaving and modulating data of the first and third codewords to provide symbols of the first unmapped symbol block, and to modulate data of the second codeword by interleaving and modulating data of the second and fourth codewords to provide symbols of the second unmapped symbol block.

The processor may be configured to map symbols of the first and second unmapped symbol blocks by combining the first unmapped symbol block and the second unmapped symbol block to provide a combined symbol block including the plurality of symbols of the first unmapped symbol block and the plurality of symbols of the second unmapped symbol block, and separating the combined symbol block to generate the first and second mapped symbol blocks so that the first mapped symbol block includes symbols of the first and second unmapped symbol blocks and so that the second mapped symbol block includes symbols of the first and second unmapped symbol blocks.

The processor may be further configured to map symbols of third and fourth unmapped symbol blocks of the plurality of unmapped symbol blocks to respective third and fourth mapped symbol blocks so that the third mapped symbol block includes symbols of the third and fourth unmapped symbol blocks and so that the fourth mapped symbol block includes symbols of the third and fourth unmapped symbol blocks. The symbols of the third mapped symbol block may be precoded to provide precoded symbols of a third MIMO precoding layer using the MIMO precoding vector, and the symbols of the fourth mapped symbol block may be precoded to provide precoded symbols of a fourth MIMO precoding layer using the MIMO precoding vector. Each of the precoded symbols of the first, second, third, and fourth MIMO precoding layers may be transmitted through the MIMO antenna elements of the MIMO antenna array (117) to the wireless terminal (200) using the same time-frequency-resource-element (TFRE).

The processor may be further configured to map symbols of a third unmapped symbol block of the plurality of unmapped symbol blocks to a third mapped symbol block so that the third mapped symbol block includes symbols of the third unmapped symbol block and excludes symbols of any unmapped symbol block other than the third unmapped symbol block. The symbols of the third mapped symbol block may be precoded to provide precoded symbols of a third MIMO precoding layer using the MIMO precoding vector, and each of the precoded symbols of the first, second, and third MIMO precoding layers may be transmitted through the MIMO antenna elements of the MIMO antenna array to the wireless terminal using the same time-frequency-resource-element (TFRE).

The TFRE may include a first TFRE, and the processor may be further configured to receive a first mapping selection from the wireless terminal. Mapping symbols of the first, second, and third unmapped symbol blocks may include mapping responsive to the first mapping selection, and precoding the symbols of the first, second, and third mapped symbol blocks may include precoding responsive to the first mapping selection. The processor may be further configured to receive a second mapping selection from the wireless terminal different than the first mapping selection. Symbols of fourth and fifth unmapped symbol blocks of the plurality of unmapped symbol blocks may be mapped to respective fourth and fifth mapped symbol blocks responsive to receiving the second mapping selection so that the fourth mapped symbol block includes symbols of the fourth and fifth unmapped symbol blocks and so that the fifth mapped symbol block includes symbols of the fourth and fifth unmapped symbol blocks. Symbols of a sixth unmapped symbol block of the plurality of unmapped symbol blocks may be mapped to a sixth mapped symbol block responsive to receiving the second mapping selection so that the sixth mapped symbol block includes symbols of the sixth unmapped symbol block and excludes symbols of any unmapped symbol block other than the sixth unmapped symbol block. The symbols of the fourth mapped symbol block may be precoded responsive to receiving the second mapping selection to provide precoded symbols of the third MIMO precoding layer using the MIMO precoding vector. The symbols of the fifth mapped symbol block may be precoded responsive to receiving the second mapping selection to provide precoded symbols of the first MIMO precoding layer using the MIMO precoding vector. The symbols of the sixth mapped symbol block may be precoded responsive to receiving the second mapping selection to provide precoded symbols of the second MIMO precoding layer using the MIMO precoding vector. Each of the precoded symbols of the first, second, and third MIMO precoding layers based on the fourth, fifth, and sixth mapped symbol blocks may be transmitted through the MIMO antenna array to the wireless terminal using a second TFRE.

According to still other embodiment, data may be received at a wireless terminal from a radio access network node using a multiple-input-multiple-output (MIMO) antenna array including a plurality of MIMO antenna elements. Radio frequency signals received through the MIMO antenna elements of the MIMO antenna array may be decoded using a MIMO decoding vector to generate a plurality of MIMO decoded symbol layers including a first decoded symbol block of a first of the MIMO decoded symbol layers and a second decoded symbol block of a second of the MIMO decoded symbol layers. Moreover, the first and second decoded symbol blocks may represent data received during a same time-frequency-resource-element (TFRE). Symbols of the first and second decoded symbol blocks may be demapped to a first unmapped symbol block, so that the first unmapped symbol block includes symbols of the first and second decoded symbol blocks.

Demapping may further include demapping symbols of the first and second decoded symbol blocks to a second unmapped symbol block, so that the second unmapped symbol block includes symbols of the first and second MIMO decoded symbol blocks.

In addition, the first unmapped symbol block to generate data of a first codeword, demodulating the second unmapped symbol block may be demodulated to generate data of a second codeword, the first codeword may be channel decoded using a first channel code characteristic to provide a first data block, the second codeword may be channel decoded using a second channel code characteristic to provide a second data block wherein the first and second channel code characteristics are different, and the first and second data blocks may be combined to provide an output data stream.

According to yet additional embodiments, a wireless terminal may include a multiple-input-multiple output (MIMO) antenna array including a plurality of MIMO antenna elements, a receiver coupled to the MIMO antenna array wherein the receiver is configured to receive radio signals from respective antennas of the MIMO antenna array, and a processor coupled to the receiver. The processor may be configured to decode the radio signals received through the receiver using a MIMO decoding vector to generate a plurality of MIMO decoded symbol layers including a first decoded symbol block of a first of the MIMO decoded symbol layers and a second decoded symbol block of a second of the MIMO decoded symbol layers. The first and second decoded symbol blocks may represent data received during a same time-frequency-resource-element. The processor may be further configured to demap symbols of the first and second decoded symbol blocks to a first unmapped symbol block, so that the first unmapped symbol block includes symbols of the first and second decoded symbol blocks.

The processor may be further configured to demap symbols of the first and second decoded symbol blocks to a second unmapped symbol block, so that the second unmapped symbol block includes symbols of the first and second MIMO decoded symbol blocks.

BRIEF DESCRIPTION OF THE DRAWINGS

The accompanying drawings, which are included to provide a further understanding of the disclosure and are incorporated in and constitute a part of this application, illustrate certain non-limiting embodiment(s) of present inventive concepts. In the drawings:

FIGS. 10, 11A, 11B, 11C, 11D, 12, 13, 14A, 14B, 14C, 14D, 15, 16A, 16B, 16C, and 16D are flow charts illustrating operations/functionalities of transmission/reception according to some embodiments.

DETAILED DESCRIPTION

Figure 1A:
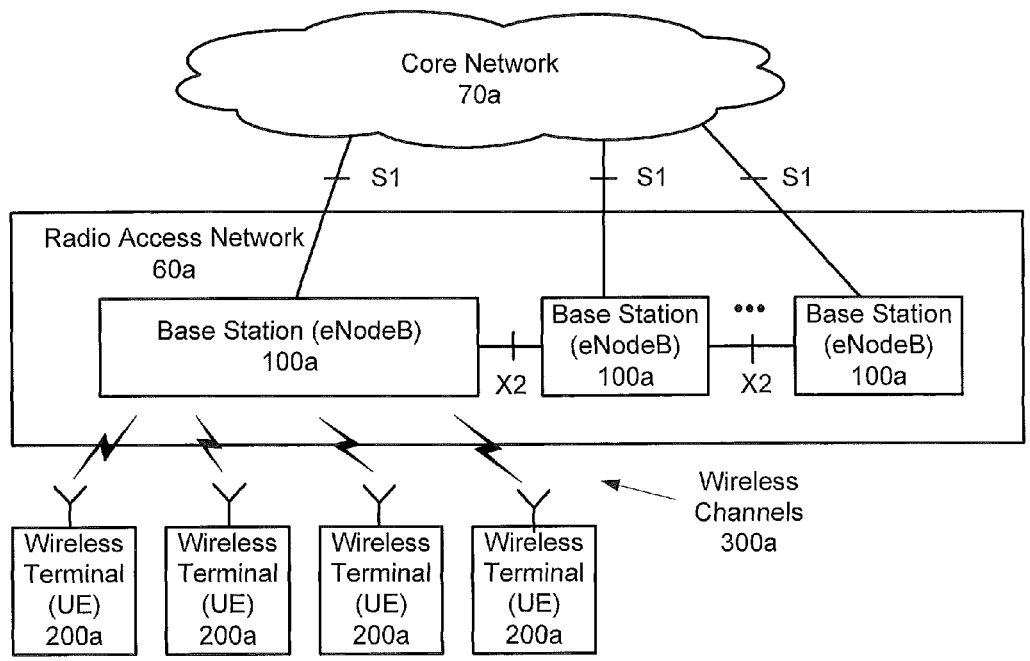
FIGS. 1A and 1B are block diagrams illustrating communication systems that are configured according to some embodiments.

Embodiments of inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

For purposes of illustration and explanation only, these and other embodiments of present inventive concepts are described herein in the context of operating in a RAN (Radio Access Network) that communicates over radio communication channels with wireless terminals (also referred to as UEs). It will be understood, however, that present inventive concepts are not limited to such embodiments and may be embodied generally in any type of communication network. As used herein, a wireless terminal (also referred to as a UE) can include any device that receives data from a communication network, and may include, but is not limited to, a mobile telephone ("cellular" telephone), laptop/portable computer, pocket computer, hand-held computer, and/or desktop computer.

In some embodiments of a RAN, several base stations can be connected (e.g., by landlines or radio channels) to a radio network controller (RNC). The radio network controller, also sometimes termed a base station controller (BSC), supervises and coordinates various activities of the plural base stations connected thereto. The radio network controller is typically connected to one or more core networks.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) technology. UTRAN, short for UMTS Terrestrial Radio Access Network, is a collective term for the Node B's and Radio Network Controllers which make up the UMTS radio access network. Thus, UTRAN is essentially a radio access network using wideband code division multiple access for UEs.

The Third Generation Partnership Project (3GPP) has undertaken to further evolve the UTRAN and GSM based radio access network technologies. In this regard, specifications for the Evolved Universal Terrestrial Radio Access Network (E-UTRAN) are ongoing within 3GPP. The Evolved Universal Terrestrial Radio Access Network (E-UTRAN) comprises the Long Term Evolution (LTE) and System Architecture Evolution (SAE).

Note that although terminology from 3GPP ($3^{rd}$ Generation Partnership Project) HSDPA (High-Speed Downlink Packet Access) is used in this disclosure to exemplify embodiments of present inventive concepts, this should not be seen as limiting the scope of present inventive concepts to only these systems. Other wireless systems, including WCDMA (Wideband Code Division Multiple Access), WiMax (Worldwide Interoperability for Microwave Access), UMB (Ultra Mobile Broadband), LTE (Long Term Evolution), GSM (Global System for Mobile Communications), etc., may also benefit from exploiting embodiments of present inventive concepts disclosed herein.

Also note that terminology such as base station (also referred to as eNodeB or Evolved Node B) and wireless terminal (also referred to as UE or User Equipment) should be considered non-limiting and does not imply a certain hierarchical relation between the two. In general a base station (e.g., an "eNodeB") and a wireless terminal (e.g., a "UE") may be considered as examples of respective different communications devices that communicate with each other over a wireless radio channel. While embodiments discussed herein may focus on wireless transmissions in a downlink from an eNodeB to a UE, embodiments of present inventive concepts may also be applied, for example, in the uplink.

FIG. 1A is a block diagram of a communication system that is configured to operate according to some embodiments of present inventive concepts. An example RAN 60a is shown that may be a Long Term Evolution (LTE) RAN. Radio base stations (e.g., eNodeBs) 100a may be connected directly to one or more core networks 70a. In some embodiments, functionality of a radio network controller(s) may be performed by radio base stations 100a. Radio base stations 100a communicate over wireless channels 300a with wireless terminals (also referred to as user equipment nodes or UEs) 200a that are within their respective communication service cells (also referred to as coverage areas). The radio base stations 100a can communicate with one another through an X2 interface and with the core network(s) 70a through S1 interfaces, as is well known to one who is skilled in the art.

Figure 1B:
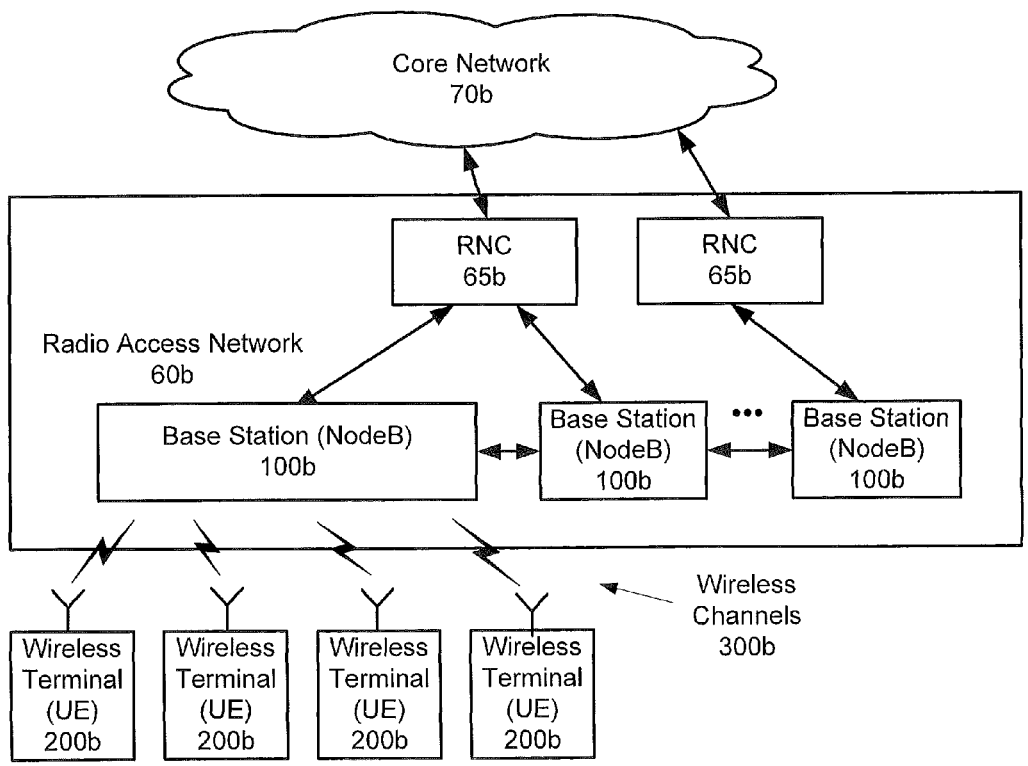

FIG. 1B is a block diagram of a communication system that is configured to operate according to some other embodiments of present inventive concepts. An example RAN 60b is shown that may be a WCDMA RAN. Radio base stations (e.g., NodeBs) 100b may be coupled to core network(s) 70b through one or more radio network controllers (RNCs) 65b. In some embodiments, functionality of a radio network controller(s) may be performed by radio base stations 100b. Radio base stations 100b communicate over wireless channels 300b with wireless terminals (also referred to as user equipment nodes or UEs) 200b that are within their respective communication service cells (also referred to as coverage areas). The radio base stations 100b can communicate with one another and with the core network(s) 70b, as is well known to one who is skilled in the art.

Figure 2:
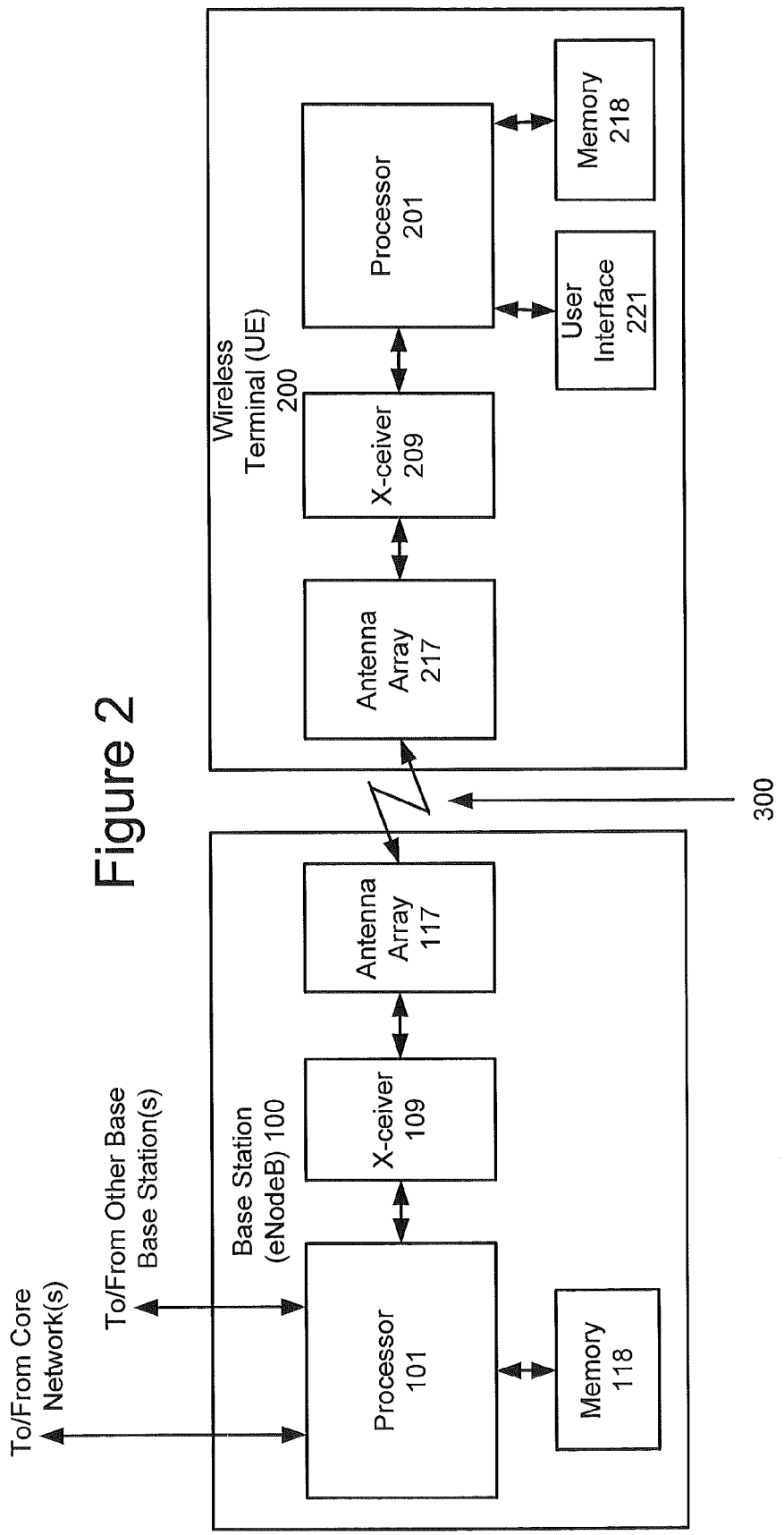
FIG. 2 is a block diagram illustrating a base station and a wireless terminal according to some embodiments of FIG. 1.

FIG. 2 is a block diagram of a base station 100 (e.g., base station 100a and/or 100b) and a wireless terminal 200 (e.g., wireless terminal 200a and/or 200b) of FIGS. 1A and/or 1B in communication over wireless channel 300 (e.g., wireless channel 300a and/or 300b) according to some embodiments of present inventive concepts. As shown, base station 100 may include transceiver 109 coupled between processor 101 and antenna array 117 (including multiple antennas), and memory 118 coupled to processor 101. Moreover, wireless terminal 200 may include transceiver 209 coupled between antenna array 217 and processor 201, and user interface 221 and memory 218 may be coupled to processor 201. Accordingly, base station processor 101 may transmit communications through transceiver 109 and antenna array 117 for reception at wireless terminal processor 201 through antenna array 217 and transceiver 209. In the other direction, wireless terminal processor 201 may transmit communications through transceiver 209 and antenna array 217 for reception at base station processor 101 through antenna array 117 and transceiver 109. To support up to 4-branch MIMO (allowing parallel transmission of 4 layers/streams of data using a same TFRE), each of antenna arrays 117 and 217 may include four (or more) antenna elements. Wireless terminal 200 of FIG. 2, for example, may be a cellular radiotelephone, a smart phone, a laptop/netbook/tablet/handheld computer, or any other device providing wireless communications. User interface 211, for example, may include a visual display such as a liquid crystal display, a touch sensitive visual display, a keypad, a speaker, a microphone, etc. As used herein, the term time-frequency-resource-element (TFRE) may refer to a time-frequency-code-resource-element.

For MIMO downlink transmissions from RAN 60 to wireless terminal 200, a codebook of precoding vectors (known at both RAN 60 and wireless terminal 200) is used to precode (e.g., to apply precoding weights to) the different MIMO data layers (data streams) that are transmitted in parallel from a sector antenna array(s) to the wireless terminal 200 during a same TFRE, and to decode the MIMO data layers (data streams) received in parallel during the same TFRE at wireless terminal 200. The same codebook of precoding vectors may be stored in wireless terminal memory 218 and in base station memory 118. Moreover, wireless terminal 200 may estimate characteristics of each downlink channel to generate channel quality information (CQI), and CQI feedback from wireless terminal 200 may be transmitted to base station 100. This CQI feedback may then be used by the base station processor 101 to select: transmission rank (i.e., a number of data layers/streams to be transmitted during a subsequent TFRE); transport data block length(s); channel code rate(s) to be used to channel encode different transport data blocks; modulation order(s); symbol to layer mapping schemes; and/or precoding vectors for respective downlink transmissions to the wireless terminal 200.

By way of example, base station antenna array 117 may include 4 antennas, and wireless terminal antenna array 217 may include four antennas so that wireless terminal 200 may receive up to four downlink data layers (data streams) from base station antenna array 117 during MIMO communications. In this example, the precoding codebook may include rank 1 precoding vectors (used when transmitting one downlink data stream from a base station sector antenna array 117 to wireless terminal 200), rank 2 precoding vectors (used when transmitting two downlink data streams from a base station sector antenna array 117 to wireless terminal 200), rank 3 precoding vectors (used when transmitting three downlink data streams from a base station sector antenna array 117 to wireless terminal 200), and rank 4 precoding vectors (used when transmitting four downlink data streams from a base station sector antenna array 117 to wireless terminal 200). Precoding vectors may also be referred to, for example, as codebook entries, precoding codewords, and/or precoding matrices.

Figure 3:
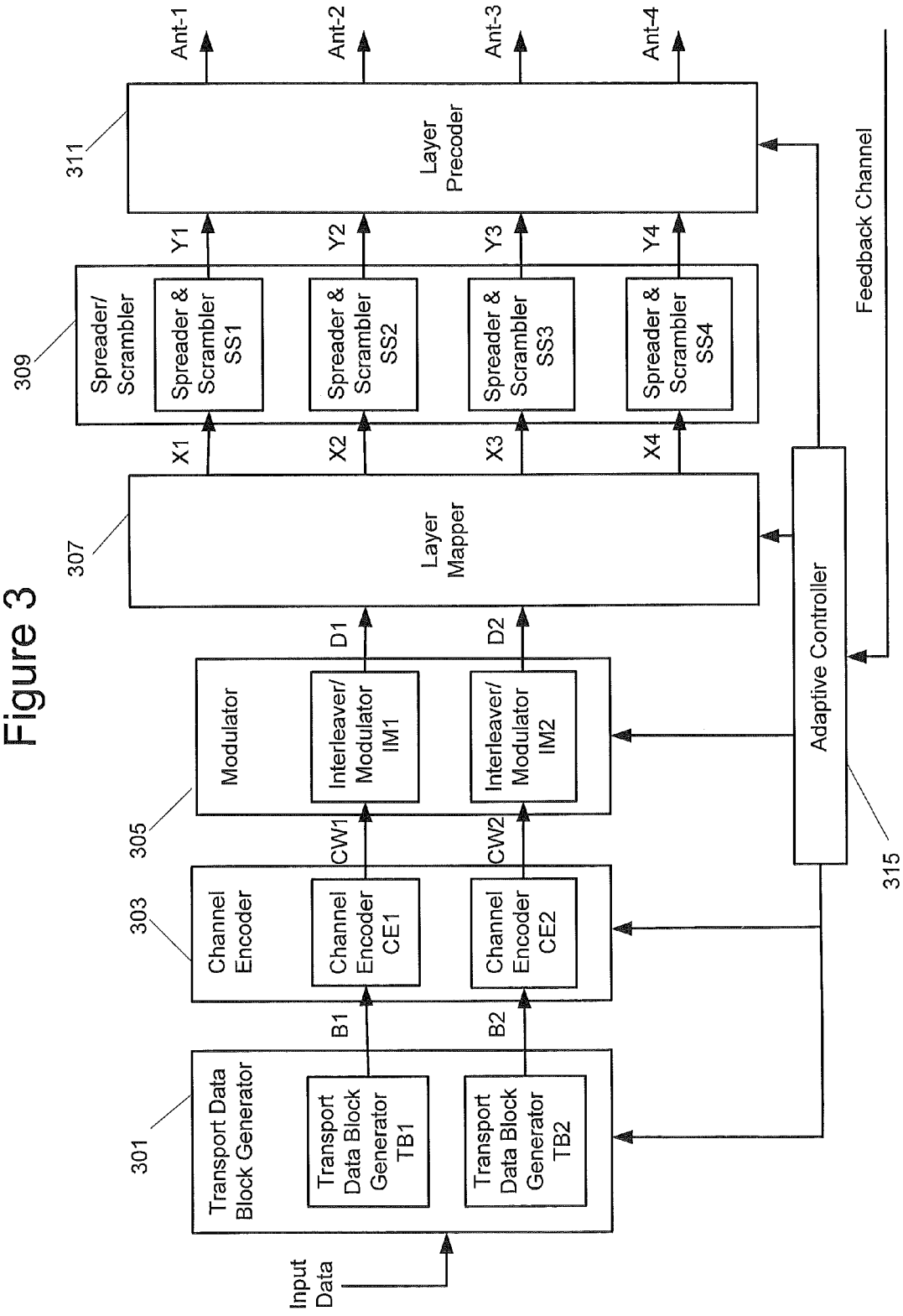
FIGS. 3 and 4 are a block diagrams illustrating elements/operations/functionalities of base station processors and/or transceivers according to some embodiments of FIG. 2.

FIG. 3 is block diagram illustrating elements/functionalities of base station processor 101 and/or transceiver 109 of FIG. 2 according to some embodiments. According to embodiments of FIG. 3, functionality of two channel encoders CE1 and CE2 may be provided for two streams of transport data blocks B1 and B2, with symbols of the two data streams being mapped to as many as four different MIMO data streams. As shown, processor 101 may include transport data block generator 301, channel encoder 303, modulator 305, layer mapper 307, spreader/scrambler 309, and layer precoder 311. In embodiments of FIG. 3, channel encoder 303 may include channel encoders CE1 and CE2 for the two streams of transport data blocks B1 and B2, modulator 305 may include interleavers/modulators IM1 and IM2, and layer mapper 307 may be configured to map resulting symbols of the two streams to as many as four different MIMO layers (streams) X1, X2, X3, and X4 as discussed in greater detail below. Moreover, adaptive controller 315 may be configured to control transport data block generator 301, channel encoder 303, modulator 305, layer mapper 307, and/or layer precoder 311 responsive to channel quality information (CQI) received as feedback from wireless terminal 200. Accordingly, symbols generated responsive to 2 codewords respectively generated by channel encoders CE1 and CE2 using different channel coding characteristics (determined by adaptive controller 315 responsive to wireless terminal 200 feedback) may be distributed (mapped) to 4 different MIMO layers. More generally, symbols generated responsive to a single codeword may be split between different MIMO layers.

Base station processor 101, for example, may receive input data (e.g., from core network 70, from another base station, etc.) for transmission to wireless terminal 200, and transport data block generator 301 (including transport data block data generators TB1 and TB2) may separate the input data into a plurality of different data blocks (comprising respective data bits). More particularly, for rank 1 transmissions (providing only 1 MIMO layer/stream), all input data may be processed through transport data block generator TB1 to provide a single stream of transport data blocks B1 (including individual transport data blocks b1-1, b1-2, b1-3, etc.) without using transport data block generator TB2 and without generating a second stream of transport data blocks B2. For rank 2 transmissions (providing 2 MIMO layers/streams), rank 3 transmissions (providing 3 MIMO layers/streams), and rank 4 transmissions (providing 4 MIMO layers/streams), transport data block generator TB1 may generate a stream of transport data blocks B1 (including individual transport data blocks b1-1, b1-2, b1-3, etc.), and transport data block generator TB2 may generate a stream of transport data blocks B2 (including individual transport data blocks b2-1, b2-2, b2-3, etc.).

Channel encoder 303 (including channel encoders CE1 and CE2) may encode the stream/streams of data blocks B1 and/or B2 generated by transport data block generator 301 to provide respective streams of data codewords CW1 (including individual data codewords cw1-1, cw1-2, cw1-3, etc.) and CW2 (including individual data codewords cw2-1, cw2-2, cw2-3, etc.), for example, using turbo coding, convolutional coding, etc. Moreover, coding characteristics (e.g., coding rates) applied by channel encoders CE1 and CE2 may be separately determined by adaptive controller 315 responsive to wireless terminal 200 feedback (e.g., CQI regarding the downlink channel). For rank 1 transmissions, channel encoder 303 may generate a single stream of data codewords CW1 responsive to the stream of data blocks B1 using only channel encoder CE1. For rank 2, rank 3, and rank 4 transmissions, channel encoder 303 may generate two streams of data codewords CW1 and CW2 responsive to respective streams of data blocks B1 and B2 using channel encoder CE1 and channel encoder CE2. According to some embodiments, channel encoders CE1 and CE2 may apply different coding characteristics (e.g., different coding rates) during rank 2, rank 3, and rank 4 transmissions to generate respective (differently coded) data codewords cw1-1 and cw2-1 including data to be transmitted during a same TFRE.

Modulator 305 (including interleaver/modulator IM1 and interleaver/modulator IM2) may interleave and modulate the stream/streams of data codewords CW1 and/or CW2 generated by channel encoder 303 to provide respective streams of unmapped symbol blocks D1 (including unmapped symbol blocks d1-1, d1-2, d1-3, etc.) and D2 (including unmapped symbol blocks d2-1, d2-2, d2-3, etc.). For rank 1 transmissions (providing only 1 MIMO layer/stream), modulator 305 may generate a single stream of unmapped symbol blocks D1 responsive to the stream of data codewords CW1 using only interleaver/modulator IM1. For rank 2, rank 3, and rank 4 transmissions, modulator 305 may generate two streams of unmapped symbol blocks D1 and D2 responsive to respective streams of data codewords CW1 and CW2 using interleaver/modulator IM1 and interleaver/modulator IM2. Modulator 305 may apply modulation orders responsive to input from adaptive controller 315 determined based on CQI feedback from wireless terminal 200.

In addition, each interleaver/modulator IM1 and/or IM2 may interleave data of two or more codewords of a respective stream so that two or more unmapped symbol blocks of a stream include symbols representing data of the two or more codewords. For example, data of consecutive data codewords cw1-1 and cw1-2 of data codeword stream CW1 may be interleaved and modulated to provide consecutive unmapped symbol blocks d1-1 and d1-2 of stream D1. Similarly, data of consecutive data codewords cw2-1 and cw2-2 of data codeword stream CW2 may be interleaved and modulated to provide consecutive unmapped symbol blocks d2-1 and d2-2 of stream D2.

Symbols of streams of unmapped symbol blocks D1 and D2 may be mapped to respective streams of mapped symbol blocks X1, X2, X3, and X4, as discussed in greater detail below. For rank one transmissions, all input data may be processed through transport data block generator TB1 to provide a single stream of transport data blocks B1, the single stream of transport data blocks may be encoded using channel encoder CE1 to provide a single stream of data codewords CW1, and the single stream of codewords may be interleaved/modulated using interleaver and modulator IM1 to provide a single stream of unmapped symbol blocks D1. Symbols of the single stream of unmapped symbol blocks D1 may be mapped to a single stream of mapped symbol blocks X1 (including mapped symbol blocks x1-1, x1-2, x1-3, etc.). Each unmapped symbol block d and each mapped symbol block x, for example, may include M symbols such that each unmapped symbol block d includes symbols d(i) and each mapped symbol block x includes symbols x(i), where i=1 to M. With rank 1 transmissions, symbols d1-1(i) of unmapped symbol block d1-1 may thus map directly to symbols x1-1(i)

of mapped symbol block x1-1, symbols d1-2(i) of unmapped symbol block d1-2 may map directly to symbols x1-2(i) of mapped symbol block x1-2, symbols d1-3(i) of unmapped symbol block d1-3 may map directly to symbols x1-3(i) of mapped symbol block x1-3, etc.

Stated in other words, for rank 1 transmissions, x1-$j$(i)=d1-$j$(i), where j identifies the block of the stream of unmapped symbol blocks D1 and mapped symbol blocks X1. With rank one transmissions, only one stream of unmapped symbol blocks D1 and only one stream of mapped symbol blocks X1 may be used for the single layer MIMO transmissions. Spreader & scrambler 309 may include a plurality of spreaders/scramblers SS1, SS2, SS3, and SS4, but with only one stream of mapped symbol blocks X1 for one layer MIMO transmission, only one spreader/scrambler SS1 is used to spread/scramble the stream of mapped symbol blocks (e.g., using a Walsh code) to provide a stream of spread symbols blocks Y1 (including spread symbol blocks y1-1, y1-2, y1-3, etc.), and layer precoder 311 may apply a rank 1 MIMO precoding vector to precode (e.g., to apply precoding weights to) the stream of spread symbol blocks Y1 for transmission through transceiver 109 and antennas Ant-1, Ant-2, Ant-3, and Ant-4 of antenna array 117.

For rank two transmissions, input data may be processed through transport data block generators TB1 and TB2 to provide two streams of transport data blocks B1 and B2, the two streams of transport data blocks may be encoded using channel encoders CE1 and CE2 (e.g., using different coding characteristics/rates) to provide two streams of data codewords CW1 and CW2, and the two streams of codewords may be interleaved/modulated using interleavers/modulators IM1 and IM2 to provide two streams of unmapped symbol blocks D1 and D2. Symbols of the two streams of unmapped symbol blocks D1 and D2 may be mapped to respective streams of mapped symbol blocks X1 (including mapped symbol blocks x1-1, x1-2, x1-3, etc.) and X2 (including mapped symbol blocks x1-1, x1-2, x1-3, etc.). Each unmapped symbol block d of streams D1 and D2 and each mapped symbol block x of streams X1 and X2, for example, may include M symbols such that each unmapped symbol block d includes symbols d(i) and each mapped symbol block x includes symbols x(i), where i=1 to M. With rank 2 transmissions: symbols d1-1(i) of unmapped symbol block d1-1 may map directly to symbols x1-1(1) of mapped symbol block x1-1, and symbols d2-1(i) of unmapped symbol block d2-1 may map directly to symbols x2-1(i) of mapped symbol block x2-1; symbols d1-2(i) of unmapped symbol block d1-2 may map directly to symbols x1-2(i) of mapped symbol block x1-2, and symbols d2-2(i) of unmapped symbol block d2-2 may map directly to symbols x2-2(i) of mapped symbol block x2-2; symbols d1-3(i) of unmapped symbol block d1-3 may map directly to symbols x1-3(i) of mapped symbol block x1-3, and symbols d2-3(i) of unmapped symbol block d2-3 may map directly to symbols x2-3(i) of mapped symbol block x2-3; etc.

Stated in other words, for rank 2 transmissions, x1-$j$(i)=d1-$j$(i), and x2-$j$(i)=d2-$j$(i), where j identifies the block of the stream of unmapped symbol blocks D1/D2 and mapped symbol blocks X1/X2. With rank two transmissions, only two streams of unmapped symbol blocks D1 and D2 and only two streams of mapped symbol blocks X1 and X2 may be used for the two layer MIMO transmissions. Spreader/scrambler 309 may include a plurality of spreaders/scramblers SS1, SS2, SS3, and SS4, but with only two streams of mapped symbol blocks X1 and X2, only two spreader/scramblers SS1 and SS2 are used to spread/scramble the two streams of mapped symbol blocks (e.g., using a Walsh code) to provide streams of spread symbols blocks Y1 (including spread symbol blocks y1-1, y1-2, y1-3, etc.) and Y2 (including spread symbol blocks y2-1, y2-2, y2-3, etc.), and layer precoder 311 may apply a rank 2 MIMO precoding vector to precode (e.g., to apply precoding weights to) the streams of spread symbol blocks Y1 and Y2 for transmission through transceiver 109 and antennas Ant-1, Ant-2, Ant-3, and Ant-4 of antenna array 117.

For rank three transmissions, input data may be processed through transport data block generators TB1 and TB2 to provide two streams of transport data blocks B1 and B2. Because the input data will be transmitted using three MIMO transmission layers, transport data block generator 301 may bundle transport block data so that transport data blocks of one of streams B1 or B2 may include data of two conventional data blocks. The two streams of transport data blocks B1 and B2 may be encoded using channel encoders CE1 and CE2 (e.g., using different coding characteristics/rates) to provide two streams of data codewords CW1 and CW2, and the two streams of codewords may be interleaved/modulated using interleavers/modulators IM1 and IM2 to provide two streams of unmapped symbol blocks D1 and D2.

Symbols of one of the streams of unmapped symbol blocks may be mapped to a single one of the streams of mapped symbol blocks, and symbols of the other of the streams of unmapped symbol blocks may be mapped to two other streams of mapped symbol blocks. For example, symbols from the stream of unmapped symbol blocks D1 may be mapped directly to symbols of the stream of mapped symbol blocks X1, and symbols of the stream of unmapped symbol blocks D2 may be split between streams of mapped symbol blocks X2 and X3; or symbols from the stream of unmapped symbol blocks D2 may be mapped directly to symbols of the stream of mapped symbol blocks X2, and symbols of the stream of unmapped symbol blocks D1 may be split between streams of mapped symbol blocks X1 and X3; or symbols from the stream of unmapped symbol blocks D2 may be mapped directly to symbols of the stream of mapped symbol blocks X3, and symbols of the stream of unmapped symbol blocks D1 may be split between streams of mapped symbol blocks X1 and X2.

Stated in other words, for rank 3 transmissions mappings from unmapped to mapped symbol blocks may be provided according to one of the following options.

FIG. 3, Rank 3, Option 1 x1-$j$(i)=d1-$j$(i);

x2-$j$(i)=d2-$j$(2i); and x3-$j$(i)=d2-$j$(2i+1).

According to Option 1, symbols of unmapped blocks d1-$j$ from stream D1 map directly to symbols of mapped blocks x1-$j$ of stream X1, even symbols of unmapped blocks d2-$j$ from stream D2 map to symbols of mapped blocks x2-$j$ of stream X2, and odd symbols of unmapped blocks d2-$j$ from stream D2 map to symbols of mapped blocks x3-$j$ of stream X3.

FIG. 3, Rank 3, Option 2 x2-$j$(i)=d2-$j$(i);

x1-$j$(i)=d1-$j$(2i); and x3-$j$(i)=d1-$j$(2i+1).

According to Option 2, symbols of unmapped blocks d2-$j$ from stream D2 map directly to symbols of mapped blocks x2-$j$ of stream X2, even symbols of unmapped blocks d1-$j$ from stream D1 map to symbols of mapped blocks x1-$j$ of stream X1, and odd symbols of unmapped blocks d1-$j$ from stream D1 map to symbols of mapped blocks x3-$j$ of stream X3.

FIG. 3, Rank 3, Option 3 x3-$j$(i)=d2-$j$(i);

x1-$j$(i)=d1-$j$(2i); and x2-$j$(i)=d1-$j$(2i+1).

According to Option 3, symbols of unmapped blocks d2-j from stream D2 map directly to symbols of mapped blocks x3-j of stream X3, even symbols of unmapped blocks d1-j from stream D1 map to symbols of mapped blocks x1-j of stream X1, and odd symbols of unmapped blocks d1-j from stream D1 map to symbols of mapped blocks x2-j of stream X2.

With rank three transmissions, only two streams of unmapped symbol blocks D1 and D2 and are mapped to three streams of mapped symbol blocks X1, X2, and X3 for three layer MIMO transmissions. Spreader/scrambler 309 may include a plurality of spreaders/scramblers SS1, SS2, SS3, and SS4, but with only three streams of mapped symbol blocks X1, X2, and X3 for three MIMO transmission layers, only three spreader/scramblers SS1 and SS2 are used to spread/scramble the three streams of mapped symbol blocks (e.g., using a Walsh code) to provide streams of spread symbols blocks Y1 (including spread symbol blocks y1-1, y1-2, y1-3, etc.), Y2 (including spread symbol blocks y2-1, y2-2, y2-3, etc.), and Y3 (including spread symbol blocks y3-1, y3-2, y3-3, etc.). Layer precoder 311 may apply a rank 3 MIMO precoding vector to precode (e.g., to apply precoding weights to) the streams of spread symbol blocks Y1, Y2, and Y3 for transmission through transceiver 109 and antennas Ant-1, Ant-2, Ant-3, and Ant-4 of antenna array 117.

For rank four transmissions, input data may be processed through transport data block generators TB1 and TB2 to provide two streams of transport data blocks B1 and B2. Because the input data will be transmitted using four MIMO transmission layers, transport data block generator 301 may bundle transport block data so that transport data blocks of both of streams B1 and B2 may include data of two conventional data blocks. The two streams of transport data blocks B1 and B2 may be encoded using channel encoders CE1 and CE2 (e.g., using different coding characteristics/rates) to provide two streams of data codewords CW1 and CW2, and the two streams of codewords may be interleaved/modulated using interleavers/modulators IM1 and IM2 to provide two streams of unmapped symbol blocks D1 and D2.

Symbols of both streams of unmapped symbol blocks may be mapped to respective different pairs of streams of mapped symbol blocks. For example, symbols from the stream of unmapped symbol blocks D1 may be split between streams of mapped symbol blocks X1 and X3, and symbols of the stream of unmapped symbol blocks D2 may be split between streams of mapped symbol blocks X2 and X4; or symbols from the stream of unmapped symbol blocks D1 may be split between streams of mapped symbol blocks X1 and X4, and symbols of the stream of unmapped symbol blocks D2 may be split between streams of mapped symbol blocks X2 and X3; or symbols from the stream of unmapped symbol blocks D1 may split between streams of mapped symbol blocks X1 and X2, and symbols of the stream of unmapped symbol blocks D2 may be split between streams of mapped symbol blocks X3 and X4.

Stated in other words, for rank 4 transmissions mappings from unmapped to mapped symbol blocks may be provided according to one of the following options.

FIG. 3, Rank 4, Option 1
x1-$j$(i)=d1-$j$(2$i$);
x3-$j$(i)=d1-$j$(2$i$+1);
x2-$j$(i)=d2-$j$(2$i$); and
x4-$j$(i)=d2-$j$(2$i$+1).

According to Option 1, even symbols of unmapped blocks d1-$j$ from stream D1 map to symbols of mapped blocks x1-$j$ of stream X1, odd symbols of unmapped blocks d1-$j$ from stream D1 map to symbols of mapped blocks x3-$j$ of stream X3, even symbols of unmapped blocks d2-$j$ from stream D2 map to symbols of mapped blocks x2-$j$ of stream X2, and odd symbols of unmapped blocks d2-$j$ from stream D2 map to symbols of mapped blocks x4-$j$ of stream X4.

FIG. 3, Rank 4, Option 2
x1-$j$(i)=d1-$j$(2$i$);
x4-$j$(i)=d1-$j$(2$i$+1);
x3-$j$(i)=d2-$j$(2$i$); and
x2-$j$(i)=d2-$j$(2$i$+1).

According to Option 2, even symbols of unmapped blocks d1-$j$ from stream D1 map to symbols of mapped blocks x1-$j$ of stream X1, odd symbols of unmapped blocks d1-$j$ from stream D1 map to symbols of mapped blocks x4-$j$ of stream X4, even symbols of unmapped blocks d2-$j$ from stream D2 map to symbols of mapped blocks x3-$j$ of stream X3, and odd symbols of unmapped blocks d2-$j$ from stream D2 map to symbols of mapped blocks x2-$j$ of stream X2.

FIG. 3, Rank 4, Option 3
x1-$j$(i)=d1-$j$(2$i$);
x2-$j$(i)=d1-$j$(2$i$+1);
x3-$j$(i)=d2-$j$(2$i$); and
x4-$j$(i)=d2-$j$(2$i$+1).

According to Option 3, even symbols of unmapped blocks d1-$j$ from stream D1 map to symbols of mapped blocks x1-$j$ of stream X1, odd symbols of unmapped blocks d1-$j$ from stream D1 map to symbols of mapped blocks x2-$j$ of stream X2, even symbols of unmapped blocks d2-$j$ from stream D2 map to symbols of mapped blocks x3-$j$ of stream X3, and odd symbols of unmapped blocks d2-$j$ from stream D2 map to symbols of mapped blocks x4-$j$ of stream X4.

With rank four transmissions, only two streams of unmapped symbol blocks D1 and D2 and are mapped to four streams of mapped symbol blocks X1, X2, X3, and X4 for four layer MIMO transmissions. Spreader & scrambler 309 may use spreaders/scramblers SS1, SS2, SS3, and SS4 to spread/scramble the four streams of mapped symbol blocks (e.g., using a Walsh code) to provide streams of spread symbols blocks Y1 (including spread symbol blocks y1-1, y1-2, y1-3, etc.), Y2 (including spread symbol blocks y2-1, y2-2, y2-3, etc.), Y3 (including spread symbol blocks y3-1, y3-2, y3-3, etc.), and Y4 (including spread symbol blocks y4-1, y4-2, y4-3, etc.). Layer precoder 311 may apply a rank 4 MIMO precoding vector to precode (e.g., to apply precoding weights to) the streams of spread symbol blocks Y1, Y2, Y3, and Y4 for transmission through transceiver 109 and antennas Ant-1, Ant-2, Ant-3, and Ant-4 of antenna array 117.

According to embodiments discussed above with respect to FIG. 3, CQI feedback information from wireless terminal 200 may be reduced thereby reducing traffic over a feedback channel from wireless terminal 200 to base station 100. By using only two transport block generators TB1 and TB2 so that transport blocks are bundled at the bit level for rank 3 and rank 4 transmissions, CQI feedback used to define transport block length may be reduced. By using only two channel encoders CE1 and CE2 to support 3 and 4 layer MIMO transmissions (rank 3 and rank 4 transmissions), CQI feedback used to define channel code rates may be reduced. By using only two interleavers/modulators IM1 and IM2 to support 3 and 4 layer MIMO transmissions, CQI feedback used to define modulation orders may be reduced.

According to some embodiments of FIG. 3, layer mapper 307 may apply fixed mapping functions (known to both base station 100 and wireless terminal 200) for rank 3 and rank 4 transmissions. For Rank 3 transmission, for example, layer mapper 307 may always use the rank 3 option 1 mapping such that x1-$j$(i)=d1-$j$(i), x2-$j$(i)=d2-$j$(2$i$), and x3-$j$(i)=d2-$j$(2$i$+1), and for Rank 4 transmission, layer mapper 307 may always use the rank 4 option 1 mapping such that $x1\text{-}j(i)=d1\text{-}j(2i)$, $x3\text{-}j(i)=d1\text{-}j(2i+1)$, $x2\text{-}j(i)=d2\text{-}j(2i)$, and $x4\text{-}j(i)=d2\text{-}j(2i+1)$. Using fixed mappings may reduce control channel traffic that may otherwise be needed to signal mapping selections/recommendations between base station 100 and wireless terminal 200.

According to some other embodiments of FIG. 3, mapping functions for rank 3 and rank 4 transmissions may be dynamically selected. Wireless terminal processor 201, for example, may select from a plurality of mapping function options (e.g., one of options 1-3 for rank 3 or one of options 1-3 for rank 4 as discussed above), and this selection may be identified in CQI feedback that is transmitted to base station 100 for a subsequent downlink transmission. More particularly, a rank selection may be included in the CQI feedback, and an additional 2 bit code may be used to identify one of options 1-3 for rank 3 transmissions or one of options 1-3 for rank 4 transmissions. Wireless terminal processor 201 may thus chose a mapping option to increase a quality and/or rate of data transmission over the downlink. According to other embodiments, adaptive controller 315 may select the mapping option for rank 3 and rank 4 transmissions, and the selection may be signaled to wireless terminal 200.

Figure 4:
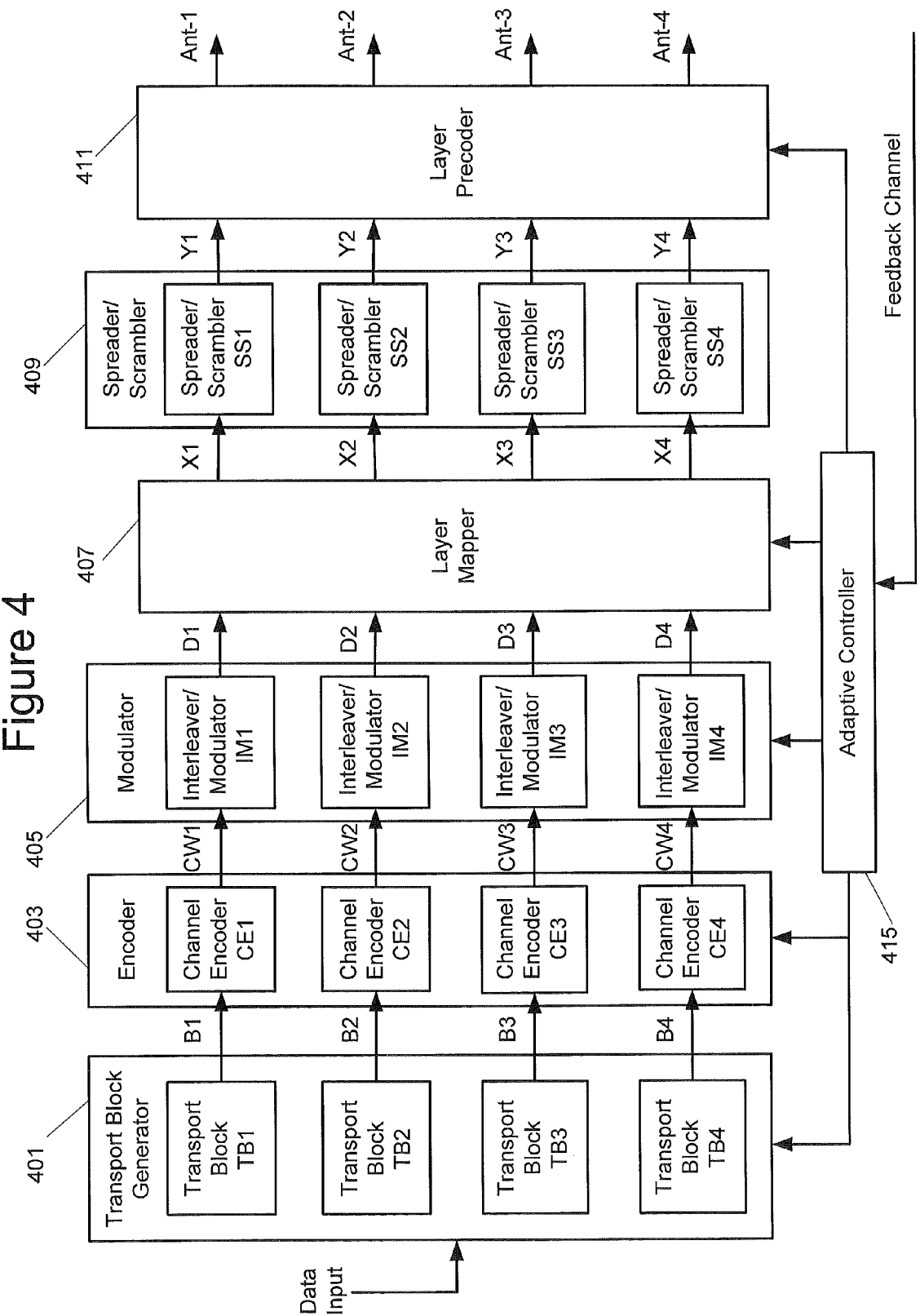

FIG. 4 is block diagram illustrating elements/functionalities of base station processor 101 and/or transceiver 109 of FIG. 2 according to some other embodiments. According to embodiments of FIG. 4, functionality of four channel encoders CE1, CE2, CE3, and CE4 may be provided for four streams of transport data blocks B1, B2, B3, and B4, with symbols of the four data streams being mapped to as many as four different data streams. As shown, processor 101 and/or transceiver 109 may include/provide functionality of transport data block generator 401, channel encoder 403, modulator 405, layer mapper 407, spreader/scrambler 409, and layer precoder 411. In embodiments of FIG. 4, channel encoder 403 may include/provide functionality of channel encoders CE1, CE2, CE3, and CE4 for the four streams of transport data blocks B1, B2, B3, and B4, modulator 405 may include/provide functionality of interleavers/modulators IM1, IM2, IM3, and IM4, and layer mapper 407 may be configured to map resulting symbols of the four streams to as many as four different MIMO layers (streams) X1, X2, X3, and X4 as discussed in greater detail below. Moreover, adaptive controller 415 may be configured to control transport data block generator 401, channel encoder 403, modulator 405, layer mapper 407, and/or layer precoder 411 responsive to channel quality information (CQI) received as feedback from wireless terminal 200. Accordingly, symbols generated responsive to codewords respectively generated by channel encoders CE1, CE2, CE3, and CE4 using different channel coding (determined by adaptive controller 415 responsive to wireless terminal 200 feedback) may be interleaved and distributed (mapped) to 4 different MIMO layers. More particularly, symbols generated responsive to two codewords may be interleaved and then split between two different MIMO layers.

Base station processor 101, for example, may receive input data (e.g., from core network 70, from another base station, etc.) for transmission to wireless terminal 200, and transport data block generator 401 (including transport data block data generators TB1, TB2, TB3, and TB4) may provide a single stream of data blocks (for rank 1 transmissions) or separate the input data into a plurality of different streams of data blocks (for rank 2, rank 3, and rank 4 transmission). More particularly, for rank 1 transmissions (providing only 1 MIMO layer/stream), all input data may be processed through transport data block generator TB1 to provide a single stream of transport data blocks B1 (including individual transport data blocks b1-1, b1-2, b1-3, etc.) without using transport data block generators TB2, TB3, or TB4 and without generating other streams of transport data blocks B2, B3, or B4. For rank 2 transmissions (providing 2 MIMO layers/streams), transport data block generator TB1 may generate a stream of transport data blocks B1 (including individual transport data blocks b1-1, b1-2, b1-3, etc.), and transport data block generator TB2 may generate a stream of transport data blocks B2 (including individual transport data blocks b2-1, b2-2, b2-3, etc.) without using transport data block generators TB3 or TB4 and without generating other streams of transport data blocks B3 or B4. For rank 3 transmissions (providing 3 MIMO layers/streams), transport data block generator TB1 may generate a stream of transport data blocks B1 (including individual transport data blocks b1-1, b1-2, b1-3, etc.), transport data block generator TB2 may generate a stream of transport data blocks B2 (including individual transport data blocks b2-1, b2-2, b2-3, etc.), and transport data block generator TB3 may generate a stream of transport data blocks B3 (including individual transport data blocks b3-1, b3-2, b3-3, etc.), without using transport data block generator TB4 and without generating another stream of transport data blocks B4. For rank 4 transmissions (providing 4 MIMO layers/streams), transport data block generator TB1 may generate a stream of transport data blocks B1 (including individual transport data blocks b1-1, b1-2, b1-3, etc.), transport data block generator TB2 may generate a stream of transport data blocks B2 (including individual transport data blocks b2-1, b2-2, b2-3, etc.), transport data block generator TB3 may generate a stream of transport data blocks B3 (including individual transport data blocks b3-1, b3-2, b3-3, etc.), and transport data block generator TB4 may generate a stream of transport data blocks B4 (including individual transport data blocks b4-1, b4-2, b4-3, etc.).

Channel encoder 403 (including channel encoders CE1, CE2, CE3, and CE4) may encode the stream/streams of data blocks B1, B2, B3, and/or B4 generated by transport data block generator 401 to provide respective streams of data codewords CW1 (including individual data codewords cw1-1, cw1-2, cw1-3, etc.), CW2 (including individual data codewords cw2-1, cw2-2, cw2-3, etc.), CW3 (including individual data codewords cw3-1, cw3-2, cw3-3, etc.), and/or CW4 (including individual data codewords cw4-1, cw4-2, cw4-3, etc.), for example, using turbo coding, convolutional coding, etc. Moreover, coding characteristics (e.g., coding rates) applied by channel encoders CE1, CE2, CE3, and CE4 may be separately determined by adaptive controller 415 responsive to wireless terminal 200 feedback (e.g., CQI regarding the downlink channel). For rank 1 transmissions, channel encoder 403 may generate a single stream of data codewords CW1 responsive to the stream of data blocks B1 using only channel encoder CE1. For rank 2 transmissions, channel encoder 403 may generate two streams of data codewords CW1 and CW2 responsive to respective streams of data blocks B1 and B2 using channel encoder CE1 and channel encoder CE2. For rank 3 transmissions, channel encoder 403 may generate three streams of data codewords CW1, CW2, and CW3 responsive to respective streams of data blocks B1, B2, and B3 using channel encoder CE1, channel encoder CE2, and channel encoder CE3. For rank 4 transmissions, channel encoder 403 may generate four streams of data codewords CW1, CW2, CW3, and CW4 responsive to respective streams of data blocks B1, B2, B3, and B4 using channel encoder CE1, channel encoder CE2, channel encoder CE3, and channel encoder CW4. According to some embodiments, channel encoders CE1, CE2, CE3, and/or CE4 may apply different coding characteristics (e.g., different coding rates) during rank 2, rank 3, and/or rank 4 transmissions to generate respective (differently coded) data codewords cw1-1, cw2-1, cw3-1, and/or cw4-1 including data to be transmitted during a same TFRE.

Modulator 405 (including interleaves/modulators IM1, IM2, IM3, and IM4) may interleave and modulate the stream/streams of data codewords CW1, CW2, CW3, and/or CW4 generated by channel encoder 403 to provide respective streams of unmapped symbol blocks D1 (including unmapped symbol blocks d1-1, d1-2, d1-3, etc.), D2 (including unmapped symbol blocks d2-1, d2-2, d2-3, etc.), D3 (including unmapped symbol blocks d3-1, d3-2, d3-3, etc.), and/or D4 (including unmapped symbol blocks d4-1, d4-2, d4-3, etc.). For rank 1 transmissions (providing only 1 MIMO layer/stream), modulator 405 may generate a single stream of unmapped symbol blocks D1 responsive to the stream of data codewords CW1 using only interleaver/modulator IM1. For rank 2 transmissions, modulator 405 may generate two streams of unmapped symbol blocks D1 and D2 responsive to respective streams of data codewords CW1 and CW2 using interleaver/modulators IM1 and IM2. For rank 3 transmissions, modulator 405 may generate three streams of unmapped symbol blocks D1, D2, and D3 responsive to respective streams of data codewords CW1, CW2, and CW3 using interleaver/modulators IM1, IM2, and IM3. For rank 4 transmissions, modulator 405 may generate four streams of unmapped symbol blocks D1, D2, D3, and D4 responsive to respective streams of data codewords CW1, CW2, CW3, and CW4 using interleaver/modulators IM1, IM2, IM3, and IM4. Modulator 405 may apply modulation orders responsive to input from adaptive controller 315 determined based on CQI feedback from wireless terminal 200.

In addition, each interleaver/modulator IM1, IM2, IM3, and/or IM4 may interleave data of two or more codewords of a stream so that two or more consecutive unmapped symbol blocks of a respective stream include symbols representing data of the two or more consecutive codewords. For example, data of consecutive data codewords cw1-1 and cw1-2 of data codeword stream CW1 may be interleaved and modulated to provide consecutive unmapped symbol blocks d1-1 and d1-2 of stream D1. Similarly, data of consecutive data codewords cw2-1 and cw2-2 of data codeword stream CW2 may be interleaved and modulated to provide consecutive unmapped symbol blocks d2-1 and d2-2 of stream D2; data of consecutive data codewords cw3-1 and cw3-2 of data codeword stream CW3 may be interleaved and modulated to provide consecutive unmapped symbol blocks d3-1 and d3-2 of stream D3; and/or data of consecutive data codewords cw4-1 and cw4-2 of data codeword stream CW4 may be interleaved and modulated to provide consecutive unmapped symbol blocks d4-1 and d4-2 of stream D4.

Symbols of streams of unmapped symbol blocks D1, D2, D3, and D4 may be mapped to respective streams of mapped symbol blocks X1, X2, X3, and X4 (for respective MIMO transmission layers), as discussed in greater detail below. For rank one transmissions, all input data may be processed through transport data block generator TB1 to provide a single stream of transport data blocks B1, the single stream of transport data blocks may be encoded using channel encoder CE1 to provide a single stream of data codewords CW1, and the single stream of data codewords may be interleaved/modulated using interleaver/modulator IM1 to provide a single stream of unmapped symbol blocks D1. Symbols of the single stream of unmapped symbol blocks D1 may be mapped to a single stream of mapped symbol blocks X1 (including mapped symbol blocks x1-1, x1-2, x1-3, etc.).

Each unmapped symbol block d and each mapped symbol block x, for example, may include M symbols such that each unmapped symbol block d includes symbols d(i) and each mapped symbol block x includes symbols x(i), where i=1 to M. With rank 1 transmissions, symbols d1-1($i$) of unmapped symbol block d1-1 may thus map directly to symbols x1-1($i$) of mapped symbol block x1-1, symbols d1-2($i$) of unmapped symbol block d1-2 may map directly to symbols x1-2($i$) of mapped symbol block x1-2, symbols d1-3($i$) of unmapped symbol block d1-3 may map directly to symbols x1-3($i$) of mapped symbol block x1-3, etc.

Stated in other words, for rank 1 transmissions, x1-$j$(i)=d1-$j$(i), where j identifies the block of the stream of unmapped symbol blocks D1 and mapped symbol blocks X1. With rank one transmissions, only one stream of unmapped symbol blocks D1 and only one stream of mapped symbol blocks X1 may be used for the single layer MIMO transmissions. Spreader/scrambler 409 may include a plurality of spreaders/scramblers SS1, SS2, SS3, and SS4, but with only one stream of mapped symbol blocks X1 for one layer MIMO transmission, only one spreader/scrambler SS1 is used to spread/scramble the stream of mapped symbol blocks (e.g., using a Walsh code) to provide a stream of spread symbols, blocks Y1 (including spread symbol blocks y1-1, y1-2, y1-3, etc.), and layer precoder 411 may apply a rank 1 MIMO precoding vector to precode (e.g., to apply precoding weights to) the stream of spread symbol blocks Y1 for transmission through transceiver 109 and antennas Ant-1, Ant-2, Ant-3, and Ant-4 of antenna array 117.

For rank two transmissions, input data may be processed through transport data block generators TB1 and TB2 to provide two streams of transport data blocks B1 and B2, the two streams of transport data blocks may be encoded using channel encoders CE1 and CE2 (e.g., using different coding characteristics/rates) to provide two streams of data codewords CW1 and CW2, and the two streams of codewords may be interleaved/modulated using interleavers/modulators IM1 and IM2 to provide two streams of unmapped symbol blocks D1 and D2. Symbols of the two streams of unmapped symbol blocks D1 and D2 may be mapped to respective streams of mapped symbol blocks X1 (including mapped symbol blocks x1-1, x1-2, x1-3, etc.) and X2 (including mapped symbol blocks x1-1, x1-2, x1-3, etc.) for respective MIMO transmission layers. Each unmapped symbol block d of streams D1 and D2 and each mapped symbol block x of streams X1 and X2, for example, may include M symbols such that each unmapped symbol block d includes symbols d(i) and each mapped symbol block x includes symbols x(i), where i=1 to M. With rank 2 transmissions: symbols d1-1($i$) of unmapped symbol block d1-1 may map directly to symbols x1-1($i$) of mapped symbol block x1-1, and symbols d2-1($i$) of unmapped symbol block d2-1 may map directly to symbols x2-1($i$) of mapped symbol block x2-1; symbols d1-2($i$) of unmapped symbol block d1-2 may map directly to symbols x1-2($i$) of mapped symbol block x1-2, and symbols d2-2($i$) of unmapped symbol block d2-2 may map directly to symbols x2-2($i$) of mapped symbol block x2-2; symbols d1-3($i$) of unmapped symbol block d1-3 may map directly to symbols x1-3($i$) of mapped symbol block x1-3, and symbols d2-3($i$) of unmapped symbol block d2-3 may map directly to symbols x2-3($i$) of mapped symbol block x2-3; etc.

Stated in other words, for rank 2 transmissions, x1-$j$(i)=d1-$j$(i), and x2-$j$(i)=d2-$j$(i), where j identifies the block of the stream of unmapped symbol blocks D1/D2 and mapped symbol blocks X1/X2. With rank two transmissions, only two streams of unmapped symbol blocks D1 and D2 and only two streams of mapped symbol blocks X1 and X2 may be used for the two layer MIMO transmissions. Spreader/scrambler 409 may include a plurality of spreaders/scramblers SS1, SS2, SS3, and SS4, but with only two streams of mapped symbol blocks X1 and X2, only two spreader/scramblers SS1 and SS2 are used to spread/scramble the two streams of mapped symbol blocks (e.g., using a Walsh code) to provide streams of spread symbols blocks Y1 (including spread symbol blocks y1-1, y1-2, y1-3, etc.) and Y2 (including spread symbol blocks y2-1, y2-2, y2-3, etc.), and layer precoder 411 may apply a rank 2 MIMO precoding vector to precode (e.g., to apply precoding weights to) the streams of spread symbol blocks Y1 and Y2 for transmission through transceiver 109 and antennas Ant-1, Ant-2, Ant-3, and Ant-4 of antenna array 117.

For rank three transmissions, input data may be processed through transport data block generators TB1, TB2, and TB3 to provide three streams of transport data blocks B1, B2, and B3, the three streams of transport data blocks may be encoded using channel encoders CE1, CE2, and CE3 (e.g., using different coding characteristics/rates) to provide three streams of data codewords CW1, CW2, and CW3, and the three streams of codewords may be interleaved/modulated using interleavers/modulators IM1, IM2, and IM3 to provide three streams of unmapped symbol blocks D1, D2, and D3.

Figure 5:
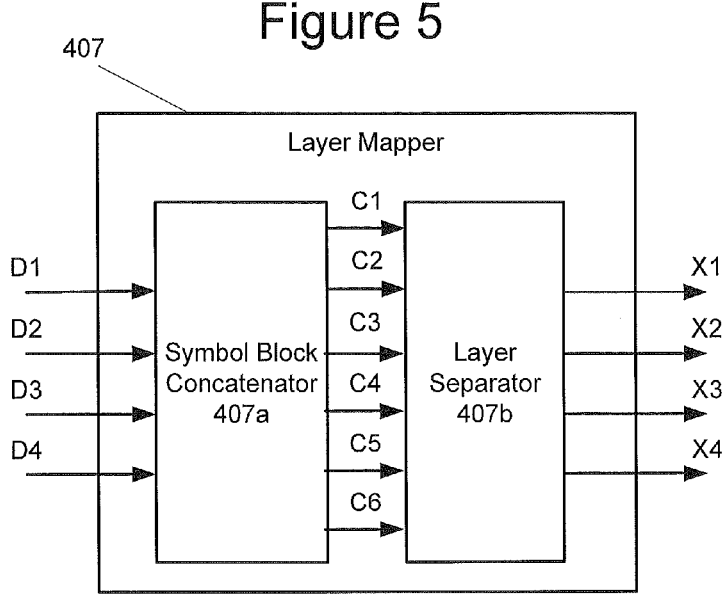
FIG. 5 is a block diagram illustrating elements/operations/functionalities of layer mappers according to some embodiments of FIG. 4.

For rank three transmissions (and for rank 4 transmissions) according to embodiments of FIG. 4, layer mapper 407 may include a symbol block concatenator 407a and a layer separator 407b as shown in FIG. 5. Symbol block concatenator 407a may concatenate/combine two of the three streams of unmapped symbol blocks (e.g., streams D2 and D3 of unmapped symbol blocks, streams D1 and D3 of unmapped symbol blocks, or streams D1 and D2 of unmapped symbol blocks) to provide one concatenated stream of symbol blocks, and layer separator 407b may separate symbols of the concatenated stream of symbol blocks to provide two streams of mapped symbol blocks (e.g., streams X2 and X3 of mapped symbol blocks, streams X1 and X3 of mapped symbol blocks, or streams X1 and X2 of mapped symbol blocks). The remaining stream of unmapped symbol blocks (e.g., stream D1 of unmapped symbol blocks, stream D2 of unmapped symbol blocks, or stream D3 of unmapped symbol blocks) may be mapped directly to the remaining stream of mapped symbol blocks (e.g., stream X1 of mapped symbol blocks, stream X2 of mapped symbol blocks, or stream X3 of mapped symbol blocks). Symbols of two streams of unmapped symbol blocks may thus be concatenated (e.g., combined) and then separated so that symbols of two streams of mapped symbol blocks are a mixture of symbols from the two streams of unmapped symbol blocks, and symbols of the remaining stream of unmapped symbol blocks may be mapped directly to the remaining stream of mapped symbol blocks.

As shown in FIG. 5 by way of example, symbol block concatenator 407a may provide concatenated outputs C1, C2, C3, C4, C5, and/or C6 representing 6 different combinations of streams of unmapped symbol blocks D1, D2, D3, and D4. As noted above, each unmapped symbol block d of streams D1, D2, D3, and D4 may include M symbols such that each unmapped symbol block d includes symbols d(i), where i=1 to M. Accordingly, each concatenated symbol block C generated by symbol block concatenator 407a may include 2*M symbols int(k) where k=1 to 2*M, as shown below:

For C1, symbols $c1\text{-}j(k)=d2\text{-}j(k)$, for k=1 to M; and symbols $c1\text{-}j(k)=d3\text{-}j(k-M)$, for k=M+1 to 2M;
For C2, symbols $c2\text{-}j(k)=d1\text{-}j(k)$, for k=1 to M, and symbols $c2\text{-}j(k)=d3\text{-}j(k-M)$, for k=M+1 to 2M;
For C3, symbols $c3\text{-}j(k)=d1\text{-}j(k)$, for k=1 to M, and symbols $c3\text{-}j(k)=d2\text{-}j(k-M)$, for k=M+1 to 2M;
For C4, symbols $c4\text{-}j(k)=d1\text{-}j(k)$, for k=1 to M, and symbols $c4\text{-}j(k)=d4\text{-}j(k-M)$, for k=M+1 to 2M;
For C5, symbols $c5\text{-}j(k)=d2\text{-}j(k)$, for k=1 to M, and symbols $c5\text{-}j(k)=d4\text{-}j(k-M)$, for k=M+1 to 2M;
For C6, symbols $c6\text{-}j(k)=d3\text{-}j(k)$, for k=1 to M, and symbols $c6\text{-}j(k)=d4\text{-}j(k-M)$, for k=M+1 to 2M;

Accordingly, concatenated symbol stream C1 represents a combination of unmapped symbol streams D2 and D3, concatenated symbol stream C2 represents a combination of unmapped symbol streams D1 and D3, concatenated symbol stream C3 represents a combination of unmapped symbol streams D1 and D2, concatenated symbol stream C4 represents a combination of unmapped symbol streams D1 and D4, concatenated symbol stream C5 represents a combination of unmapped symbol streams D2 and D4, and concatenated symbol stream C6 represents a combination of unmapped symbol streams D3 and D4. For rank 3 transmissions, only of one of symbol block concatenator 407a outputs (e.g., C1, C2, or C3) may be used. Operations of layer mapper 407 for rank three transmission are discussed in greater detail below with respect to three options.

According to Option 1 for layer mapper 407 for rank three transmissions, symbols of unmapped blocks $d1\text{-}j$ from stream D1 map directly to symbols of mapped blocks $x1\text{-}j$ of stream X1, even symbols of concatenator output blocks $c1\text{-}j$ from stream C1 (comprising symbols of streams D2 and D3 of unmapped symbol blocks) map to symbols of mapped blocks $x2\text{-}j$ of stream X2, and odd symbols of concatenator output blocks $c1\text{-}j$ from stream C1 (comprising symbols of streams D2 and D3 of unmapped symbol blocks) map to symbols of mapped blocks $x3\text{-}j$ of stream X3.

FIGS. 4 and 5, Rank 3, Option 1
$x1\text{-}j(i)=d1\text{-}j(i)$, for i=1 to M
$x2\text{-}j(i)=c1\text{-}j(2i)$, for i=1 to M
$x3\text{-}j(i)=c1\text{-}j(2i-1)$, for i=1 to M Symbols of unmapped streams D2 and D3 may thus be combined/concatenated (e.g., using symbol block concatenator 407a) and mapped into streams X2 and X3 of mapped symbol blocks so that symbol blocks of each of streams X2 and X3 include symbols of both streams D2 and D3 of unmapped symbol blocks.

According to Option 2 for layer mapper 407 for rank three transmissions, symbols of unmapped blocks $d2\text{-}j$ from stream D2 map directly to symbols of mapped blocks $x2\text{-}j$ of stream X2, even symbols of concatenator output blocks $c2\text{-}j$ from stream C2 (comprising symbols of streams D1 and D3 of unmapped symbol blocks) map to symbols of mapped blocks $x1\text{-}j$ of stream X1, and odd symbols of concatenator output blocks $c2\text{-}j$ from stream C2 (comprising symbols of streams D1 and D3 of unmapped symbol blocks) map to symbols of mapped blocks $x3\text{-}j$ of stream X3.

FIGS. 4 and 5, Rank 3, Option 2
$x2\text{-}j(i)=d2\text{-}j(i)$, for i=1 to M
$x1\text{-}j(i)=c2\text{-}j(2i)$, for i=1 to M
$x3\text{-}j(i)=c2\text{-}j(2i-1)$, for i=1 to M Symbols of unmapped streams D1 and D3 may thus be combined/concatenated (e.g., using symbol block concatenator 407a) and mapped into mapped streams X1 and X3 of mapped symbol blocks so that symbol blocks of each of streams X1 and X3 include symbols of both streams D1 and D3 of unmapped symbol blocks.

According to Option 3 for layer mapper 407 for rank three transmissions, symbols of unmapped blocks $d3\text{-}j$ from stream D3 map directly to symbols of mapped blocks $x3\text{-}j$ of stream X3, even symbols of concatenator output blocks $c3\text{-}j$ from stream C3 (comprising symbols of streams D1 and D2 of unmapped symbol blocks) map to symbols of mapped blocks x1-$j$ of stream X1, and odd symbols of concatenator output blocks c3-$j$ from stream C3 (comprising symbols of streams D1 and D2 of unmapped symbol blocks) map to symbols of mapped blocks x3-$j$ of stream X3.

FIGS. 4 and 5, Rank 3, Option 3
x3-$j$(i)=d3-$j$(i), for i=1 to M
x1-$j$(i)=c3-$j$(2i), for i=1 to M
x2-$j$(i)=c3-$j$(2i−1), for i=1 to M Symbols of unmapped streams D1 and D2 may thus be combined/concatenated (e.g., using symbol block concatenator 407a) and mapped to mapped streams X1 and X2 of mapped symbol blocks, so that symbol blocks of each of streams X1 and X2 include symbols of both streams D1 and D2 of unmapped symbol blocks.

With rank three transmissions, one stream of unmapped symbol blocks is mapped directly to one stream of mapped symbol blocks, and two unmapped symbol blocks are combined/concatenated and separated into the other two streams of mapped symbol blocks. Spreader/scrambler 409 may include a plurality of spreaders/scramblers SS1, SS2, SS3, and SS4, but with only three streams of mapped symbol blocks X1, X2, and X3, only three spreader/scramblers SS1, SS2, and SS3 are used to spread/scramble the three streams of mapped symbol blocks (e.g., using a Walsh code) to provide streams of spread symbols blocks Y1 (including spread symbol blocks y1-1, y1-2, y1-3, etc.), Y2 (including spread symbol blocks y2-1, y2-2, y2-3, etc.), and Y3 (including spread symbol blocks y3-1, y3-2, y3-3, etc.). Layer precoder 411 may apply a rank 3 MIMO precoding vector to precode (e.g., to apply precoding weights to) the streams of spread symbol blocks Y1, Y2, and Y3 for transmission through transceiver 109 and antennas Ant-1, Ant-2, Ant-3, and Ant-4 of antenna array 117. With rank 3 transmissions, concatenator outputs C4, C5, and C6 may be unused/unnecessary.

For rank four transmissions, input data may be processed through transport data block generators TB1, TB2, TB3, and TB4 to provide four streams of transport data blocks B1, B2, B3, and B4, the four streams of transport data blocks may be encoded using channel encoders CE1, CE2, CE3, and CE4 (e.g., using different coding characteristics/rates) to provide four streams of data codewords CW1, CW2, CW3, and CW4, and the four streams of codewords may be interleaved/modulated using interleavers/modulators IM1, IM2, IM3, and IM4 to provide four streams of unmapped symbol blocks D1, D2, D3, and D4. For rank four transmissions according to embodiments of FIG. 4, layer mapper 407 may include a symbol block concatenator 407a and a layer separator 407b providing concatenated symbol streams (e.g., C1, C2, C3, C4, C5, and/or C6) as discussed above with respect to FIG. 5. Operations of layer mapper 407 for rank three transmission are discussed in greater detail below with respect to three options.

According to Option 1 for layer mapper 407 for rank four transmissions, even symbols of concatenator output blocks c2-$j$ from stream C2 (comprising symbols of streams D1 and D3 of unmapped symbol blocks) map to symbols of mapped blocks x1-$j$ of stream X1, and odd symbols of concatenator output blocks c2-$j$ from stream C2 map to symbols of mapped blocks x3-$j$ of stream X3. In addition, even symbols of concatenator output blocks c5-$j$ from stream C5 (comprising symbols of streams D2 and D4 of unmapped symbol blocks) map to symbols of mapped blocks x2-$j$ of stream X2, and odd symbols of concatenator output blocks c5-$j$ from stream C5 map to symbols of mapped blocks x4-$j$ of stream X4.

FIGS. 4 and 5, Rank 4, Option 1
x1-$j$(i)=c2-$j$(2i), for i=1 to M
x3-$j$(i)=c2-$j$(2i−1), for i=1 to M
x2-$j$(i)=c5-$j$(2i), for i=1 to M
x4-$j$(i)=c5-$j$(2i−1), for i=1 to M Symbols of unmapped streams D1 and D3 may thus be combined/concatenated (e.g., using symbol block concatenator 407a) and mapped into streams X1 and X3 of mapped symbol blocks so that symbol blocks of each of streams X1 and X3 include symbols of both streams D1 and D3 of unmapped symbol blocks. Similarly, symbols of unmapped streams D2 and D4 may thus be combined/concatenated (e.g., using symbol block concatenator 407a) and mapped into streams X2 and X4 of mapped symbol blocks so that symbol blocks of each of streams X2 and X4 include symbols of both streams D2 and D4 of unmapped symbol blocks.

According to Option 2 for layer mapper 407 for rank four transmissions, even symbols of concatenator output blocks c4-$j$ from stream C4 (comprising symbols of streams D1 and D4 of unmapped symbol blocks) map to symbols of mapped blocks x1-$j$ of stream X1, and odd symbols of concatenator output blocks c4-$j$ from stream C4 map to symbols of mapped blocks x4-$j$ of stream X4. In addition, even symbols of concatenator output blocks c1-$j$ from stream C1 (comprising symbols of streams D2 and D3 of unmapped symbol blocks) map to symbols of mapped blocks x2-$j$ of stream X2, and odd symbols of concatenator output blocks c1-$j$ from stream C1 map to symbols of mapped blocks x3-$j$ of stream X3.

FIGS. 4 and 5, Rank 4, Option 2
x1-$j$(i)=c4-$j$(2i), for i=1 to M
x4-$j$(i)=c4-$j$(2i−1), for i=1 to M
x2-$j$(i)=c1-$j$(2i), for i=1 to M
x3-$j$(i)=c1-$j$(2i−1), for i=1 to M Symbols of unmapped streams D1 and D4 may thus be combined/concatenated (e.g., using symbol block concatenator 407a) and mapped into streams X1 and X4 of mapped symbol blocks so that symbol blocks of each of streams X1 and X4 include symbols of both streams D1 and D4 of unmapped symbol blocks. Similarly, symbols of unmapped streams D2 and D3 may thus be combined/concatenated (e.g., using symbol block concatenator 407a) and mapped into streams X2 and X3 of mapped symbol blocks so that symbol blocks of each of streams X2 and X3 include symbols of both streams D2 and D3 of unmapped symbol blocks.

According to Option 3 for layer mapper 407 for rank four transmissions, even symbols of concatenator output blocks c3-$j$ from stream C3 (comprising symbols of streams D1 and D2 of unmapped symbol blocks) map to symbols of mapped blocks x1-$j$ of stream X1, and odd symbols of concatenator output blocks c3-$j$ from stream C3 map to symbols of mapped blocks x2-$j$ of stream X2. In addition, even symbols of concatenator output blocks c6-$j$ from stream C6 (comprising symbols of streams D3 and D4 of unmapped symbol blocks) map to symbols of mapped blocks x3-$j$ of stream X3, and odd symbols of concatenator output blocks c6-$j$ from stream C6 map to symbols of mapped blocks x4-$j$ of stream X4.

FIGS. 4 and 5, Rank 4, Option 3
x1-$j$(i)=c3-$j$(2i), for i=1 to M
x2-$j$(i)=c3-$j$(2i−1), for i=1 to M
x3-$j$(i)=c6-$j$(2i), for i=1 to M
x4-$j$(i)=c6-$j$(2i−1), for i=1 to M Symbols of unmapped streams D1 and D2 may thus be combined/concatenated (e.g., using symbol block concatenator 407a) and mapped into streams X1 and X2 of mapped symbol blocks so that symbol blocks of each of streams X1 and X2 include symbols of both streams D1 and D2 of unmapped symbol blocks. Similarly, symbols of unmapped streams D3 and D4 may thus be combined/concatenated (e.g., using symbol block concatenator 407a) and mapped into streams X3 and X4 of mapped symbol blocks so that symbol blocks of each of streams X3 and X4 include symbols of both streams D3 and D4 of unmapped symbol blocks.

With rank four transmissions, a first pair of streams of unmapped symbol blocks are combined/concatenated and separated into a first pair of mapped symbol blocks, and a second pair of streams of unmapped symbol blocks are combined/concatenated and separated into a second pair of mapped symbol blocks. Spreader/scrambler 409 may include a plurality of spreaders/scramblers SS1, SS2, SS3, and SS4, and with four streams of mapped symbol blocks X1, X2, X3, and X4, all four spreader/scramblers SS1, SS2, SS3, and SS4 may be used to spread/scramble the four streams of mapped symbol blocks (e.g., using a Walsh code) to provide streams of spread symbols blocks Y1 (including spread symbol blocks y1-1, y1-2, y1-3, etc.), Y2 (including spread symbol blocks y2-1, y2-2, y2-3, etc.), Y3 (including spread symbol blocks y3-1, y3-2, y3-3, etc.), and Y4 (including spread symbol blocks y4-1, y4-2, y4-3, etc.). Layer precoder 411 may apply a rank 4 MIMO precoding vector to precode (e.g., to apply precoding weights to) the streams of spread symbol blocks Y1, Y2, Y3, and Y4 for transmission through transceiver 109 and antennas Ant-1, Ant-2, Ant-3, and Ant-4 of antenna array 117.

According to some embodiments of FIGS. 4 and 5, layer mapper 407 may apply fixed mapping functions (known to both base station 100 and wireless terminal 200) for rank 3 and rank 4 transmissions. For Rank 3 transmission, for example, layer mapper 407 may always use the rank 3 option 1, and for Rank 4 transmission, layer mapper 407 may always use the rank 4 option 1 mapping. Using fixed mappings may reduce control channel traffic that may otherwise be needed to signal mapping selections/recommendations between base station 100 and wireless terminal 200.

According to some other embodiments of FIG. 4, mapping functions for rank 3 and rank 4 transmissions may be dynamically selected. Wireless terminal processor 201, for example, may select from a plurality of mapping function options (e.g., one of options 1-3 for rank 3 or one of options 1-3 for rank 4 as discussed above), and this selection may be identified in CQI feedback that is transmitted to base station 100 for a subsequent downlink transmission. More particularly, a rank selection may be included in the CQI feedback, and an additional 2 bit code may be used to identify one of options 1-3 for rank 3 transmissions or one of options 1-3 for rank 4 transmissions. Wireless terminal processor 201 may thus chose a mapping option to increase a quality and/or rate of data transmission over the downlink. According to other embodiments, adaptive controller 415 may select the mapping option for rank 3 and rank 4 transmissions, and the selection may be signaled to wireless terminal 200.

Figure 6:
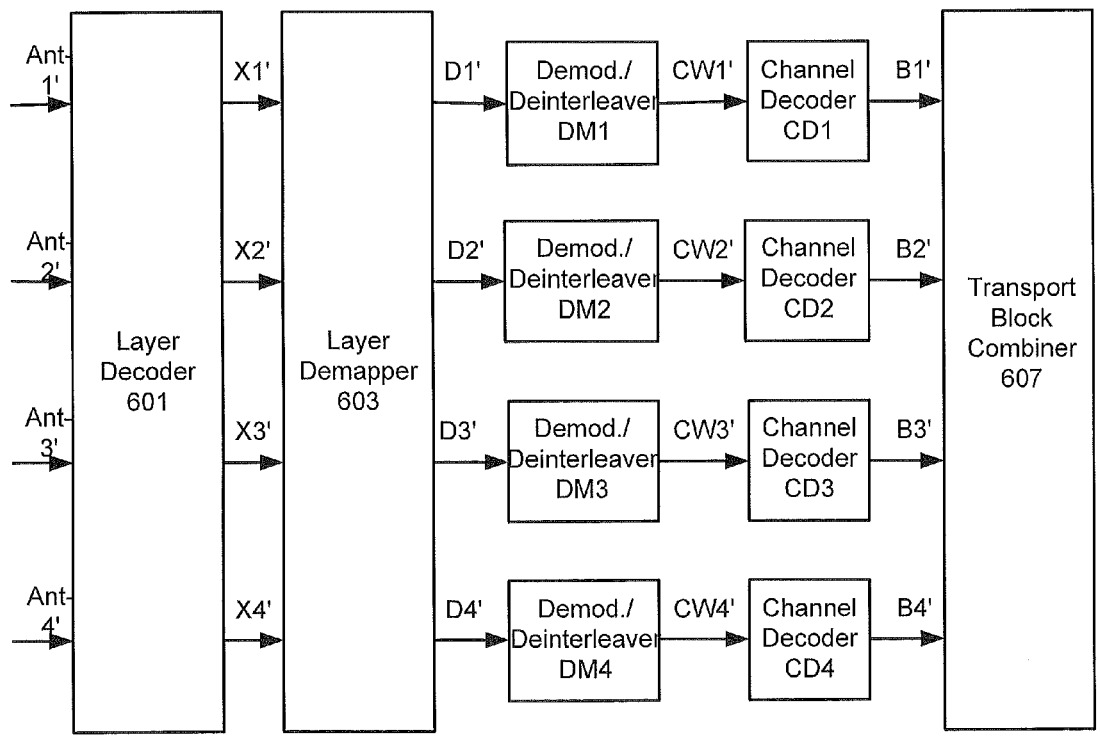
FIG. 6 is a block diagram illustrating elements/operations/functionalities of wireless terminal processors and/or transceivers according to some embodiments of FIG. 2.

At wireless terminal 200, operations of processor 201 may mirror operations of base station processor 101 when receiving the MIMO downlink communications transmitted by the base station. More particularly, elements/functionalities of wireless terminal processor 201 are illustrated in FIG. 6 mirroring elements/functionalities of base station processor 101 discussed above with reference to FIGS. 4 and 5.

Radio signals may be received through MIMO antenna elements of MIMO antenna array 217 and transceiver 209, and the radio signals may be decoded by layer decoder 601 using a MIMO decoding vector to generate a plurality of MIMO decoded symbol layers X1', X2', X3', and/or X4' depending on MIMO rank used for transmission/reception. Layer Decoder 601 may use a decoding vector corresponding to the precoding vector used by base station 100. Layer decoder 601 may generate a single decoded symbol layer X1' for rank 1 reception, layer decoder 601 may generate two decoded symbol layers X1' and X2' for rank 2 reception, layer decoder 601 may generate three decoded symbol layers X1', X2', and X3' for rank 3 reception, and layer decoder 601 may generate four decoded symbol layers X1', X2', X3', and X4' for rank 4 transmission.

For rank one reception, layer demapper 603 may demap symbols of decoded symbol layer X1' blocks x1'-j directly to symbols of unmapped symbol layer D1' blocks d1'-j, demodulator/deinterleaver DM-1 may demodulate/deinterleave unmapped symbol layer blocks d1'-j to provide data codewords cw1'-j of data codeword stream CW1', and channel decoder CD1 may decode data codewords cw1'-j of data codeword stream CW1' to provide transport blocks b1'-j of stream B1'. Transport block generator 607 may then pass transport blocks b1'-j of stream B1' as a data stream. During rank one reception, functionality of demodulators/deinterleavers DM2, DM3, and DM4 and channel decoders CD2, CD3, and CD4 may be unused.

For rank two reception, layer decoder 601 may generate decoded symbol layers X1' and X2'. Layer demapper 603 may demap symbols of decoded symbol layer X1' blocks x1'-j directly to symbols of unmapped symbol layer D1' blocks d1'-j, and layer demapper 603 may demap symbols of decoded symbol layer X2' blocks x2'-j directly to symbols of unmapped symbol layer D2' blocks d2'-j. Demodulator/deinterleaver DM-1 may demodulate/deinterleave unmapped symbol layer blocks d1'-j to provide data codewords cw1'-j of data codeword stream CW1', and demodulator/deinterleaver DM-2 may demodulate/deinterleave unmapped symbol layer blocks d2'-j to provide data codewords cw2'-j of data codeword stream CW2'. Channel decoder CD1 may decode data codewords cw1'-j of data codeword stream CW1' to provide transport blocks b1'-j of stream B1', and channel decoder CD2 may decode data codewords cw2'-j of data codeword stream CW2' to provide transport blocks b1'-j of stream B2'. Transport block generator 607 may then combine transport blocks b1'-j and b2'-j of streams B1' and B2' as a data stream. During rank two reception, functionality of demodulators/deinterleavers DM3 and DM4 and channel decoders CD3 and CD4 may be unused.

During higher rank reception (e.g., rank 3 and/or rank 4 reception), layer demapper 603 may demap symbols of the first and second decoded symbol blocks x1'-1 and x2'-1 of respective decoded symbol block streams X1' and X2' so that an unmapped symbol block d1'-1 of stream D1' includes some symbols of decoded symbol blocks x1'-1 and x2'-1 and so that an unmapped symbol block d2'-1 of stream D2' includes other symbols of decoded symbol blocks x1'-1 and x2'-1. Moreover, the first and second decoded symbol blocks x1'-1 and x2'-2 may represent data received during a same TFRE. The unmapped symbol blocks d1'-1 and d2'-2 of streams D1' and D2' may be demodulated/deinterleaved using respective demodulators/deinterleavers DM1 and DM2 to provide respective data codewords cw1'-1 and cw1'-2. Channel decoders CD1 and CD2 may then decode the respective data codewords cw1'-1 and cw2'-2 of streams CW1' and CW2' using different channel code characteristics (e.g., different code rates) to generate respective data blocks b1'-1 and b2'-1 of streams B1' and B2'. Transport block generator 607 may then combine transport blocks b1'-j and b2'-j of streams B1' and B2' as a data stream.

During rank 3 reception, a third stream X3' of decoded symbol blocks may be generated by layer decoder 601 (in addition to streams X1' and X2') and demapped directly by layer demapper 603 to stream D3' of unmapped symbol blocks. The stream D3' of unmapped symbol blocks may be processed through demodulator/deinterleaver DM3 and channel decoder CD3, and the resulting stream B3' of transport blocks may be combined with streams B1' and B2' by transport block combiner 607. During rank 4 reception, third and fourth streams X3' and X4' of decoded symbol blocks may be generated by layer decoder 601 (in addition to streams X1' and X2'). Layer demapper 603 may demap symbol blocks of streams X3' and X4' so that symbol blocks of D3' include symbols from symbol blocks of streams X3' and X4' and so that symbol blocks of D4' include symbols from symbol blocks of streams X3' and X4'. The streams D3' and D4' of unmapped symbol blocks may be processed through demodulators/deinterleavers DM3 and DM4 and channel decoders CD3 and CD4, and the resulting streams B3' and B4' of transport blocks may be combined with streams B1' and B2' by transport block combiner 607.

As 4-branch MIMO transmission for HSDPA is standardized in 3GPP (RP-111393, Four Branch MIMO transmission for HSDPA, 3GPP TSG-RAN meeting #53, Fukuoka, Japan, Sep. 13 to 16, 2011), maintaining backwards compatibility and reducing/minimizing impact on the specification are two goals during the standardization process. For example, reusing existing functionality or using existing functionality with minor updates is generally preferred relative to a completely new solution.

When introducing 4-branch MIMO, up to 4 layers (or streams) can be transmitted simultaneous using the same physical resource (i.e. time, frequency and codes). Accordingly, up to 4 data blocks (so called transport blocks or TBs) and associated control signaling may be transmitted per TTI (transmission time interval).

Associated control overhead may be considered as too large to be a viable solution. Hence, a solution based on mapping pairs of TBs (transport blocks) to a (so called) codeword (CW) has been discussed in 3GPP (R1-114366, Summary of 4-branch MIMO for HSPA session, 3GPP TSG RAN WG1 Meeting #67, San Francisco, Calif. USA, 14 to 18 Nov. 2011). Here, two equal size TBs are mapped to one CW, and associated control signaling can then relate to a CW instead of to transport blocks. This is sometimes referred to as "TB bundling" (U.S. patent application Ser. No. 13/255,322 entitled "Methods And Entities For Modulation Symbol Transport" and filed Sep. 8, 2011). This may limit, for example, the HARQ (hybrid automatic repeat request) related signaling to a maximum of two ACK/NACKs (Acknowledge/Negative-Acknowledge messages). Since the two TBs associated with one CW are of equal size, only parameters for one of them is needed, and hence the DL (downlink) signaling overhead can be reduced/minimized. Since a maximum of two CWs are possible, solutions from 2-branch HSDPA MIMO may be reused. Hence, impact on the specification may be reduced/minimized.

Wireless terminal processor 201 and/or transceiver 209 may define/configure/provide operations/functionality of a plurality of reception layers/streams as discussed above with respect to FIG. 6: with a first layer RL1 (e.g., including DM1 and CD1) being used for MIMO ranks 1, 2, 3, and 4; with a second layer RL2 (e.g., including DM2 and CD2) being used for MIMO ranks 2, 3, and 4; with a third layer RL3 (e.g., including DM3 and CD3) being used for MIMO ranks 3 and 4; and with a fourth MIMO layer RL4 (e.g., including DM4 and CD4) being used for MIMO rank 4. Separate decoding (e.g., using decoder functionally illustrated by decoders CD1-4 of FIG. 6) may be performed for each MIMO layer received during a MIMO TTI. Wireless terminal processor 201 and/or transceiver 209, for example, may define, configure, and/or provide one or more of reception layers RL1, RL2, RL3, and/or RL4 for a given TTI/TFRE responsive to rank and/or precoding vector information provided from base station 100 via downlink signaling. For example, a higher MIMO rank (defining a respective higher number of reception layers/streams) may be selected when the wireless terminal detects that the downlink channel has a higher SINR (e.g., when the wireless terminal is relatively close to the base station), and a lower MIMO rank (defining a respective lower number of reception layers/streams) may be selected when the wireless terminal detects that the downlink channel has a lower SINR (e.g., when the wireless terminal is relatively distant from the base station).

While separate transport block generator, encoder, modulator, layer mapper, spreader/scrambler, and layer precoder blocks are illustrated in FIG. 4 by way of example, the blocks of FIG. 4 merely illustrate functionalities/operations of base station processor 101 and/or transceiver 109. Sub-blocks (e.g., transport blocks TB1-TB4, channel encoders CE1-CE4, interleavers/modulators IM1-IM4, and/or spreader scramblers SS1-SS4) of FIG. 4 further illustrate functionalities/operations of transport block generator, encoder block, modulator block, and/or spreader/scrambler block supporting transmission layers TL1-TL4. Processor 101 and/or transceiver 109, however, may provide/define/configure functionality/operations of only one transmission layer TL1 (e.g., including TB1, CE1, and IM1) during rank 1 transmission; processor 101 and/or transceiver 209 may provide/define/configure functionality/operations of only two transmission layers TL1 and TL2 (e.g., including TB2, CE2, and IM2) during rank 2 transmission; processor 101 and/or transceiver 209 may provide/define/configure functionality/operations of only 3 transmission layers TL1, TL2, and TL3 (e.g., using TB3, CE3, and IM3) during rank 3 transmission; and processor 101 and/or transceiver 109 may provide/define/configure functionality/operations of four transmission layers TL1, TL2, TL3, and TL4 (e.g., using TB4, CE4, and IM4) only during rank 4 transmission. When multiple transmission layers are provided/defined/configured for a TTI/TFRE, for example, processor 101 and/or transceiver 109 may provide/define/configure functionality/operations of multiple transport block sub-blocks, multiple channel decoder sub-blocks, multiple interleaver/modulator sub-blocks, and/or multiple spreader/scrambler sub-blocks to allow parallel processing of data of different transmission layers before transmission during a TTI/TFRE, or processor 101 and/or transceiver 109 may provide/define/configure functionality/operations of a single transport block, a single channel encoder, a single interleaver/modulator, and/or a single spreader scrambler to allow serial processing of data of different transmission layers before transmission during a TTI/TFRE.

While separate layer decoder, layer demapper, demodulator/deinterleaver, channel decoder, and transport block combiner blocks/sub-blocks are illustrated in FIG. 6 by way of example, the blocks of FIG. 6 merely illustrate functionalities/operations of wireless terminal processor 201 and/or transceiver 209. For example, sub-blocks (e.g., demodulator/deinterleaver DM1-DM4 and channel decoders CD1-CD4) of FIG. 6 illustrate functionalities/operations providing reception layer RL1 (e.g., including DM1 and CD1), reception layer RL2 (e.g., including DM2 and CD2), reception layer RL3 (e.g., including DM3 and CD3), and reception layer RL4 (e.g., including DM4 an CD4). Processor 201 and/or transceiver 209, however, may provide/define/configure functionality/operations of only one reception layer RL1 during rank 1 reception; processor 201 and/or transceiver 201 may provide/define/configure functionality/operations of only two reception layers RL1 and RL2 during rank 2 transmission; processor 201 and/or transceiver 209 may provide/define/configure functionality/operations of only 3 reception layers RL1, RL2, and RL3 during rank 3 transmission; and processor 201 and/or transceiver 209 may provide/configure/define functionality/operations of four reception layers RL1, RL2, RL3, and RL4 only during rank 4 transmission. When multiple reception layers are provided/defined/configured, for example, processor 201 and/or transceiver 209 may provide/define/configure functionality/operations of multiple demodulator/deinterleaver blocks and/or multiple channel decoder blocks to allow parallel processing of data of different reception layers during a TTI/TFRE, or processor 201 and/or transceiver 209 may provide/define/configure functionality/operations of a single demodulator/deinterleaver block and/or a single channel decoder to allow serial processing of data of different reception layers during a TTI/TFRE.

Figure 7:
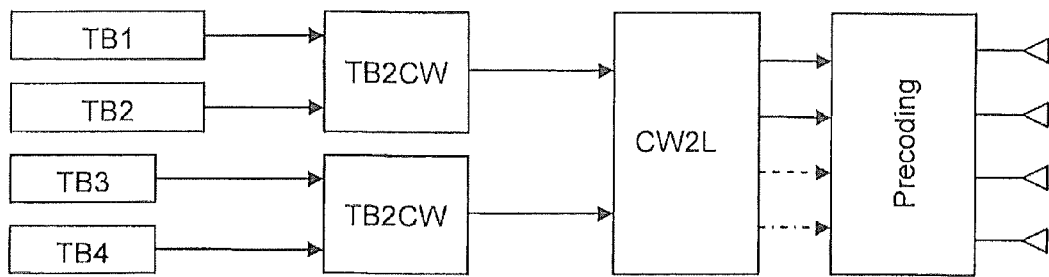
FIG. 7 is a schematic block diagram illustrating a 4-branch HSDPA MIMO transmitter elements/operations/functionalities according to some embodiments.

In FIG. 7, an outline of the transmitter chain is shown. Here two TBs are mapped to one CW "TB2CW." Note that the case is shown when two CWs are mapped to each codeword. In the case of a single layer transmission (i.e. rank-1), one TB will be mapped to a single CW. Similarly, for a rank-3 transmission, one TB will be mapped to one of the CWs while two TBs are mapped to the other CW.

The codewords are then mapped to layers. Here several possibilities may exist, but a fixed mapping (see also, LTE 36.211, Section 6.3.3.2 and FIG. 2) is assumed here for simplicity. The number of layers would correspond to the "rank" of the transmission. Finally the layers are mapped to the antenna domain by the spatial precoder. Note that also for lower rank transmissions it may be beneficial to transmit on all antennas. The exact precoder may not be important here, but it is assumed that codebook based precoding is used, at least for CSI (channel state information) reporting.

Figure 8A:
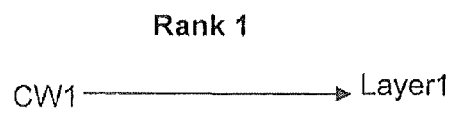
FIGS. 8A, 8B, 8C, and 8D are diagrams illustrating codeword to layer mappings according to some embodiments.
Figure 8B:
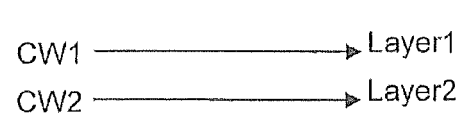
Figure 8C:
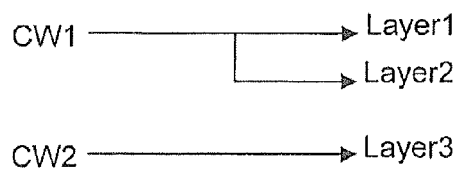
Figure 8D:
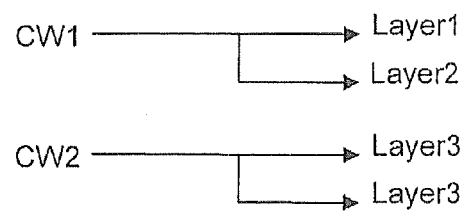

In the case where a codeword is mapped to two layers, it may be beneficial if the two layers have similar quality, because the TB mapped to one CW should be described by a common set of parameters (i.e. the same TBS or transport block size and the same MCS or modulation and coding scheme). For example, looking at FIG. 8C (Rank 3), layers 1 and 2 should be of similar quality (e.g., a same/similar TBS and/or MCS), while layer 3 can have a very different quality (e.g., a difference TBS and/or MCS) since a CW with other MCS (modulation and coding scheme) parameters is mapped to this layer. Since the CQI (channel quality indicator) is reported per CW, the individual layer quality may not be known at the base station, and hence has to be signaled from the UE (user equipment, also referred to as a wireless terminal).

In principle, this can be done in many ways. For example, the UE may order the layers by quality.

Ways for the system to make the layer qualities available to the base station are discussed in greater detail below. Related problems are discussed above with respect to FIGS. 1-6.

Figure 9:
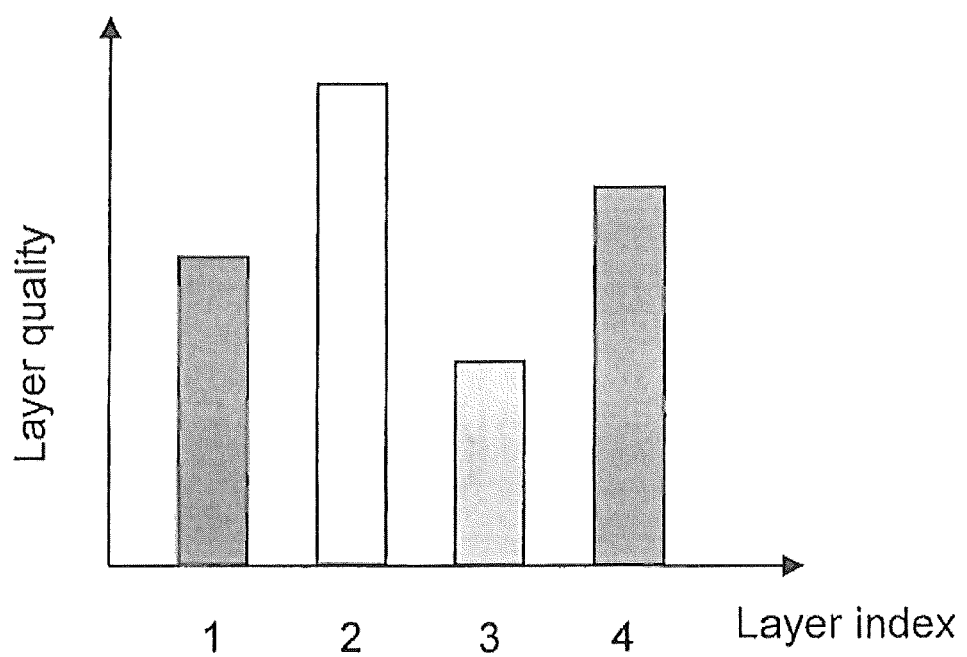
FIG. 9 is a graph illustrating layer quality as a function of layer index according to some embodiments.

FIG. 9 shows an example of distributing layer quality. Since one CW is mapped to two layers, it may be beneficial if these two layers have similar quality (e.g., the same/similar TBS and/or MCS). If a fixed mapping as in FIGS. 8A-D is used, layers one and two are mapped to the same CW, which may be non-optimal since the layer qualities of these layers are fairly different. A better mapping, in this example, may be to map layers 1 and 3 to one CW, and to map layers 2 and 4 to the other CW. To achieve this, some additional signaling may be needed. This signaling can be explicit, or implicit as shown below.

Since the layers are defined by the columns of the spatial precoder matrix, one way to address issues noted above may be to include permutations of the same precoder matrix into the codebook as described in the following example.

Assume that the layers are defined by the vectors W1=[w1, w2, w3, w4]. If several column permutations of this matrix exist in the codebook, the UE can report the precoder matrix matching the fixed CW2L mapping of FIGS. 8A-D. In this particular example, the 6 permutations W2=[w1, w2, w4, w3], W3=[w1, w3, w2, w4], W4=[w1, w3, w4, w2], W5=[w1, w4, w2, w3] and W6=[w1, w4, w3, w2] would exist. To match the CW2L mapping, the example in FIG. 9 would then correspond to the permutation W3, since this would group layers with similar quality to the same CW. In a rank=3 situation, only 2 possibilities may exist [w1, w2, w3] and [w1, w3, w2].

A potential gain with this type of signaling is simplicity. The UE will try all different precoders (including its permutations) and then report the precoder index best fitting to the fixed layer mapping. A potential drawback is that the precoder codebook will grow, especially for higher ranks where many permutations exist. It may be possible to exclude certain permutations from the codebook and hence reduce its size. In this case a certain performance penalty may be expected.

An alternative way to signal the layer order (or rather how to group the layers) in the case when a CW is mapped to several layers, an explicit signaling may be used. Here the spatial precoder codebook may include its base matrices (no permutations), but an additional signaling is introduced to group the layers. Continuing with the example of FIG. 9 where layers 1 and 3 are grouped to one CW, and layers 2 and 4 are grouped to the other CW, a convention that layer 1 always belongs to CW1 may be introduced. Accordingly, an identification of the other layer that should also belong to CW1 may need to be signaled. In the case of rank 4 (e.g. this example), there are 3 possibilities and hence 2 bits may be used to signal this. In fact, only 1.5 bits may actually be needed for this signaling, and if this signaling is part of any other signaling, one bit may be saved compared to explicit signaling. For example, there might be another parameter with, for example, 5 alternatives, and hence the two parameters may be reported together using 3 bits (8 possibilities).

For a rank=3 situation, only two possibilities may exist. According to FIGS. 8A-D, the UE may need to report which of layers 2 and 3 should be mapped to CW1 together with layer 1.

A third alternative would be to have a flexible CW2L mapping similar to that described above with respect to FIGS. 1-6. In this case, there is no fixed CW2L mapping as in FIGS. 8A-D, rather the UE would calculate the throughput (or any related measure) for all combinations and then report the "best". That is, the UE may calculate how to best map several layers onto 2 CWs for each entry in the precoder codebook.

A potential advantage with the signaling described with respect to FIGS. 7-9 would be that the base station can map data to each CW in an improved/optimal way. For example, if the layer qualities are given by FIG. 9, the system will allocate a data rate to CW1 matching the mean quality of layer 1 and layer 2 (and the system will allocate a data rate to CW2 matching a mean quality of layer 3 and layer 4). On the other hand, if this signaling or ordering is present, the system can allocate a data rate matching the mean of layers 1 and 3 to CW1 and layers 2 and 4 to CW2. In this case, the mean of the ordered layers may be higher than that of layers that are unordered, hence a higher throughput may be expected.

A potential advantage with the first alternative may be its simplicity. The spatial codebook is expanded and the layer quality ordering is implicitly signaled with the codebook entry.

A potential advantage with the second alternative may be the possibility to save on signaling overhead. In the first case, the codebook is expanded, hence requiring more bits. If the codebook has a fixed size per rank (as in LTE), this overhead will be present also for lower ranks when the ordering is not needed. In the second alternative, the ordering is signaled explicitly and hence can be made rank dependent.

FIGS. 10 and 11A-D are flow charts illustrating operations of base station 100 discussed above with respect to FIGS. 2 and 4. When data is available for transmission/retransmission to wireless terminal 200 at block 1011, base station 100 may select one or more transmission characteristics such as a rank (RI), a precoding vector (PCI), a modulation and coding scheme (MCS), transport block size (TBS), etc, for transmission at block 1013, and base station 100 may transmit an identification(s)/indication(s) of the selected transmission characteristics (e.g., rank, precoding vector, MCS, TBS, etc.) to the wireless terminal. Based on the rank selected at blocks 1013 and 1015 for a given TFRE/TTI, operations of FIG. 11A may be performed for rank 1 for the given TFRE/TTI as indicated at block 1017, operations of FIG. 11B may be performed for rank 2 for the given TFRE/TTI as indicated at block 1019, operations of FIG. 11C may be performed for rank 3 for the given TFRE/TTI as indicated at block 1021, or operations of FIG. 11D may be performed for rank 4 for the given TFRE/TTI as indicated at block 1023.

Figure 10:
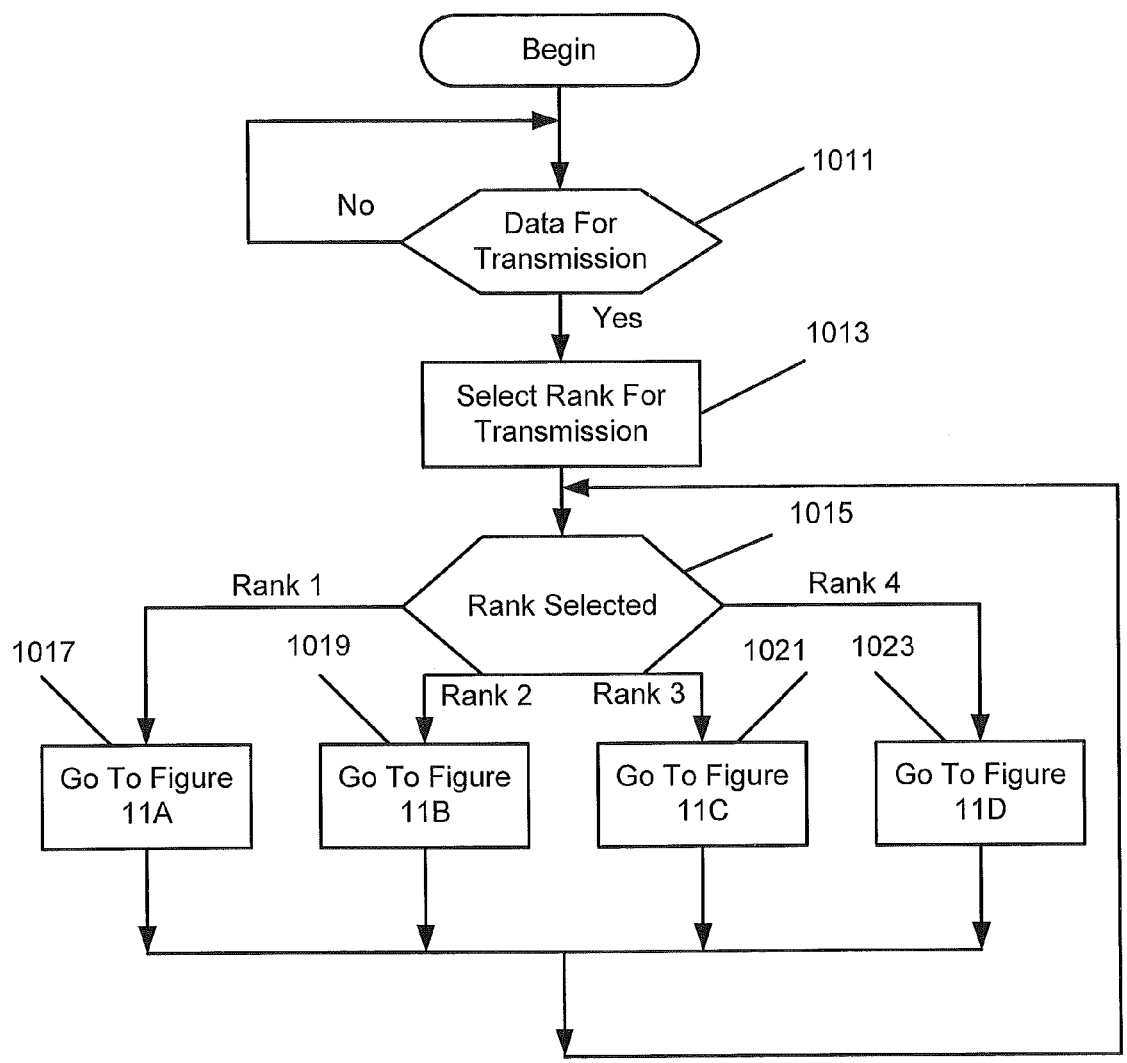
Figure 11A:
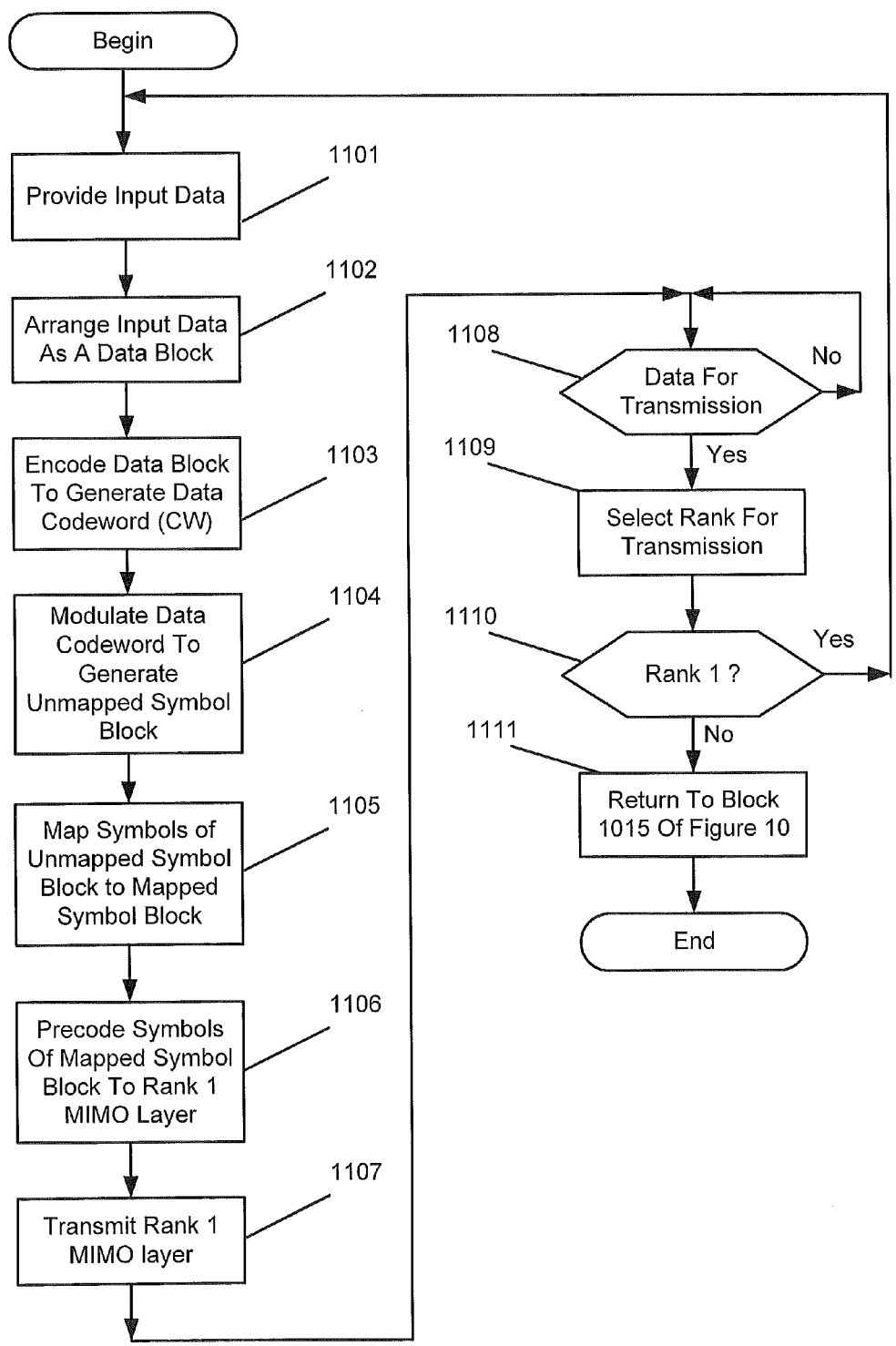

If rank 1 transmission is selected for the TFRE/TTI at blocks 1013, 1015, and 1017 of FIG. 10, base station 100 may proceed with operations of FIG. 11A. For example, transport block generator 401 may provide the input data for transmission to the wireless terminal (200) at block 1101, and arrange the input data as a data block at block 1102. At block 1103, encoder 403 may encode the data block to generate a data codeword, and at block 1104, modulator 405 may modulate the data codeword to generate symbols of an unmapped symbol block. At block 1105, layer mapper 407 may map symbols of the unmapped symbol block to a mapped symbol block; at block 1106, spreader/scrambler 409 and/or layer precoder 411 may precode symbols of the mapped symbol block to the rank 1 MIMO layer/stream; and at block 1107, the rank 1 MIMO layer/stream may be transmitted over wireless channel 300 to wireless terminal 200.

When data is available for transmission/retransmission to wireless terminal 200 for a next TFRE/TTI at block 1108, base station 100 may select a rank, a precoding vector, a modulation and coding scheme, a transport block size, etc. for transmission at block 1109, and base station 100 may transmit identification(s)/indication(s) of the selected transmission characteristics (e.g., rank, precoding vector, MCS, TBS, etc.) to the wireless terminal. If rank 1 is maintained at block 1110, operations of blocks 1101-1110 may be repeated for each rank 1 TFRE/TTI. If a different rank (e.g., rank 2, 3, or 4) is selected at blocks 1109 and 1110, base station processor 101 may return to block 1015 of FIG. 10 as indicated by block 1111.

Figure 11B:
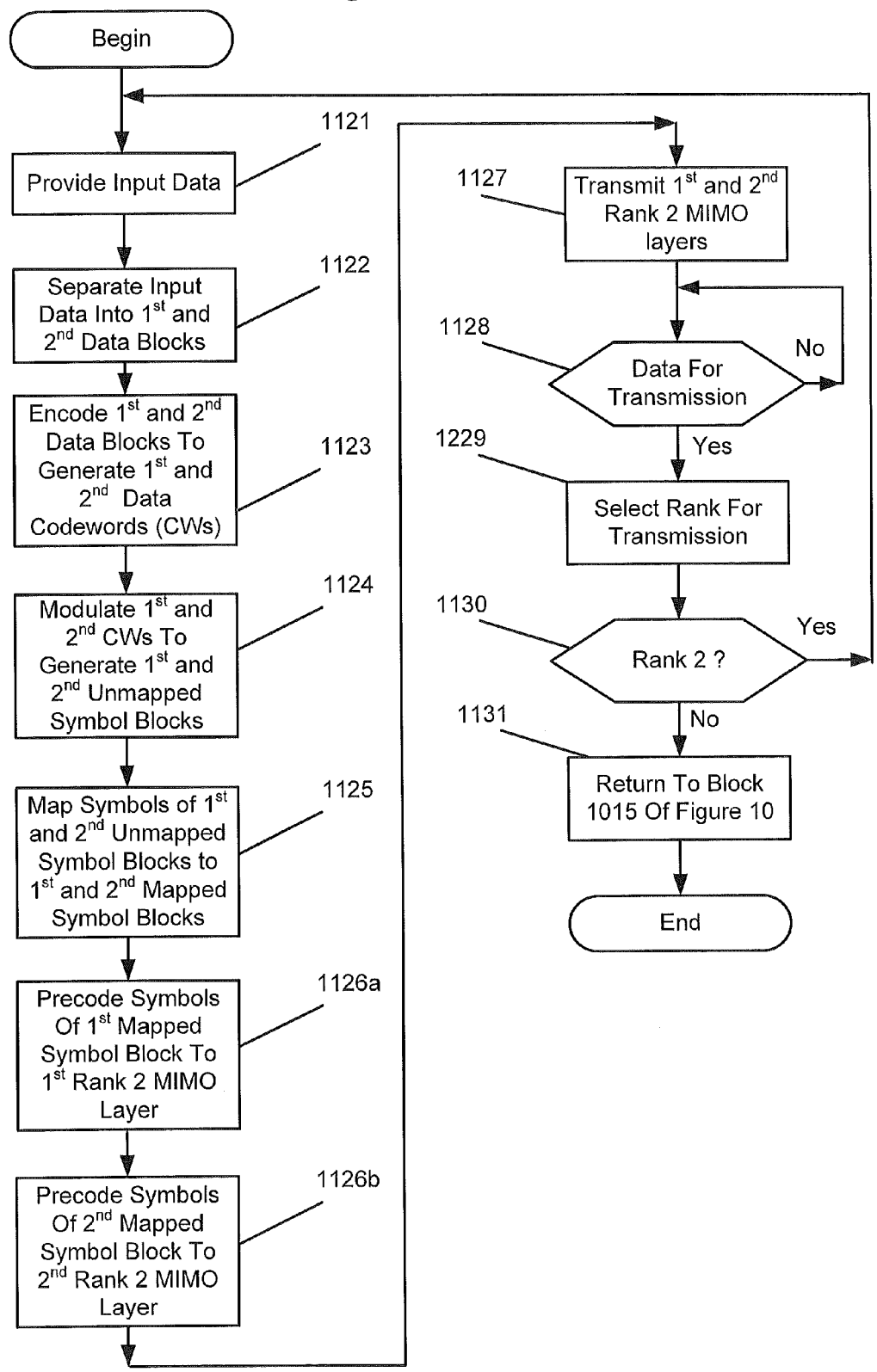

If rank 2 transmission is selected for the TFRE/TTI at blocks 1013, 1015, and 1019 of FIG. 10, base station 100 may proceed with operations of FIG. 11B. For example, transport block generator 401 may provide the input data for transmission to the wireless terminal (200) at block 1121, and separate the input data into first and second data blocks for the TFRE/TTI at block 1122. At block 1123, encoder 403 may encode the first and second data blocks to generate respective first and second data codewords, and at block 1124, modulator 405 may modulate the first and second data codewords to generate symbols of respective first and second unmapped symbol blocks. At block 1125, layer mapper 407 may map symbols of the first and second unmapped symbol blocks to respective first and second mapped symbol blocks; at block 1126a, spreader/scrambler 409 and/or layer precoder 411 may precode symbols of the mapped symbol block to a first rank 2 MIMO layer/stream; and at block 1126b, spreader/scrambler 409 and/or layer precoder 411 may precode symbols of the mapped symbol block to a second rank 2 MIMO layer/stream. At block 1127, the first and second rank 2 MIMO layers/streams may be transmitted over wireless channel 300 to wireless terminal 200.

When data is available for transmission/retransmission to wireless terminal 200 for a next TFRE/TTI at block 1128, base station 100 may select a rank, a precoding vector, a modulation and coding scheme, a transport block size, etc. for transmission at block 1129, and base station 100 may transmit identification(s)/indication(s) of the selected transmission characteristics (e.g., rank, precoding vector, MCS, TBS, etc.) to the wireless terminal. If rank 2 is maintained at block 1130, operations of blocks 1121-1130 may be repeated for each rank 2 TFRE/TTI. If a different rank (e.g., rank 1, 3, or 4) is selected at blocks 1129 and 1130, base station processor 101 may return to block 1015 of FIG. 10 as indicated by block 1131.

Figure 11C:
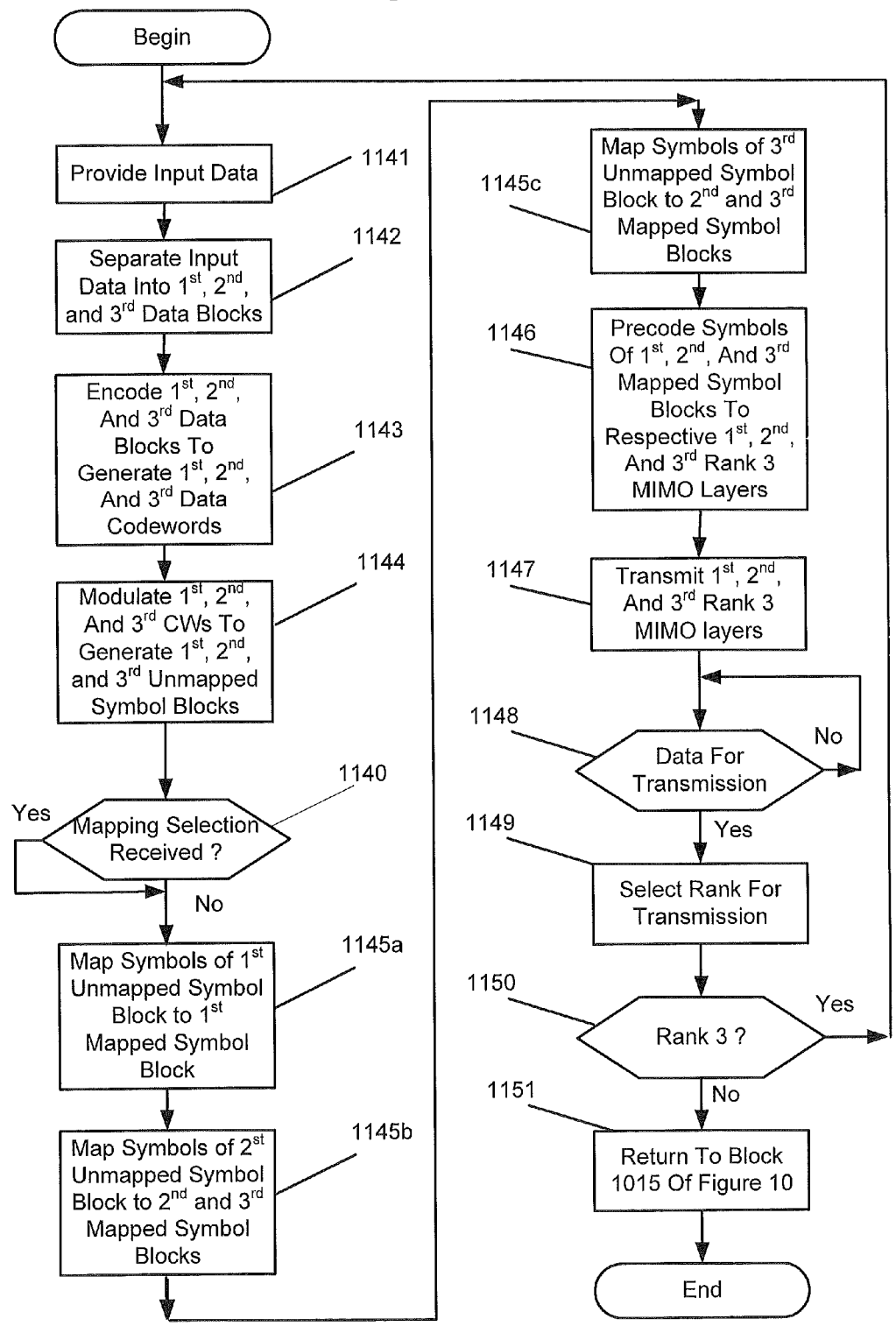

If rank 3 transmission is selected for the TFRE/TTI at blocks 1013, 1015, and/or 1019 of FIG. 10, base station 100 may proceed with operations of FIG. 11C. For example, transport block generator 401 may provide input data for transmission to the wireless terminal 200 at block 1141, and separate the input data into first, second, and third data blocks at block 1142. At block 1143, encoder 403 may encode the first, second, and third data blocks at block 1143 to generate respective first, second, and third data codewords; and at block 1144, modulator 405 may modulate data of the first, second, and third data codewords to provide symbols of respective first, second, and third unmapped symbol blocks. As discussed in greater detail below regarding some embodiments, a mapping selection may be received from wireless terminal 200 at block 1140 with the mapping selection defining a mapping of symbols from unmapped symbol blocks to mapped symbol blocks. According to some other embodiments, a mapping of symbols from unmapped symbol blocks may be fixed, or one of a plurality of mapping selections may be selected by base station without receiving input from wireless terminal 200.

In accordance with Rank 3, Option 1 (discussed above with respect to FIGS. 4 and 5 and shown in FIG. 11C), layer mapper 407 may map symbols directly from the first unmapped symbol block to a first mapped symbol block at block 1145a; layer mapper 407 may map symbols from the second unmapped symbol block to second and third mapped symbol blocks at block 1145b; and layer mapper 407 may map symbols from the third unmapped symbol block to the second and third mapped symbol blocks at block 1145c. Accordingly, the first mapped symbol block may include symbols of the first unmapped symbol block and may exclude symbols of any other unmapped symbol blocks (other than the first unmapped symbol block); the second mapped symbol block may include symbols of the second and third unmapped symbol blocks; and the third mapped symbol block may include symbols of the second and third unmapped symbol blocks. For example, all symbols of the first unmapped symbol block may map directly to the first mapped symbol block, even symbols of the second and third unmapped symbol blocks may map to the second mapped symbol block, and odd symbols of the second and third unmapped symbol blocks may map to the second mapped symbol block.

In accordance with Rank 3, Option 2 (discussed above with respect to FIGS. 4 and 5 and shown in FIG. 14A), layer mapper 407 may map symbols from the first unmapped symbol block to first and third mapped symbol blocks at block 1145*a'*; layer mapper may directly map symbols from the second unmapped symbol block to a second mapped symbol block at block 1145*b'*; and layer mapper 407 may map symbols from the third unmapped symbol block to the first and third mapped symbol blocks at block 1145*c'*. Accordingly, the first mapped symbol block may include symbols of the first and third unmapped symbol blocks; the second mapped symbol block may include symbols of the second unmapped symbol block and may exclude symbols of any other unmapped symbol block (other than the second unmapped symbol block); and the third mapped symbol block may include symbols of the first and third unmapped symbol blocks. For example, even symbols of the first and third unmapped symbol blocks may map to the first mapped symbol block, all symbols of the second unmapped symbol block may map directly to the second mapped symbol block, and odd symbols of the first and third unmapped symbol blocks may map to the third mapped symbol block.

In accordance with Rank 3, Option 3 (discussed above with respect to FIGS. 4 and 5 and shown in FIG. 14B), layer mapper 407 may map symbols from the first unmapped symbol block to first and second mapped symbol blocks at block 1145*a"*; layer mapper 407 may map symbols from the second unmapped symbol block to the first and second mapped symbol blocks at block 1145*b"*; and layer mapper 407 may directly map symbols from the third unmapped symbol block to the third mapped symbol blocks at block 1145*c'*. Accordingly, the first mapped symbol block may include symbols of the first and second unmapped symbol blocks; the second mapped symbol block may include symbols of the first and second unmapped symbol blocks; and the third mapped symbol block may include symbols of the third unmapped symbol block and may exclude symbols of any other unmapped symbol block (other than the third unmapped symbol block). For example, even symbols of the first and second unmapped symbol blocks may map to the first mapped symbol block, odd symbols of the first and second unmapped symbol block may map to the second mapped symbol block, and all symbols of the third unmapped symbol blocks may map directly to the third mapped symbol block.

Figure 14A:
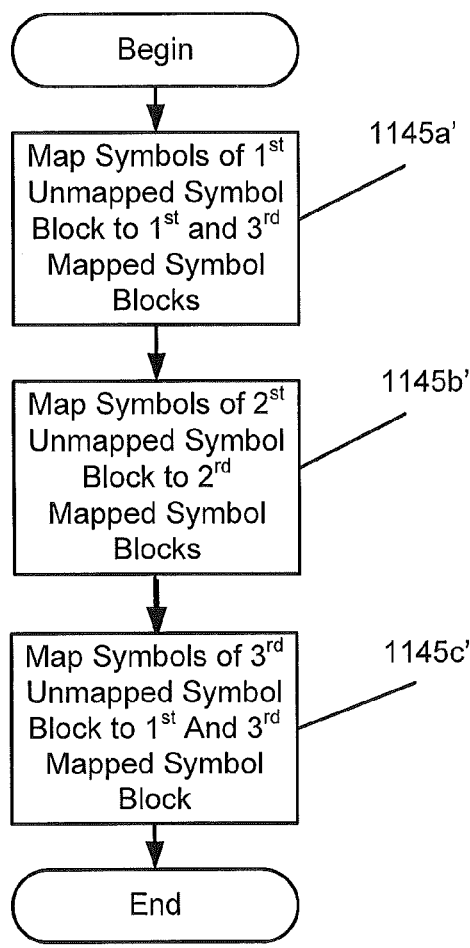
Figure 14B:
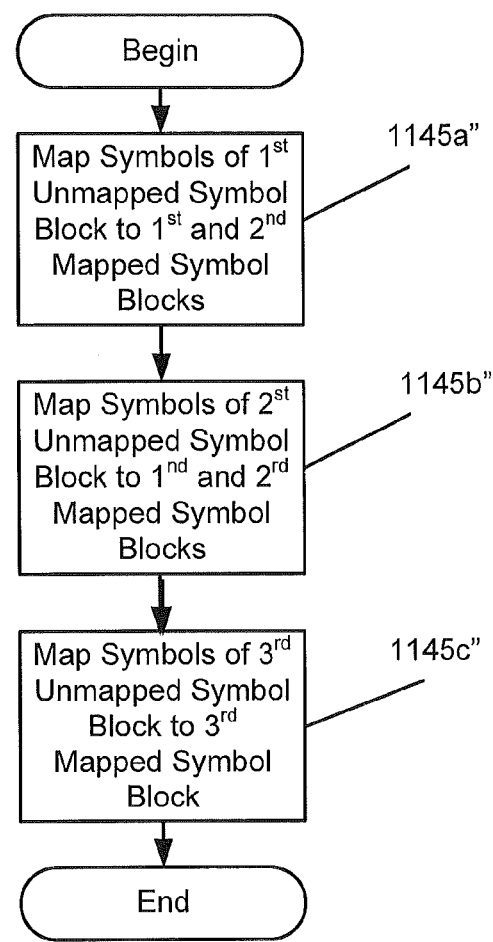

Operations 1145*a'*, 1145*b'* and 1145*c'* of FIG. 14A may be substituted for operations 1145*a*, 1145*b*, and 1145*c* of FIG. 11C, or operations 1145*a"*, 1145*b"* and 1145*c"* of FIG. 14B may be substituted for operations 1145*a*, 1145*b*, and 1145*c* of FIG. 11C. With fixed mapping, one of operations 1145*a*, 1145*b*, and 1145*c*, operations 1145*a'*, 1145*b'*, and 1145*c'*, or operations 1145*a"*, 1145*b"*, and 1145*c"* may always be used. With dynamic mapping different ones of operations 1145*a*, 1145*b*, and 1145*c*, operations 1145*a'*, 1145*b'*, and 1145*c'*, or operations 1145*a"*, 1145*b"*, and 1145*c"* may be selected for a particular TFRE/TTI, for example, based on a mapping selection received from wireless terminal 200 at block 1140.

At block 1146, spreader scrambler 409 and/or layer precoder 411 may precode symbols of the first, second, and third mapped symbol blocks to respective first, second, and third MIMO layers using a MIMO precoding vector to provide precoded symbols of the first, second, and third MIMO layers. At block 1147, the precoded symbols of the first, second, and third MIMO precoding layers may be transmitted through the MIMO antenna elements of MIMO antenna array 117 to wireless terminal 200 using a same TFRE.

When data is available for transmission/retransmission to wireless terminal 200 for a next TFRE/TTI at block 1148, base station 100 may select a rank, a precoding vector, a modulation and coding scheme, a transport block size, etc. for transmission at block 1149, and base station 100 may transmit identification(s)/indication(s) of the selected transmission characteristics (e.g., rank, precoding vector, MCS, TBS, etc.) to the wireless terminal 200. If rank 3 is maintained at block 1150, operations of blocks 1140-1150 may be repeated for each rank 3 TFRE/TTI. If a different rank (e.g., rank 1, 2, or 4) is selected at blocks 1149 and 1150, base station processor 101 may return to block 1015 of FIG. 10 as indicated by block 1151.

Figure 11D:
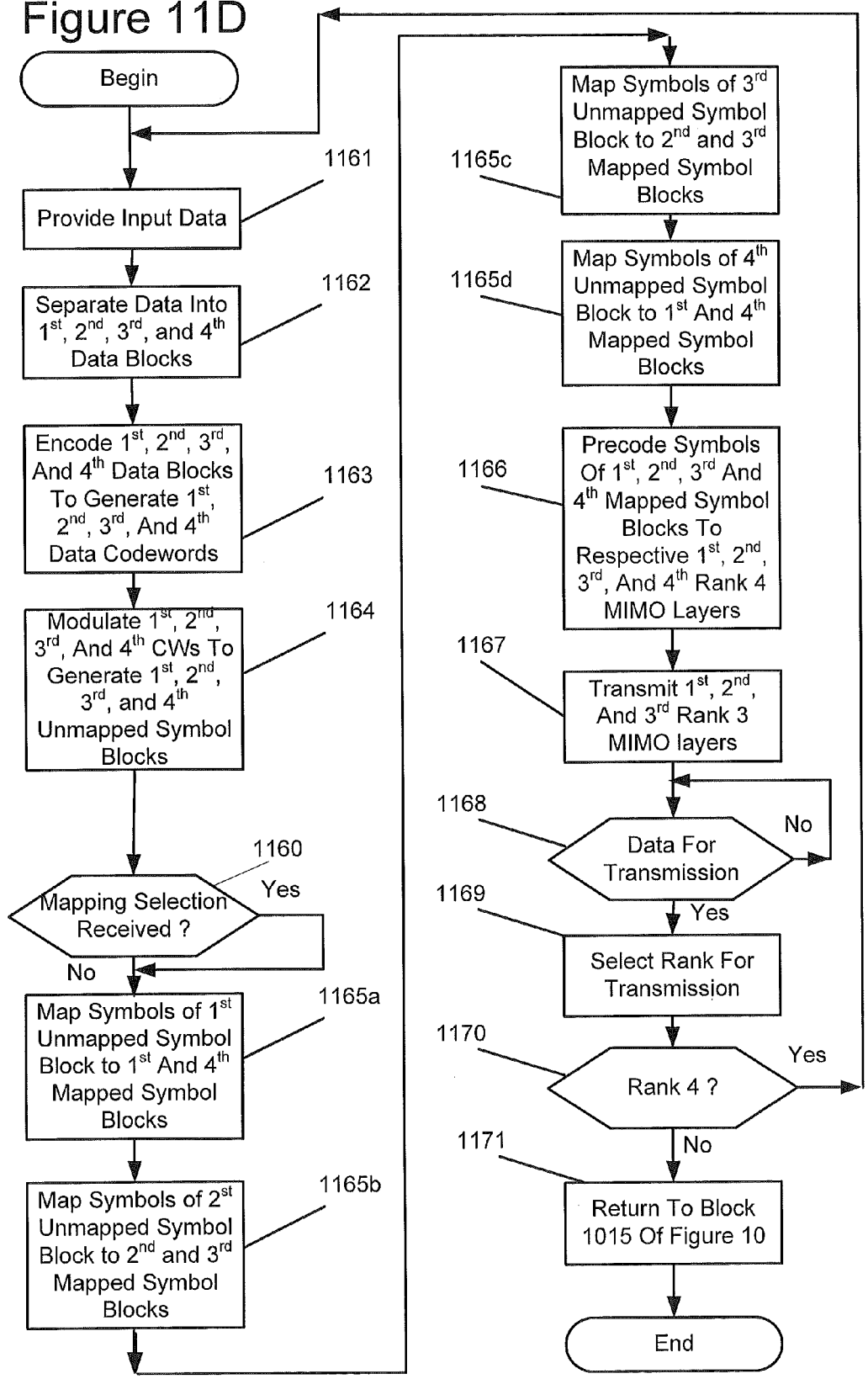

If rank 4 transmission is selected for the TFRE/TTI at blocks 1013, 1015, and/or 1019 of FIG. 10, base station 100 may proceed with operations of FIG. 11D. For example, transport block generator 401 may provide input data for transmission to the wireless terminal 200 at block 1161, and separate the input data into first, second, third, and fourth data blocks at block 1162. At block 1163, encoder 403 may encode the first, second, third, and fourth data blocks at block 1163 to generate respective first, second, third, and fourth data codewords; and at block 1144, modulator 405 may modulate data of the first, second, third, and fourth data codewords to provide symbols of respective first, second, third, and fourth unmapped symbol blocks. As discussed in greater detail below regarding some embodiments, a mapping selection may be received from wireless terminal 200 at block 1160 with the mapping selection defining a mapping of symbols from unmapped symbol blocks to mapped symbol blocks. According to some other embodiments, a mapping of symbols from unmapped symbol blocks may be fixed, or one of a plurality of mapping selections may be selected by base station without receiving input from wireless terminal 200.

In accordance with Rank 4, Option 2 (discussed above with respect to FIGS. 4 and 5 and shown in FIG. 11D), layer mapper 407 may map symbols from the first unmapped symbol block to first and fourth mapped symbol blocks at block 1165*a*; layer mapper 407 may map symbols from the second unmapped symbol block to second and third mapped symbol blocks at block 1165*b*; layer mapper 407 may map symbols from the third unmapped symbol block to the second and third mapped symbol blocks at block 1165*c*; and layer mapper 407 may map symbols from the fourth unmapped symbol block to the first and fourth mapped symbol blocks at block 1165*d*. Accordingly, the first mapped symbol block may include symbols of the first and fourth unmapped symbol blocks; the second mapped symbol block may include symbols of the second and third unmapped symbol blocks; the third mapped symbol block may include symbols of the second and third unmapped symbol blocks; and the fourth mapped symbol block may include symbols of the first and fourth unmapped symbol blocks. For example, even symbols of the first and fourth unmapped symbol blocks may map to the first mapped symbol block, even symbols of the second and third unmapped symbol blocks may map to the second mapped symbol block, odd symbols of the second and third unmapped symbol blocks may map to the third mapped symbol block, and odd symbols of the first and fourth unmapped symbol blocks may map to the fourth mapped symbol block. With fixed mapping, for example, rank 3, option 1 (discussed above with respect to FIG. 11C) and rank 4, option 2 may be used to maintain a mapping of second and third unmapped symbol blocks to second and third mapped symbol blocks for rank 3 and rank 4 transmissions.

In accordance with Rank 4, Option 1 (discussed above with respect to FIGS. 4 and 5 and shown in FIG. 14C), layer mapper 407 may map symbols from the first unmapped symbol block to first and third mapped symbol blocks at block 1165a'; layer mapper may map symbols from the second unmapped symbol block to second and fourth mapped symbol blocks at block 1165b'; layer mapper 407 may map symbols from the third unmapped symbol block to the first and third mapped symbol blocks at block 1165c'; and layer mapper 407 may map symbols from the fourth unmapped symbol block to the second and fourth mapped symbol blocks at block 1165d'. Accordingly, the first mapped symbol block may include symbols of the first and third unmapped symbol blocks; the second mapped symbol block may include symbols of the second and fourth unmapped symbol blocks; the third mapped symbol block may include symbols of the first and third unmapped symbol blocks; and the fourth mapped symbol block may include symbols of the second and fourth unmapped symbol blocks. For example, even symbols of the first and third unmapped symbol blocks may map to the first mapped symbol block, even symbols of the second and fourth unmapped symbol blocks may map to the second mapped symbol block, odd symbols of the first and third unmapped symbol blocks may map to the third mapped symbol block, and odd symbols of the second and fourth unmapped symbol blocks may map to the fourth mapped symbol block.

In accordance with Rank 4, Option 3 (discussed above with respect to FIGS. 4 and 5 and shown in FIG. 14D), layer mapper 407 may map symbols from the first unmapped symbol block to first and second mapped symbol blocks at block 1165a"; layer mapper 407 may map symbols from the second unmapped symbol block to the first and second mapped symbol blocks at block 1165b"; layer mapper 407 may map symbols from the third unmapped symbol block to third and fourth mapped symbol blocks at block 1165c'; and layer mapper 407 may map symbols from the fourth unmapped symbol block to the third and fourth mapped symbol blocks at block 1165d". Accordingly, the first mapped symbol block may include symbols of the first and second unmapped symbol blocks; the second mapped symbol block may include symbols of the first and second unmapped symbol blocks; the third mapped symbol block may include symbols of the third and fourth unmapped symbol blocks; and the fourth mapped symbol block may include symbols of the third and fourth unmapped symbol blocks. For example, even symbols of the first and second unmapped symbol blocks may map to the first mapped symbol block, odd symbols of the first and second unmapped symbol block may map to the second mapped symbol block, even symbols of the third and fourth unmapped symbol blocks may map to the third mapped symbol block, and odd symbols of the third and fourth unmapped symbol blocks may map to the fourth mapped symbol block.

Figure 14C:
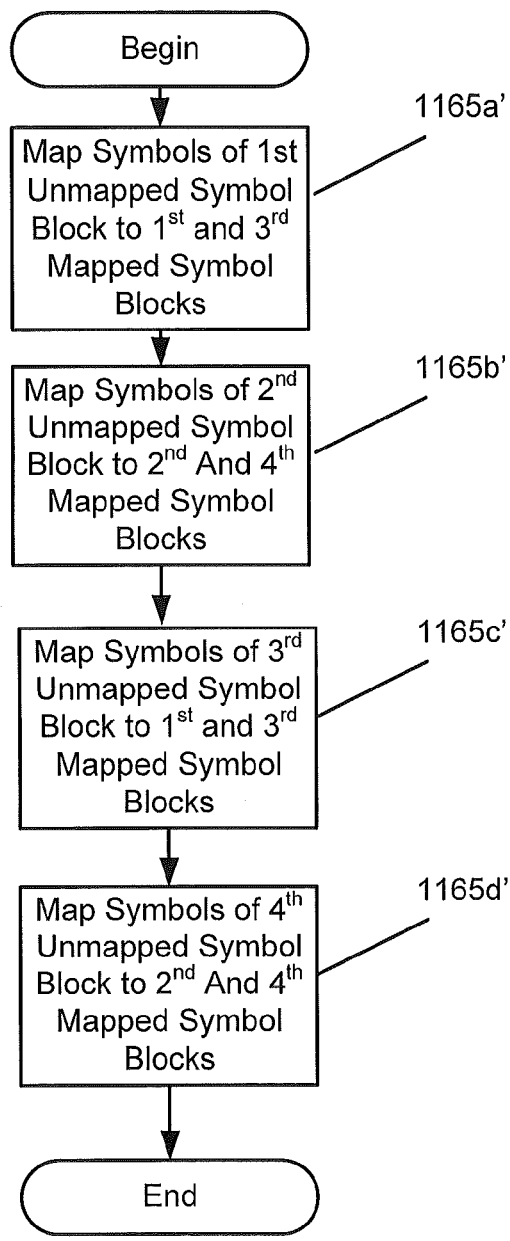
Figure 14D:
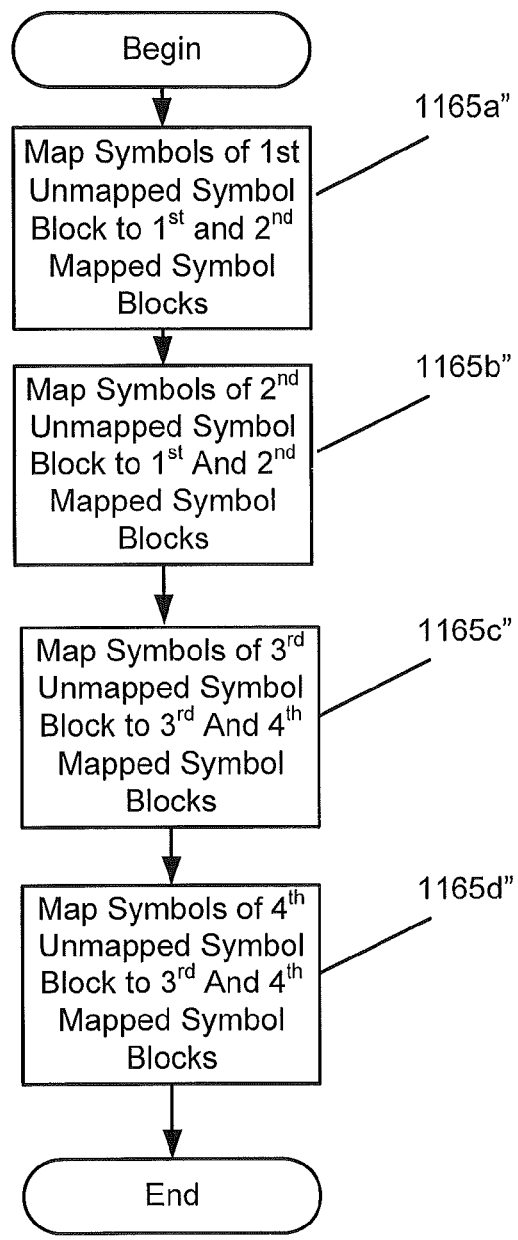

Operations 1165a', 1165b' 1165c', and 1165d' of FIG. 14C may be substituted for operations 1165a, 1165b, 1165c, and 1165d of FIG. 11D, or operations 1165a", 1165b" 1145c", and 1165d" of FIG. 14D may be substituted for operations 1165a, 1146b, 1165c, and 1165d of FIG. 11D. With fixed mapping, one of operations 1165a, 1165b, 1165c, and 1165d, operations 1165a', 1165b', 1165c', and 1165d', or operations 1165a", 1165b", 1165c", and 1165d, may always be used. With dynamic mapping, different ones of operations 1165a, 1165b, 1165c, and 1165d, operations 1165a', 1165b', 1165c', and 1165d', or operations 1165a", 1165b", 1165c", and 1165d" may be selected for a particular TFRE/TTI, for example, based on a mapping selection received from wireless terminal 200 at block 1160.

At block 1166, spreader scrambler 409 and/or layer precoder 411 may precode symbols of the first, second, third, and fourth mapped symbol blocks to respective first, second, third, and fourth MIMO layers using a MIMO precoding vector to provide precoded symbols of the first, second, third, and fourth MIMO layers. At block 1167, the precoded symbols of the first, second, third, and fourth MIMO precoding layers may be transmitted through the MIMO antenna elements of MIMO antenna array 117 to wireless terminal 200 using a same TFRE.

When data is available for transmission/retransmission to wireless terminal 200 for a next TFRE/TTI at block 1168, base station 100 may select a rank, a precoding vector, a modulation and coding scheme, a transport block size, etc. for transmission at block 1169, and base station 100 may transmit identification(s)/indication(s) of the selected transmission characteristics (e.g., rank, precoding vector, MCS, TBS, etc.) to the wireless terminal 200. If rank 4 is maintained at block 1170, operations of blocks 1160-1170 may be repeated for each rank 4 TFRE/TTI. If a different rank (e.g., rank 1, 2, or 3) is selected at blocks 1169 and 1170, base station processor 101 may return to block 1015 of FIG. 10 as indicated by block 1171.

Figure 12:
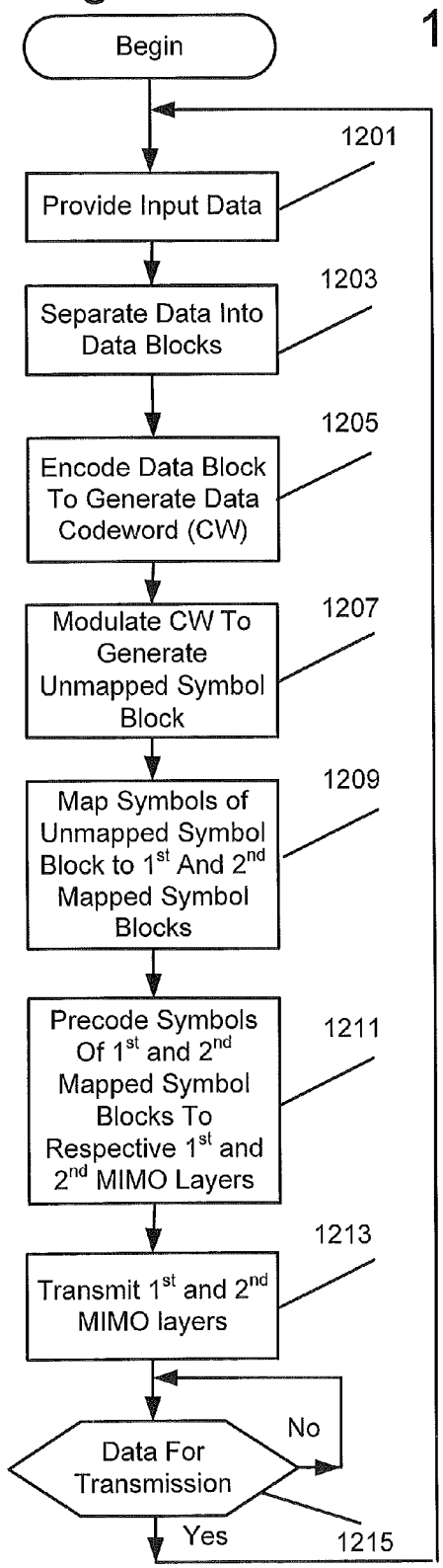

FIG. 12 illustrates base station operations according to still other embodiments. Transport block generator 401 may provide input data for transmission to wireless terminal 200 at block 1201, and separate the input data into a plurality of different data blocks at block 1203. Encoder 403 may encode a first data block of the plurality of different data blocks using a first channel code characteristic to provide a first data codeword at block 1205, and modulator 405 may modulate data of the first data codeword to provide a first unmapped symbol block at block 1207. At block 1209, layer mapper may map symbols of a first unmapped symbol block to first and second mapped symbol blocks, so that the first mapped symbol block includes symbols of the first unmapped symbol block, and so that the second mapped symbol block includes symbols of the first unmapped symbol block. At block 1211, spreader/scrambler 409 and/or layer precoder 411 may precode the symbols of the first and second mapped symbol blocks to provide precoded symbols of first and second MIMO precoding layer using a MIMO precoding vector, and at block 1213, the first and second MIMO precoding layers may be transmitted through the MIMO antenna array 117 to wireless terminal 200 using a same TFRE. When additional data is available for transmission at block 1215, operations of FIG. 12 may be repeated.

According to some embodiments of FIG. 12, for example, even symbols of the unmapped symbol block may be mapped to the first mapped symbol block, odd symbols of the unmapped symbol block may be mapped to the second mapped symbol block, and the first and second mapped symbol blocks may exclude symbols of any unmapped symbol blocks other than the first unmapped symbol block.

According to some other embodiments of FIG. 12, a second data block of the plurality of data blocks may be encoded using the first channel code characteristic to provide a second data codeword at block 1205. Moreover, modulating data of the first data codeword at block 1207 may include interleaving and modulating data of the first and second data codewords to provide the first unmapped symbol block. Two separately encoded data codewords may thus be interleaved (combined) and modulated to provide one unmapped symbol block, symbols of which are then mapped to two different MIMO layers for transmission during a same TFRE/TTI.

Figure 13:
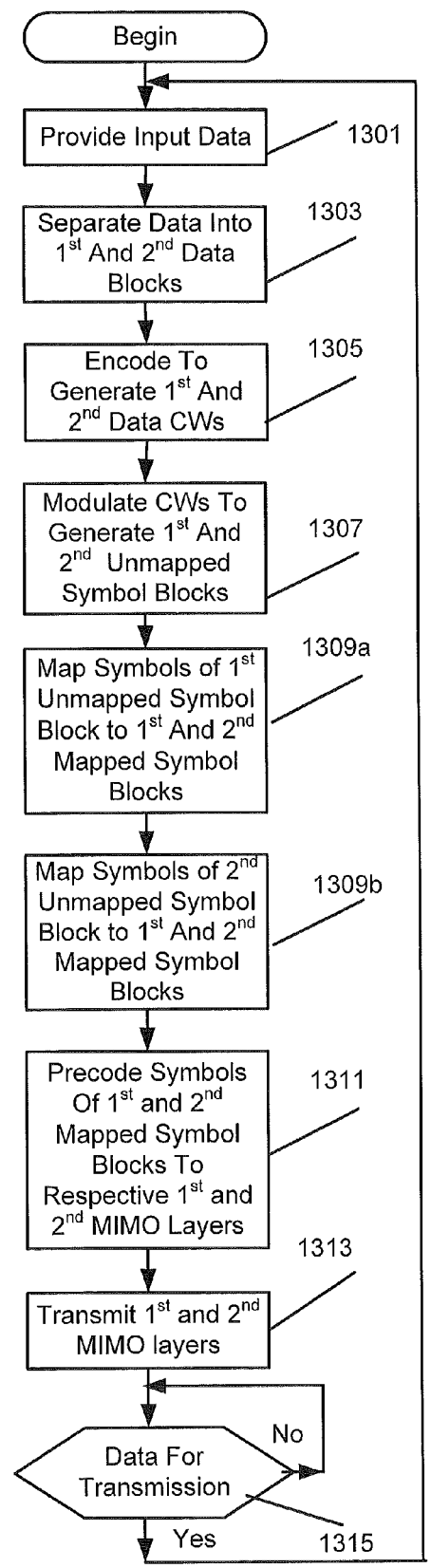

FIG. 13 illustrates base station operations according to yet other embodiments. Transport block generator 401 may provide input data for transmission to the wireless terminal 200 at block 1301, and separate the input data into a plurality of different data blocks at block 1303. Encoder 403 may encode first and second ones of the plurality of different data blocks using respective first and second channel code characteristics to provide respective first and second data codewords at block 1305. Moreover, the first and second channel code characteristics may be different. Modulator 405 may modulate data of the first and second data codewords to provide symbols of respective first and second unmapped symbol blocks at block 1307. At block 1309*a*, layer mapper 407 may map symbols of the first unmapped symbol block to first and second mapped symbol blocks, and at block 1309*b*, layer mapper 407 may map symbols of the second unmapped symbol block to the first and second mapped symbol blocks. Accordingly, the first mapped symbol block may include symbols of the first and second unmapped symbol blocks and the second mapped symbol block may include symbols of the first and second unmapped symbol block.

At block 1311, spreader/scrambler 409 and/or layer precoder 411 may precode the symbols of the first and second mapped symbol blocks to provide precoded symbols of respective first and second MIMO precoding layers using a MIMO precoding vector, and at block 1313, each of the precoded symbols of the first and second MIMO precoding layers may be transmitted through the MIMO antenna array 117 to wireless terminal 200 using a same TFRE/TTI. When additional data is available for transmission at block 1315, operations of FIG. 13 may be repeated.

FIGS. 15 and 16A-D are flow charts illustrating operations of wireless terminal 200 corresponding to operations of base station 100 discussed above with respect to FIGS. 10 and 11A-D. When data is to be received at wireless terminal 200 at block 1501, wireless terminal 200 may receive identification(s)/indication(s) of one or more of a rank, a precoding vector (also referred to as a decoding vector), a modulation and coding scheme, a transport block size, etc. from base station 100. Based on the rank identified/indicated at blocks 1501 and 1503 for a given TFRE/TTI, operations of FIG. 16A may be performed for rank 1 reception for the given TFRE/TTI as indicated at block 1505, operations of FIG. 16B may be performed for rank 2 reception for the given TFRE/TTI as indicated at block 1507, operations of FIG. 16C may be performed for rank 3 reception for the given TFRE/TTI as indicated at block 1509, and operations of FIG. 16D may be performed for rank 4 reception for the given TFRE/TTI as indicated at block 1511. In general, wireless terminal 200 reception operations of FIGS. 15, 16A, 16B, 16C, and 16D may respectively correspond to base station 100 transmission operations of FIGS. 10, 11A, 11B, 11C, and 11D, discussed above.

Figure 15:
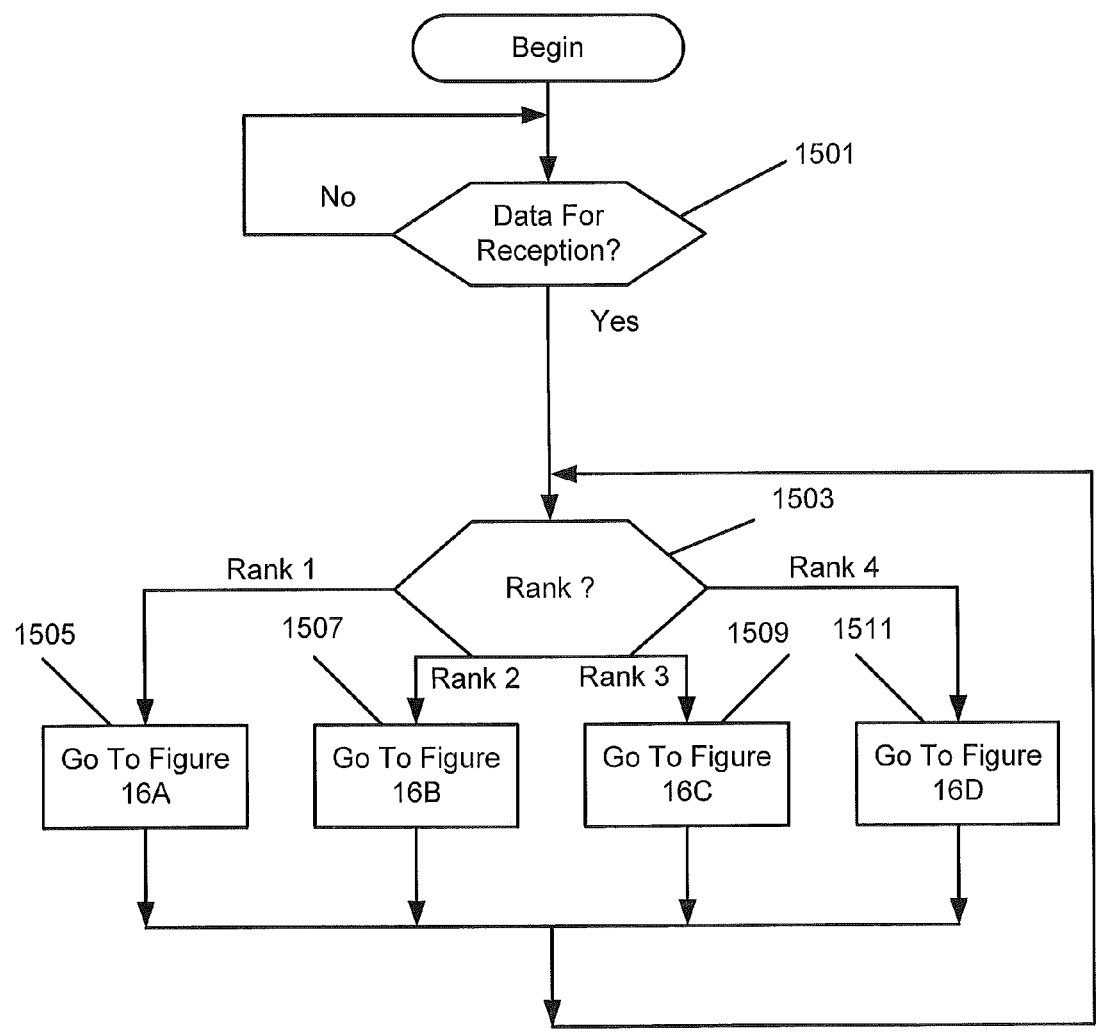

If rank 1 reception is indicated for the TFRE/TTI at blocks 1501, 1503, and 1505 of FIG. 15, wireless terminal 200 may proceed with operations of FIG. 16A. For example, layer decoder 601 may decode radio frequency signals received through the MIMO antenna array 217 using a rank 1 MIMO decoding vector to generate a decoded symbol block for a first reception layer at block 1521. At block 1523, layer demapper 603 may demap symbols of the decoded symbol block an unmapped symbol block so that the unmapped symbol block includes all symbols of the decoded symbol block. At block 1525, demodulator/deinterleaver DM1 may demodulate the unmapped symbol block to generate data of a codeword, and at block 1527, channel decoder CD1 may channel decode the codeword to provide a data block. At block 1529, the data block of the rank 1 TFRE/TTI may be combined by transport block combiner 607 into an output data stream.

When a next reception TFRE/TTI is indicated by base station 100 at block 1531, wireless terminal 200 may receive identification(s)/indication(s) of one or more of a rank, a precoding vector, a modulation and coding scheme, a transport block size, etc. from base station 100 for the next TFRE/TTI. If rank 1 is maintained at block 1535, operations of blocks 1521-1531 may be repeated for each rank 1 TFRE/TTI. If a different rank (e.g., rank 2, 3, or 4) is selected at blocks 1531 and 1535, wireless terminal processor 101 may return to block 1503 of FIG. 15 as indicated by block 1537.

If rank 2 reception is indicated for the TFRE/TTI at blocks 1501, 1503, and 1507 of FIG. 15, wireless terminal 200 may proceed with operations of FIG. 16B. For example, layer decoder 601 may decode radio frequency signals received through the MIMO antenna array 217 using a rank 2 MIMO decoding vector to generate first and second decoded symbol blocks for first and second reception layers at block 1541 for the rank 2 TFRE/TTI. At block 1542, layer demapper 603 may demap symbols of the first and second decoded symbol blocks to respective first and second unmapped symbol blocks so that the first unmapped symbol block includes all symbols of the first decoded symbol block, and so that the second unmapped symbol block includes all symbols of the second decoded symbol block. At block 1543, demodulators/deinterleavers DM1 and DM2 may demodulate the first and second unmapped symbol blocks to generate data of first and second data codewords of the rank 2 TFRE/TTI, and at block 1544, channel decoders CD1 and CD2 may channel decode the first and second data codewords to provide a respective first and second data blocks. At block 1545, the first and second data blocks of the rank 2 TFRE/TTI may be combined by transport block combiner 607 into the output data stream.

When a next reception TFRE/TTI is indicated by base station 100 at block 1546, wireless terminal 200 may receive identification(s)/indication(s) of one or more of a rank, a precoding vector, a modulation and coding scheme, a transport block size, etc. from base station 100 for the next TFRE/TTI. If rank 2 is maintained at block 1547, operations of blocks 1541-1546 may be repeated for each rank 2 TFRE/TTI. If a different rank (e.g., rank 1, 3, or 4) is selected at blocks 1546 and 1547, wireless terminal processor 101 may return to block 1503 of FIG. 15 as indicated by block 1548.

Figure 16C:
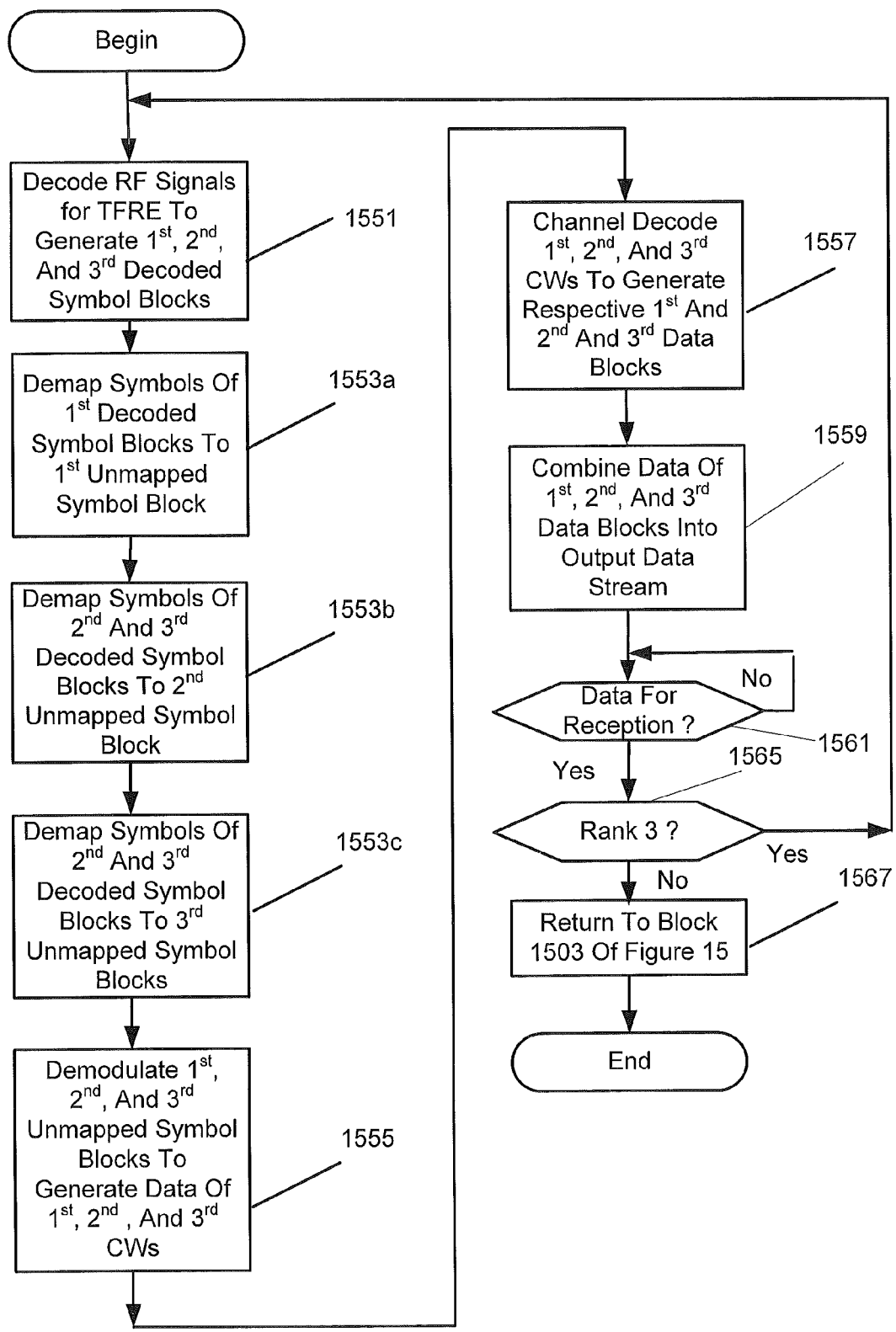

If rank 3 reception is indicated for the TFRE/TTI at blocks 1501, 1503, and 1509 of FIG. 15, wireless terminal 200 may proceed with operations of FIG. 16C. For example, layer decoder 601 may decode radio frequency signals received through the MIMO antenna array 217 using a rank 3 MIMO decoding vector to generate first, second, and third decoded symbol blocks for first, second, and third reception layers at block 1551 for the rank 3 TFRE/TTI. At block 1553*a*, layer demapper 603 may demap symbols of the first decoded symbol block to a first unmapped symbol block so that the first unmapped symbol block includes all symbols of the first decoded symbol block. At block 1553*b*, layer demapper 603 may demap symbols (e.g., even symbols) of the second and third decoded symbol blocks to a second unmapped symbol block so that the second unmapped symbol block includes a first half of the symbols of the second and third decoded symbol blocks. At block 1553*c*, layer demapper 603 may demap symbols (e.g., odd symbols) of the second and third decoded symbol blocks to a third unmapped symbol block so that the third unmapped symbol block includes a second half of the symbols of the second and third decoded symbol blocks. At block 1555, demodulators/deinterleavers DM1, DM2, and DM3 may respectively demodulate the first, second, and third unmapped symbol blocks to generate data of first, second, and third data codewords of the rank 3 TFRE/

TTI, and at block 1557, channel decoders CD1, CD2, and CD3 may channel decode the first, second, and third data codewords to provide a respective first, second, and third data blocks. At block 1559, the first, second, and third data blocks of the rank 3 TFRE/TTI may be combined by transport block combiner 607 into the output data stream.

When a next reception TFRE/TTI is indicated by base station 100 at block 1561, wireless terminal 200 may receive identification(s)/indication(s) of one or more of a rank, a precoding vector, a modulation and coding scheme, a transport block size, etc. from base station 100 for the next TFRE/TTI. If rank 3 is maintained at block 1555, operations of blocks 1551-1561 may be repeated for each rank 3 TFRE/TTI. If a different rank (e.g., rank 1, 2, or 4) is selected at blocks 1561 and 1565, wireless terminal processor 101 may return to block 1503 of FIG. 15 as indicated by block 1567.

Figure 16D:
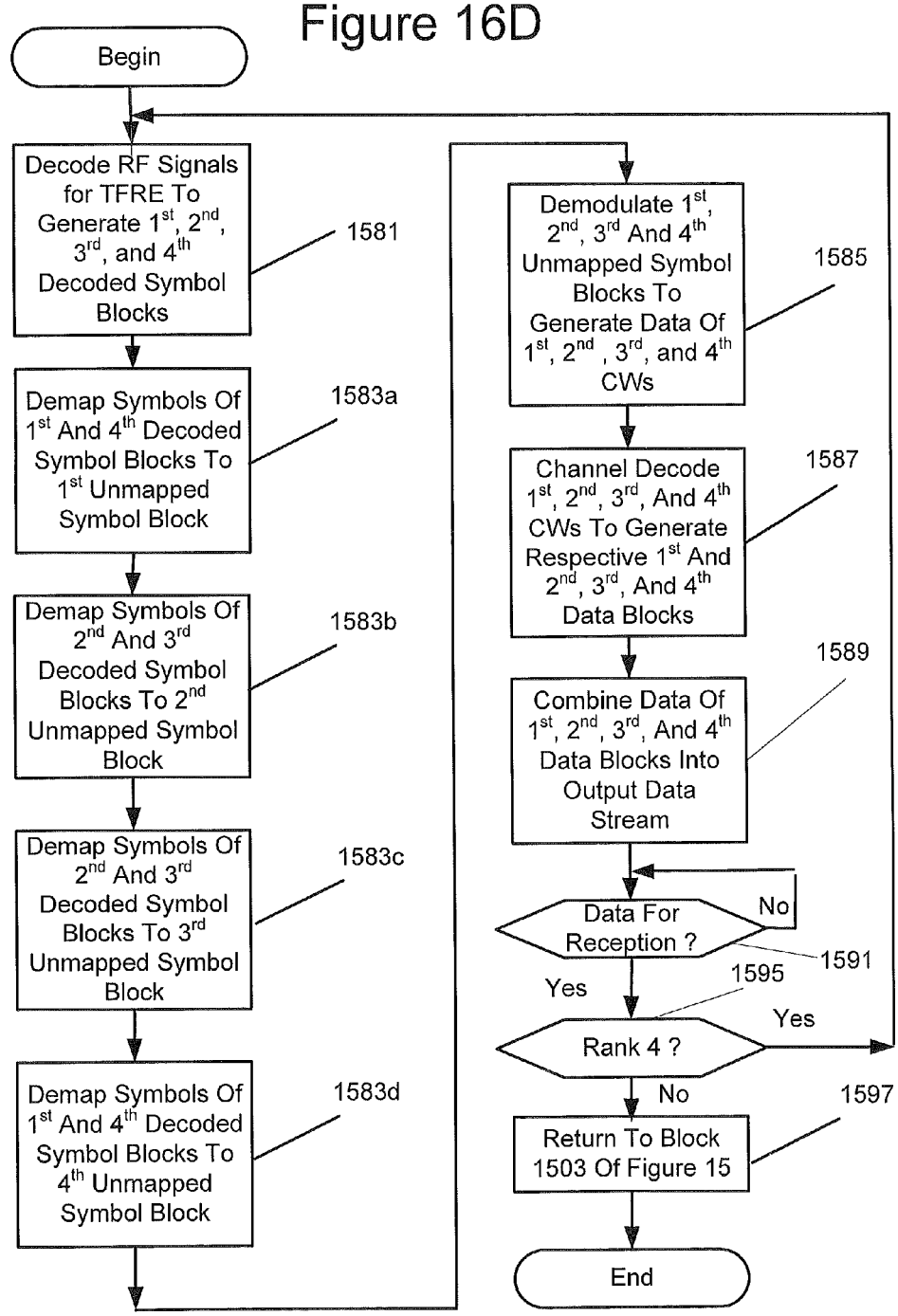

If rank 4 reception is indicated for the TFRE/TTI at blocks 1501, 1503, and 1511 of FIG. 15, wireless terminal 200 may proceed with operations of FIG. 16D. For example, layer decoder 601 may decode radio frequency signals received through the MIMO antenna array 217 using a rank 4 MIMO decoding vector to generate first, second, third, and fourth decoded symbol blocks for first, second, third, and fourth reception layers at block 1581 for the rank 4 TFRE/TTI. At block 1583*a*, layer demapper 603 may demap symbols (e.g., even symbols) of the first and fourth decoded symbol blocks to a first unmapped symbol block so that the first unmapped symbol block includes a first half of the symbols of the first and fourth decoded symbol blocks. At block 1583*b*, layer demapper 603 may demap symbols (e.g., even symbols) of the second and third decoded symbol blocks to a second unmapped symbol block so that the second unmapped symbol block includes a first half of the symbols of the second and third decoded symbol blocks. At block 1553*c*, layer demapper 603 may demap symbols (e.g., odd symbols) of the second and third decoded symbol blocks to a third unmapped symbol block so that the third unmapped symbol block includes a second half of the symbols of the second and third decoded symbol blocks. At block 1583*d*, layer demapper 603 may demap symbols (e.g., odd symbols) of the first and fourth decoded symbol blocks to a fourth unmapped symbol block so that the fourth unmapped symbol block includes a second half of the symbols of the first and fourth decoded symbol blocks. At block 1585, demodulators/deinterleavers DM1, DM2, DM3, and DM4 may respectively demodulate the first, second, third, and fourth unmapped symbol blocks to generate data of first, second, third, and fourth data codewords of the rank 4 TFRE/TTI. At block 1587, channel decoders CD1, CD2, CD3, and CD4 may channel decode the first, second, third, and fourth data codewords to provide respective first, second, third, and fourth data blocks. At block 1589, the first, second, third, and fourth data blocks of the rank 4 TFRE/TTI may be combined by transport block combiner 607 into the output data stream.

When a next reception TFRE/TTI is indicated by base station 100 at block 1591, wireless terminal 200 may receive identification(s)/indication(s) of one or more of a rank, a precoding vector, a modulation and coding scheme, a transport block size, etc. from base station 100 for the next TFRE/TTI. If rank 4 is maintained at block 1595, operations of blocks 1581-1591 may be repeated for each rank 4 TFRE/TTI. If a different rank (e.g., rank 1, 2, or 3) is selected at blocks 1591 and 1595, wireless terminal processor 101 may return to block 1503 of FIG. 15 as indicated by block 1597.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BlueRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of present inventive concepts may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of present inventive concepts. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of present inventive concepts. All such variations and modifications are intended to be included herein within the scope of present inventive concepts. Accordingly, the above disclosed subject matter is to be considered illustrative, and not restrictive, and the appended claims are intended to cover all such modifications, enhancements, and other embodiments, which fall within the spirit and scope of present inventive concepts. Thus, to the maximum extent allowed by law, the scope of present inventive concepts is to be determined by the broadest permissible interpretation of the embodiments discussed herein, and shall not be restricted or limited by the foregoing detailed description.

That which is claimed:

1. A method of transmitting data from a radio access network node to a wireless terminal using a multiple-input-multiple-output, MIMO, antenna array including a plurality of MIMO antenna elements, the method comprising:
    generating a plurality of unmapped symbol blocks wherein each of the unmapped symbol blocks includes a plurality of symbols;
    mapping symbols of a first one of the plurality of unmapped symbol blocks to first and second mapped symbol blocks, so that the first mapped symbol block includes symbols of the first unmapped symbol block, and so that the second mapped symbol block includes symbols of the first unmapped symbol block;
    precoding the symbols of the first mapped symbol block to provide precoded symbols of a first MIMO precoding layer using a MIMO precoding vector;
    precoding the symbols of the second mapped symbol block to provide precoded symbols of a second MIMO precoding layer using the MIMO precoding vector; and
    transmitting each of the precoded symbols of the first and second MIMO precoding layers through the MIMO antenna elements of the MIMO antenna array to the wireless terminal using a same time-frequency-resource-element, TFRE.

2. The method of claim 1 wherein mapping symbols further comprises mapping symbols of a second one of the plurality of unmapped symbol blocks to the first and second mapped symbol blocks, so that the first mapped symbol block includes symbols of the first and second unmapped symbol blocks, and so that the second mapped symbol block includes symbols of the first and second unmapped symbol blocks.

3. The method of claim 2 wherein generating the plurality of unmapped symbol blocks comprises,
    providing input data for transmission, wherein the input data is for transmission to the wireless terminal,
    separating the input data into a plurality of different data blocks,
    encoding a first data block of the plurality of different data blocks using a first channel code characteristic to provide a first codeword,
    encoding a second data block of the plurality of different data blocks using a second channel code characteristic different than the first channel code characteristic to provide a second codeword,
    modulating data of the first codeword to provide symbols of the first unmapped symbol block, and
    modulating data of the second codeword to provide symbols of the second unmapped symbol block.

4. The method of claim 3 wherein generating the plurality of unmapped symbol blocks further comprises,
   encoding a third data block of the plurality of different data blocks using the first channel code characteristic to provide a third codeword, and
   encoding a fourth data block of the plurality of different data blocks using the second channel code characteristic to provide a fourth codeword,
   wherein modulating data of the first codeword comprises interleaving and modulating data of the first and third codewords to provide symbols of the first unmapped symbol block, and
   wherein modulating data of the second codeword comprises interleaving and modulating data of the second and fourth codewords to provide symbols of the second unmapped symbol block.

5. The method of claim 2 wherein mapping symbols of the first and second unmapped symbol blocks comprises,
   combining the first unmapped symbol block and the second unmapped symbol block to provide a combined symbol block including the plurality of symbols of the first unmapped symbol block and the plurality of symbols of the second unmapped symbol block, and
   separating the combined symbol block to generate the first and second mapped symbol blocks, so that the first mapped symbol block includes symbols of the first and second unmapped symbol blocks, and so that the second mapped symbol block includes symbols of the first and second unmapped symbol blocks.

6. The method of claim 2 further comprising:
   mapping symbols of third and fourth unmapped symbol blocks of the plurality of unmapped symbol blocks to respective third and fourth mapped symbol blocks, so that the third mapped symbol block includes symbols of the third and fourth unmapped symbol blocks, and so that the fourth mapped symbol block includes symbols of the third and fourth unmapped symbol blocks;
   precoding the symbols of the third mapped symbol block to provide precoded symbols of a third MIMO precoding layer using the MIMO precoding vector;
   precoding the symbols of the fourth mapped symbol block to provide precoded symbols of a fourth MIMO precoding layer using the MIMO precoding vector; and
   transmitting each of the precoded symbols of the first, second, third, and fourth MIMO precoding layers through the MIMO antenna elements of the MIMO antenna array to the wireless terminal using the same time-frequency-resource-element, TFRE.

7. The method of claim 2 further comprising:
   mapping symbols of a third unmapped symbol block of the plurality of unmapped symbol blocks to a third mapped symbol block, so that the third mapped symbol block includes symbols of the third unmapped symbol block and excludes symbols of any unmapped symbol block other than the third unmapped symbol block;
   precoding the symbols of the third mapped symbol block to provide precoded symbols of a third MIMO precoding layer using the MIMO precoding vector; and
   transmitting each of the precoded symbols of the first, second, and third MIMO precoding layers through the MIMO antenna elements of the MIMO antenna array to the wireless terminal using the same time-frequency-resource-element, TFRE.

8. The method of claim 7 wherein the TFRE comprises a first TFRE, the method further comprising:
   receiving a first mapping selection from the wireless terminal, wherein mapping symbols of the first, second, and third unmapped symbol blocks comprises mapping responsive to the first mapping selection, and wherein precoding the symbols of the first, second, and third mapped symbol blocks comprises precoding responsive to the first mapping selection;
   receiving a second mapping selection from the wireless terminal different than the first mapping selection;
   responsive to receiving the second mapping selection, mapping symbols of fourth and fifth unmapped symbol blocks of the plurality of unmapped symbol blocks to respective fourth and fifth mapped symbol blocks, so that the fourth mapped symbol block includes symbols of the fourth and fifth unmapped symbol blocks, and so that the fifth mapped symbol block includes symbols of the fourth and fifth unmapped symbol blocks;
   responsive to receiving the second mapping selection, mapping symbols of a sixth unmapped symbol block of the plurality of unmapped symbol blocks to a sixth mapped symbol block, so that the sixth mapped symbol block includes symbols of the sixth unmapped symbol block and excludes symbols of any unmapped symbol block other than the sixth unmapped symbol block;
   responsive to receiving the second mapping selection, precoding the symbols of the fourth mapped symbol block to provide precoded symbols of the third MIMO precoding layer using the MIMO precoding vector;
   responsive to receiving the second mapping selection, precoding the symbols of the fifth mapped symbol block to provide precoded symbols of the first MIMO precoding layer using the MIMO precoding vector;
   responsive to receiving the second mapping selection, precoding the symbols of the sixth mapped symbol block to provide precoded symbols of the second MIMO precoding layer using the MIMO precoding vector; and
   transmitting each of the precoded symbols of the first, second, and third MIMO precoding layers based on the fourth, fifth, and sixth mapped symbol blocks through the MIMO antenna elements of the MIMO antenna array to the wireless terminal using a second TFRE.

9. The method of claim 1 wherein the first mapped symbol block includes symbols of the first unmapped symbol block and excludes symbols of any unmapped symbol block other than the first unmapped symbol block, and wherein the second mapped symbol block includes symbols of the first unmapped symbol block and excludes symbols of any unmapped symbol block other than the first unmapped symbol block.

10. The method of claim 9 wherein generating the plurality of unmapped symbol blocks comprises,
    providing input data for transmission, wherein the input data is for transmission to the wireless terminal,
    separating the input data into a plurality of different data blocks,
    encoding a first data block of the plurality of different data blocks using a first channel code characteristic to provide a first codeword, and
    modulating data of the first codeword to provide the first unmapped symbol block.

11. The method of claim 10 wherein generating the plurality of unmapped symbol blocks further comprises,
    encoding a second data block of the plurality of different data blocks using the first channel code characteristic to provide a second codeword, and
    wherein modulating data of the first codeword comprises interleaving and modulating data of the first and second codewords to provide the first unmapped symbol block.

12. A radio access network node comprising:
a multiple-input-multiple-output, MIMO, antenna array including a plurality of MIMO antenna elements;
a processor coupled to the MIMO antenna array, the processor being configured to generate a plurality of unmapped symbol blocks wherein each of the unmapped symbol blocks includes a respective plurality of symbols, to map symbols of a first one of the unmapped symbol blocks of the plurality of unmapped symbol blocks to first and second mapped symbol blocks so that the first mapped symbol block includes symbols of the first unmapped symbol blocks and so that the second mapped symbol block includes symbols of the first unmapped symbol blocks, to precode the symbols of the first mapped symbol block to provide precoded symbols of a first MIMO precoding layer using a MIMO precoding vector, to precode the symbols of the second mapped symbol block to provide precoded symbols of a second MIMO precoding layer using the MIMO precoding vector, and to transmit each of the precoded symbols of the first and second MIMO precoding layers through the MIMO antenna elements of the MIMO antenna array to the wireless terminal using a same time-frequency-resource-element, TFRE.

13. The radio access network node of claim 12 wherein the processor is further configured to map symbols of a second one of the plurality of unmapped symbol blocks to the first and second mapped symbol blocks, so that the first mapped symbol block includes symbols of the first and second unmapped symbol blocks, and so that the second mapped symbol block includes symbols of the first and second unmapped symbol blocks.

14. The radio access network node of claim 13 wherein the processor is configured to generate the plurality of unmapped symbol blocks by providing input data for transmission to the wireless terminal, separating the input data into a plurality of different data blocks, encoding a first data block of the plurality of different data blocks using a first channel code characteristic to provide a first codeword, encoding a second data block of the plurality of different data blocks using a second channel code characteristic different than the first channel code characteristic to provide a second code word, modulating data of the first codeword to provide symbols of the first unmapped symbol block, and modulating data of the second codeword to provide symbols of the second unmapped symbol block.

15. The radio access network node of claim 14 wherein the processor is further configured to generate the plurality of unmapped symbol blocks by encoding a third data block of the plurality of different data blocks using the first channel code characteristic to provide a third codeword, and encoding a fourth data block of the plurality of different data blocks using the second channel code characteristic to provide a fourth codeword, wherein the processor is further configured to modulate data of the first code word by interleaving and modulating data of the first and third codewords to provide symbols of the first unmapped symbol block, and wherein processor is further configured to modulate data of the second codeword by interleaving and modulating data of the second and fourth codewords to provide symbols of the second unmapped symbol block.

16. The radio access network node of claim 13 wherein the processor is configured to map symbols of the first and second unmapped symbol blocks by combining the first unmapped symbol block and the second unmapped symbol block to provide a combined symbol block including the plurality of symbols of the first unmapped symbol block and the plurality of symbols of the second unmapped symbol block, and separating the combined symbol block to generate the first and second mapped symbol blocks so that the first mapped symbol block includes symbols of the first and second unmapped symbol blocks and so that the second mapped symbol block includes symbols of the first and second unmapped symbol blocks.

17. The radio access network node of claim 13 wherein the processor is further configured to map symbols of third and fourth unmapped symbol blocks of the plurality of unmapped symbol blocks to respective third and fourth mapped symbol blocks so that the third mapped symbol block includes symbols of the third and fourth unmapped symbol blocks and so that the fourth mapped symbol block includes symbols of the third and fourth unmapped symbol blocks, to precode the symbols of the third mapped symbol block to provide precoded symbols of a third MIMO precoding layer using the MIMO precoding vector, to precode the symbols of the fourth mapped symbol block to provide precoded symbols of a fourth MIMO precoding layer using the MIMO precoding vector, and to transmit each of the precoded symbols of the first, second, third, and fourth MIMO precoding layers through the MIMO antenna elements of the MIMO antenna array to the wireless terminal using the same time-frequency-resource-element, TFRE.

18. The radio access network node of claim 13 wherein the processor is further configured to map symbols of a third unmapped symbol block of the plurality of unmapped symbol blocks to a third mapped symbol block so that the third mapped symbol block includes symbols of the third unmapped symbol block and excludes symbols of any unmapped symbol block other than the third unmapped symbol block, to precode the symbols of the third mapped symbol block to provide precoded symbols of a third MIMO precoding layer using the MIMO precoding vector, and to transmit each of the precoded symbols of the first, second, and third MIMO precoding layers through the MIMO antenna elements of the MIMO antenna array to the wireless terminal using the same time-frequency-resource-element, TFRE.

19. The radio access network node of claim 18 wherein the TFRE comprises a first TFRE, and wherein the processor is further configured to receive a first mapping selection from the wireless terminal, wherein mapping symbols of the first, second, and third unmapped symbol blocks comprises mapping responsive to the first mapping selection, and wherein precoding the symbols of the first, second, and third mapped symbol blocks comprises precoding responsive to the first mapping selection, wherein the processor is further configured to receive a second mapping selection from the wireless terminal different than the first mapping selection, to map symbols of fourth and fifth unmapped symbol blocks of the plurality of unmapped symbol blocks to respective fourth and fifth mapped symbol blocks responsive to receiving the second mapping selection so that the fourth mapped symbol block includes symbols of the fourth and fifth unmapped symbol blocks and so that the fifth mapped symbol block includes symbols of the fourth and fifth unmapped symbol blocks, to map symbols of a sixth unmapped symbol block of the plurality of unmapped symbol blocks to a sixth mapped symbol block responsive to receiving the second mapping selection so that the sixth mapped symbol block includes symbols of the sixth unmapped symbol block and excludes symbols of any unmapped symbol block other than the sixth unmapped symbol block, to precode the symbols of the fourth mapped symbol block responsive to receiving the second mapping selection to provide precoded symbols of the third MIMO precoding layer using the MIMO precoding vector, to precode the symbols of the fifth mapped symbol block responsive to receiving the second mapping selection to provide precoded symbols of the first MIMO precoding layer using the MIMO precoding vector, to precode the symbols of the sixth mapped symbol block responsive to receiving the second mapping selection to provide precoded symbols of the second MIMO precoding layer using the MIMO precoding vector, and to transmit each of the precoded symbols of the first, second, and third MIMO precoding layers based on the fourth, fifth, and sixth mapped symbol blocks through the MIMO antenna array to the wireless terminal using a second TFRE.

20. The method of claim 1 wherein the first MIMO precoding layer is transmitted through the MIMO antenna elements using a first MIMO layer, wherein the second MIMO precoding layer is transmitted through the MIMO antenna elements using a second MIMO layer, and wherein the first and second MIMO layers are different MIMO layers defined by the MIMO precoding vector.

21. The radio access network of claim 12 wherein the processor is configured to transmit the first MIMO precoding layer through the MIMO antenna elements of the MIMO antenna array using a first MIMO layer, wherein the processor is configured to transmit the second MIMO precoding layer through the MIMO antenna elements of the MIMO antenna array using a second MIMO layer, and wherein the first and second MIMO layers are different MIMO layers defined by the MIMO precoding vector.

22. The radio access network node of claim 12 wherein the first mapped symbol block includes symbols of the first unmapped symbol block and excludes symbols of any unmapped symbol block other than the first unmapped symbol block, and wherein the second mapped symbol block includes symbols of the first unmapped symbol block and excludes symbols of any unmapped symbol block other than the first unmapped symbol block.

23. The radio access network node of claim 22 wherein the processor is configured to generate the plurality of unmapped symbol blocks by,
    providing input data for transmission, wherein the input data is for transmission to the wireless terminal,
    separating the input data into a plurality of different data blocks,
    encoding a first data block of the plurality of different data blocks using a first channel code characteristic to provide a first codeword, and
    modulating data of the first codeword to provide the first unmapped symbol block.

24. The radio access network node of claim 23 wherein the processor is further configured to generate the plurality of unmapped symbol blocks by,
    encoding a second data block of the plurality of different data blocks using the first channel code characteristic to provide a second codeword, and
    wherein modulating data of the first codeword comprises interleaving and modulating data of the first and second codewords to provide the first unmapped symbol block.

* * * * *

UNITED STATES PATENT AND TRADEMARK OFFICE
CERTIFICATE OF CORRECTION

PATENT NO. : 8,908,784 B2  
APPLICATION NO. : 13/818005  
DATED : December 9, 2014  
INVENTOR(S) : Nammi et al.

Page 1 of 1

It is certified that error appears in the above-identified patent and that said Letters Patent is hereby corrected as shown below:

In the Specification

In Column 19, Line 6, delete "interleaves/modulators" and insert -- interleaver/modulators --, therefor.

In Column 20, Line 23, delete "symbols," and insert -- symbols --, therefor.

In the Claims

In Column 47, Line 19, in Claim 21, delete "network" and insert -- network node --, therefor.

Signed and Sealed this  
Fourth Day of August, 2015

Michelle K. Lee  
*Director of the United States Patent and Trademark Office*